(12) United States Patent
Blevins et al.

(10) Patent No.: US 9,804,588 B2
(45) Date of Patent: Oct. 31, 2017

(54) DETERMINING ASSOCIATIONS AND ALIGNMENTS OF PROCESS ELEMENTS AND MEASUREMENTS IN A PROCESS

(71) Applicant: FISHER-ROSEMOUNT SYSTEMS, INC., Round Rock, TX (US)

(72) Inventors: Terrence L. Blevins, Round Rock, TX (US); Wilhelm K. Wojsznis, Austin, TX (US); Mark J. Nixon, Round Rock, TX (US); Paul Richard Muston, Narborough (GB)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 575 days.

(21) Appl. No.: 14/212,411

(22) Filed: Mar. 14, 2014

(65) Prior Publication Data
US 2015/0261215 A1 Sep. 17, 2015

(51) Int. Cl.
*G05B 13/02* (2006.01)
*G05B 15/02* (2006.01)
(Continued)

(52) U.S. Cl.
CPC .. *G05B 19/4184* (2013.01); *G05B 2219/1171* (2013.01); *G05B 2219/31357* (2013.01)

(58) Field of Classification Search
CPC .... G05B 13/0265; G05B 13/02; G05B 15/02; G05B 11/01; G05B 19/4184; G05B 17/02;
(Continued)

(56) References Cited

U.S. PATENT DOCUMENTS 4,593,367 A 6/1986 Slack et al.
5,111,531 A 5/1992 Grayson et al.
(Continued)

FOREIGN PATENT DOCUMENTS

AU 2010257310 A1 7/2012
CN 102710861 A 10/2012
(Continued)

OTHER PUBLICATIONS

Bruzzone et al., Different modeling and simulation approaches applied to industrial process plants, Apr. 2013, 8 pages.*
(Continued)

*Primary Examiner* — Thuy Dao
(74) *Attorney, Agent, or Firm* — Marshall, Gerstein & Borun LLP

(57) ABSTRACT

Techniques for automatically determining, without user input, one or more sources of a variation in the behavior of a target process element operating to control a process in a process plant include using a process element alignment map to determine process elements upstream of the target process element in the process; performing a data analysis on data corresponding to the upstream elements with respect to the target element to determine behavior time offsets, strengths of impact, and impact delays; and determining the source(s) based on the data analysis outputs. Techniques may include automatically defining the process element alignment map by obtaining and processing data from a plurality of diagrams or data sources of the process and/or plant. Furthermore, the techniques may be performed during plant run-time by any high-volume, high density device such as centralized or embedded big data appliances, controllers, field or I/O devices, and/or by an unsupervised application.

55 Claims, 17 Drawing Sheets

(51) Int. Cl.
G05B 23/02 (2006.01)
G05B 19/418 (2006.01)

(58) Field of Classification Search
CPC ...... G06N 99/005; H04N 19/44; H04N 19/61; H04L 67/12; G06F 3/048
See application file for complete search history.

(56) References Cited

U.S. PATENT DOCUMENTS

| | | | |
|---|---|---|---|
| 5,598,572 | A | 1/1997 | Tanikoshi et al. |
| 5,801,942 | A | 9/1998 | Nixon et al. |
| 5,801,946 | A | 9/1998 | Nissen et al. |
| 5,828,851 | A | 10/1998 | Nixon et al. |
| 5,838,563 | A | 11/1998 | Dove et al. |
| 5,862,052 | A | 1/1999 | Nixon et al. |
| 5,862,054 | A | 1/1999 | Li |
| 5,909,368 | A | 6/1999 | Nixon et al. |
| 5,940,294 | A | 8/1999 | Dove |
| 5,980,078 | A | 11/1999 | Krivoshein et al. |
| 5,988,847 | A | 11/1999 | McLaughlin et al. |
| 5,995,916 | A | 11/1999 | Nixon et al. |
| 6,032,208 | A | 2/2000 | Nixon et al. |
| 6,078,320 | A | 6/2000 | Dove et al. |
| 6,098,116 | A | 8/2000 | Nixon et al. |
| 6,167,464 | A | 12/2000 | Kretschmann |
| 6,178,504 | B1 | 1/2001 | Fieres et al. |
| 6,195,591 | B1 | 2/2001 | Nixon et al. |
| 6,266,726 | B1 | 7/2001 | Nixon et al. |
| 6,295,513 | B1 | 9/2001 | Thackston |
| 6,324,877 | B2 | 12/2001 | Neeley |
| 6,421,570 | B1 | 7/2002 | McLaughlin et al. |
| 6,463,352 | B1 | 10/2002 | Tadokoro et al. |
| 6,535,883 | B1 | 3/2003 | Lee et al. |
| 6,563,430 | B1 | 5/2003 | Kemink et al. |
| 6,658,114 | B1 | 12/2003 | Farn et al. |
| 6,701,285 | B2 | 3/2004 | Salonen |
| 6,715,078 | B1 | 3/2004 | Chasko et al. |
| 6,847,850 | B2 | 1/2005 | Grumelart |
| 6,868,538 | B1 | 3/2005 | Nixon et al. |
| 6,965,886 | B2 | 11/2005 | Govrin et al. |
| 6,970,758 | B1 | 11/2005 | Shi et al. |
| 7,072,722 | B1 | 7/2006 | Colonna et al. |
| 7,123,974 | B1 | 10/2006 | Hamilton |
| 7,143,149 | B2 | 11/2006 | Oberg et al. |
| 7,213,057 | B2 | 5/2007 | Trethewey et al. |
| 7,222,131 | B1 | 5/2007 | Grewal et al. |
| 7,283,914 | B2 | 10/2007 | Poorman et al. |
| 7,314,169 | B1 | 1/2008 | Jasper et al. |
| 7,346,404 | B2 | 3/2008 | Eryurek et al. |
| 7,530,113 | B2 | 5/2009 | Braun |
| 7,536,548 | B1 | 5/2009 | Batke et al. |
| RE40,817 | E | 6/2009 | Krivoshein et al. |
| 7,541,920 | B2 | 6/2009 | Tambascio et al. |
| 7,548,873 | B2 | 6/2009 | Veeningen et al. |
| 7,565,306 | B2 | 7/2009 | Apostolides |
| 7,598,856 | B1 | 10/2009 | Nick et al. |
| 7,616,095 | B2 | 11/2009 | Jones et al. |
| 7,617,542 | B2 | 11/2009 | Vataja |
| 7,630,914 | B2 | 12/2009 | Veeningen et al. |
| 7,644,052 | B1 | 1/2010 | Chang et al. |
| 7,653,563 | B2 | 1/2010 | Veeningen et al. |
| 7,668,608 | B2 | 2/2010 | Nixon et al. |
| 7,676,281 | B2 | 3/2010 | Hood et al. |
| 7,680,546 | B2 | 3/2010 | Gilbert et al. |
| 7,684,877 | B2 | 3/2010 | Weatherhead et al. |
| 7,715,929 | B2 * | 5/2010 | Skourup ............... G05B 17/02 340/3.1 |
| 7,716,489 | B1 | 5/2010 | Brandt et al. |
| 7,720,727 | B2 | 5/2010 | Keyes et al. |
| 7,827,122 | B1 | 11/2010 | Campbell, Jr. et al. |
| 7,853,431 | B2 | 12/2010 | Samardzija et al. |
| 7,925,979 | B2 | 4/2011 | Forney et al. |
| 7,930,639 | B2 | 4/2011 | Baier et al. |
| 7,934,095 | B2 | 4/2011 | Laberteaux et al. |
| 7,962,440 | B2 | 6/2011 | Baier et al. |
| 8,014,722 | B2 | 9/2011 | Abel et al. |
| 8,055,787 | B2 | 11/2011 | Victor et al. |
| 8,060,834 | B2 | 11/2011 | Lucas et al. |
| 8,073,967 | B2 | 12/2011 | Peterson et al. |
| 8,102,400 | B1 | 1/2012 | Cook et al. |
| 8,132,225 | B2 | 3/2012 | Chand et al. |
| 8,166,296 | B2 | 4/2012 | Buer et al. |
| 8,171,137 | B1 | 5/2012 | Parks et al. |
| 8,185,217 | B2 * | 5/2012 | Thiele ................... G05B 17/02 700/29 |
| 8,185,495 | B2 | 5/2012 | Clark et al. |
| 8,185,871 | B2 | 5/2012 | Nixon et al. |
| 8,190,888 | B2 | 5/2012 | Batke et al. |
| 8,191,005 | B2 | 5/2012 | Baier et al. |
| 8,214,455 | B2 | 7/2012 | Baier et al. |
| 8,218,651 | B1 | 7/2012 | Eshet et al. |
| 8,219,669 | B2 | 7/2012 | Agrusa et al. |
| 8,316,313 | B2 | 11/2012 | Campney et al. |
| 8,321,663 | B2 | 11/2012 | Medvinsky et al. |
| 8,327,130 | B2 | 12/2012 | Wilkinson, Jr. et al. |
| 8,350,666 | B2 | 1/2013 | Kore |
| 8,417,360 | B2 * | 4/2013 | Sustaeta ............... G05B 13/024 700/28 |
| 8,417,595 | B2 | 4/2013 | Keyes et al. |
| 8,521,332 | B2 | 8/2013 | Tiemann et al. |
| 8,570,922 | B2 * | 10/2013 | Pratt, Jr. ................. H04L 12/66 370/310 |
| 8,688,780 | B2 | 4/2014 | Gordon et al. |
| 9,002,973 | B2 * | 4/2015 | Panther ................. H04L 67/325 709/213 |
| 9,021,021 | B2 | 4/2015 | Backholm et al. |
| 9,024,972 | B1 | 5/2015 | Bronder et al. |
| 9,038,043 | B1 | 5/2015 | Fleetwood et al. |
| 9,088,665 | B2 | 7/2015 | Boyer et al. |
| 9,119,166 | B1 | 8/2015 | Sheikh |
| 9,361,320 | B1 | 6/2016 | Vijendra et al. |
| 9,397,836 | B2 | 7/2016 | Nixon et al. |
| 9,424,398 | B1 | 8/2016 | McLeod et al. |
| 9,430,114 | B1 | 8/2016 | Dingman et al. |
| 9,459,809 | B1 | 10/2016 | Chen et al. |
| 9,541,905 | B2 | 1/2017 | Nixon et al. |
| 9,558,220 | B2 | 1/2017 | Nixon et al. |
| 9,678,484 | B2 * | 6/2017 | Nixon ................... G05B 11/01 |
| 2002/0010694 | A1 | 1/2002 | Navab et al. |
| 2002/0035495 | A1 | 3/2002 | Spira et al. |
| 2002/0052715 | A1 | 5/2002 | Maki |
| 2002/0064138 | A1 | 5/2002 | Saito et al. |
| 2002/0128998 | A1 | 9/2002 | Kil et al. |
| 2002/0130846 | A1 | 9/2002 | Nixon et al. |
| 2002/0138168 | A1 | 9/2002 | Salonen |
| 2002/0149497 | A1 | 10/2002 | Jaggi |
| 2002/0169514 | A1 | 11/2002 | Eryurek et al. |
| 2003/0020726 | A1 | 1/2003 | Charpentier |
| 2003/0023795 | A1 | 1/2003 | Packwood et al. |
| 2003/0028495 | A1 | 2/2003 | Pallante |
| 2003/0061295 | A1 | 3/2003 | Oberg et al. |
| 2003/0083756 | A1 | 5/2003 | Hsiung et al. |
| 2003/0147351 | A1 * | 8/2003 | Greenlee ............... G05B 17/02 370/232 |
| 2003/0154044 | A1 | 8/2003 | Lundstedt et al. |
| 2003/0195934 | A1 | 10/2003 | Peterson et al. |
| 2004/0093102 | A1 | 5/2004 | Liiri et al. |
| 2004/0117233 | A1 | 6/2004 | Rapp |
| 2004/0153437 | A1 | 8/2004 | Buchan |
| 2004/0203874 | A1 | 10/2004 | Brandt et al. |
| 2004/0204775 | A1 | 10/2004 | Keyes et al. |
| 2004/0210330 | A1 | 10/2004 | Birkle |
| 2004/0230328 | A1 | 11/2004 | Armstrong et al. |
| 2004/0233930 | A1 | 11/2004 | Colby |
| 2005/0005259 | A1 | 1/2005 | Avery et al. |
| 2005/0062677 | A1 | 3/2005 | Nixon et al. |
| 2005/0080799 | A1 | 4/2005 | Harnden et al. |
| 2005/0130634 | A1 | 6/2005 | Godfrey |
| 2005/0164684 | A1 | 7/2005 | Chen et al. |
| 2005/0182650 | A1 | 8/2005 | Maddox et al. |
| 2005/0187649 | A1 | 8/2005 | Funk et al. |
| 2005/0213768 | A1 | 9/2005 | Durham et al. |
| 2005/0222691 | A1 | 10/2005 | Glas et al. |
| 2005/0264527 | A1 | 12/2005 | Lin |

(56) References Cited

U.S. PATENT DOCUMENTS

| | | |
|---|---|---|
| 2006/0031826 A1 | 2/2006 | Hiramatsu et al. |
| 2006/0064291 A1 | 3/2006 | Pattipatti et al. |
| 2006/0064472 A1 | 3/2006 | Mirho |
| 2006/0069717 A1 | 3/2006 | Mamou et al. |
| 2006/0087402 A1 | 4/2006 | Manning et al. |
| 2006/0168396 A1 | 7/2006 | LaMothe et al. |
| 2006/0200260 A1 | 9/2006 | Hoffberg et al. |
| 2006/0200771 A1 | 9/2006 | Nielsen et al. |
| 2006/0218107 A1 | 9/2006 | Young |
| 2006/0241792 A1 | 10/2006 | Pretlove et al. |
| 2006/0288091 A1 | 12/2006 | Oh et al. |
| 2007/0005266 A1 | 1/2007 | Blevins et al. |
| 2007/0038889 A1 | 2/2007 | Wiggins et al. |
| 2007/0067725 A1 | 3/2007 | Cahill et al. |
| 2007/0078696 A1 | 4/2007 | Hardin |
| 2007/0112574 A1 | 5/2007 | Greene |
| 2007/0130310 A1 | 6/2007 | Batke et al. |
| 2007/0132779 A1 | 6/2007 | Gilbert et al. |
| 2007/0139441 A1 | 6/2007 | Lucas et al. |
| 2007/0179645 A1 | 8/2007 | Nixon et al. |
| 2007/0185754 A1 | 8/2007 | Schmidt |
| 2007/0250292 A1 | 10/2007 | Alagappan et al. |
| 2007/0265866 A1 | 11/2007 | Fehling et al. |
| 2008/0040719 A1* | 2/2008 | Shimizu ............... G11B 20/18 718/102 |
| 2008/0065243 A1 | 3/2008 | Fallman et al. |
| 2008/0076431 A1 | 3/2008 | Fletcher et al. |
| 2008/0082180 A1 | 4/2008 | Blevins et al. |
| 2008/0082181 A1 | 4/2008 | Miller et al. |
| 2008/0082195 A1 | 4/2008 | Samardzija |
| 2008/0097622 A1 | 4/2008 | Forney et al. |
| 2008/0103843 A1 | 5/2008 | Goeppert et al. |
| 2008/0104189 A1 | 5/2008 | Baker et al. |
| 2008/0126352 A1 | 5/2008 | Case |
| 2008/0143482 A1 | 6/2008 | Shoarinejad et al. |
| 2008/0174766 A1 | 7/2008 | Haaslahti et al. |
| 2008/0182592 A1 | 7/2008 | Cha et al. |
| 2008/0209443 A1* | 8/2008 | Suzuki ............... G06F 11/3636 719/318 |
| 2008/0274766 A1 | 11/2008 | Pratt et al. |
| 2008/0288321 A1 | 11/2008 | Dillon et al. |
| 2008/0297513 A1 | 12/2008 | Greenhill et al. |
| 2008/0301123 A1 | 12/2008 | Schneider et al. |
| 2009/0049073 A1 | 2/2009 | Cho |
| 2009/0065578 A1* | 3/2009 | Peterson ............... G05B 19/048 235/382 |
| 2009/0070337 A1 | 3/2009 | Romem et al. |
| 2009/0070589 A1 | 3/2009 | Nayak et al. |
| 2009/0089359 A1 | 4/2009 | Siorek et al. |
| 2009/0112335 A1 | 4/2009 | Mehta et al. |
| 2009/0210814 A1 | 8/2009 | Agrusa et al. |
| 2009/0216341 A1 | 8/2009 | Enkerud et al. |
| 2009/0300535 A1 | 12/2009 | Skourup et al. |
| 2009/0319058 A1 | 12/2009 | Rovaglio et al. |
| 2009/0325603 A1 | 12/2009 | Van Os et al. |
| 2010/0036779 A1 | 2/2010 | Sadeh-Koniecpol et al. |
| 2010/0069008 A1 | 3/2010 | Oshima et al. |
| 2010/0076642 A1 | 3/2010 | Hoffberg et al. |
| 2010/0106282 A1 | 4/2010 | Mackelprang et al. |
| 2010/0127821 A1 | 5/2010 | Jones et al. |
| 2010/0127824 A1 | 5/2010 | Moschl et al. |
| 2010/0145476 A1 | 6/2010 | Junk et al. |
| 2010/0169785 A1 | 7/2010 | Jesudason |
| 2010/0185857 A1 | 7/2010 | Neitzel et al. |
| 2010/0190442 A1 | 7/2010 | Citrano, III et al. |
| 2010/0192122 A1 | 7/2010 | Esfahan et al. |
| 2010/0222899 A1 | 9/2010 | Blevins et al. |
| 2010/0262929 A1 | 10/2010 | Avery |
| 2010/0286798 A1 | 11/2010 | Keyes et al. |
| 2010/0290351 A1 | 11/2010 | Toepke et al. |
| 2010/0293019 A1 | 11/2010 | Keyes et al. |
| 2010/0293564 A1 | 11/2010 | Gould et al. |
| 2010/0305736 A1 | 12/2010 | Arduini |
| 2010/0318934 A1 | 12/2010 | Blevins et al. |
| 2011/0022193 A1 | 1/2011 | Panaitescu |
| 2011/0046754 A1 | 2/2011 | Bromley et al. |
| 2011/0071869 A1 | 3/2011 | O'Brien et al. |
| 2011/0115816 A1 | 5/2011 | Brackney |
| 2011/0130848 A1 | 6/2011 | Tegnell et al. |
| 2011/0140864 A1 | 6/2011 | Bucci |
| 2011/0144777 A1 | 6/2011 | Firkins et al. |
| 2011/0191277 A1 | 8/2011 | Agndez Dominguez et al. |
| 2011/0258138 A1 | 10/2011 | Kulkarni et al. |
| 2011/0276896 A1 | 11/2011 | Zambetti et al. |
| 2011/0276908 A1 | 11/2011 | O'Riordan |
| 2011/0295722 A1 | 12/2011 | Reisman |
| 2012/0004743 A1 | 1/2012 | Anne et al. |
| 2012/0005270 A1 | 1/2012 | Harding et al. |
| 2012/0010758 A1 | 1/2012 | Francino et al. |
| 2012/0011180 A1 | 1/2012 | Kavaklioglu |
| 2012/0011511 A1 | 1/2012 | Horvitz et al. |
| 2012/0029661 A1 | 2/2012 | Jones et al. |
| 2012/0038458 A1 | 2/2012 | Toepke et al. |
| 2012/0040698 A1* | 2/2012 | Ferguson ............... G05B 19/042 455/457 |
| 2012/0078869 A1 | 3/2012 | Bellville et al. |
| 2012/0095574 A1 | 4/2012 | Greenlee |
| 2012/0147862 A1 | 6/2012 | Poojary et al. |
| 2012/0163521 A1 | 6/2012 | Kirrmann et al. |
| 2012/0176491 A1 | 7/2012 | Garin et al. |
| 2012/0203728 A1 | 8/2012 | Levine |
| 2012/0230309 A1 | 9/2012 | Junk |
| 2012/0239164 A1 | 9/2012 | Smith et al. |
| 2012/0271962 A1 | 10/2012 | Ivanov et al. |
| 2012/0290795 A1 | 11/2012 | Dowlatkhah |
| 2012/0331541 A1 | 12/2012 | Hamilton, II et al. |
| 2013/0006696 A1 | 1/2013 | Louie et al. |
| 2013/0007223 A1 | 1/2013 | Luby et al. |
| 2013/0013523 A1 | 1/2013 | Herrera Campos |
| 2013/0029686 A1 | 1/2013 | Moshfeghi |
| 2013/0041479 A1 | 2/2013 | Zhang et al. |
| 2013/0086591 A1* | 4/2013 | Haven ............... G06F 9/44 718/102 |
| 2013/0095849 A1 | 4/2013 | Pakzad |
| 2013/0144404 A1 | 6/2013 | Godwin et al. |
| 2013/0144405 A1 | 6/2013 | Lo |
| 2013/0144605 A1 | 6/2013 | Brager et al. |
| 2013/0169526 A1 | 7/2013 | Gai et al. |
| 2013/0212129 A1 | 8/2013 | Lawson et al. |
| 2013/0214902 A1 | 8/2013 | Pineau et al. |
| 2013/0231947 A1 | 9/2013 | Shusterman |
| 2013/0265857 A1 | 10/2013 | Foulds et al. |
| 2014/0015672 A1 | 1/2014 | Ponce |
| 2014/0039648 A1 | 2/2014 | Boult et al. |
| 2014/0067800 A1 | 3/2014 | Sharma |
| 2014/0079297 A1 | 3/2014 | Tadayon et al. |
| 2014/0089504 A1 | 3/2014 | Scholz et al. |
| 2014/0123276 A1 | 5/2014 | Bush et al. |
| 2014/0136652 A1 | 5/2014 | Narayanaswami et al. |
| 2014/0164603 A1 | 6/2014 | Castel et al. |
| 2014/0172961 A1 | 6/2014 | Clemmer et al. |
| 2014/0189520 A1 | 7/2014 | Crepps et al. |
| 2014/0201244 A1 | 7/2014 | Zhou |
| 2014/0232843 A1 | 8/2014 | Campbell |
| 2014/0250153 A1 | 9/2014 | Nixon et al. |
| 2014/0267599 A1 | 9/2014 | Drouin et al. |
| 2014/0273847 A1 | 9/2014 | Nixon et al. |
| 2014/0274123 A1 | 9/2014 | Nixon et al. |
| 2014/0277593 A1 | 9/2014 | Nixon et al. |
| 2014/0277594 A1 | 9/2014 | Nixon et al. |
| 2014/0277595 A1 | 9/2014 | Nixon et al. |
| 2014/0277596 A1 | 9/2014 | Nixon et al. |
| 2014/0277604 A1 | 9/2014 | Nixon et al. |
| 2014/0277605 A1 | 9/2014 | Nixon et al. |
| 2014/0277607 A1 | 9/2014 | Nixon et al. |
| 2014/0277615 A1 | 9/2014 | Nixon et al. |
| 2014/0277616 A1 | 9/2014 | Nixon et al. |
| 2014/0277617 A1 | 9/2014 | Nixon et al. |
| 2014/0277618 A1 | 9/2014 | Nixon et al. |
| 2014/0277656 A1 | 9/2014 | Nixon et al. |
| 2014/0278312 A1 | 9/2014 | Nixon et al. |
| 2014/0280497 A1 | 9/2014 | Nixon et al. |
| 2014/0282015 A1* | 9/2014 | Nixon ............... G05B 11/01 715/733 |

(56) References Cited

U.S. PATENT DOCUMENTS

| | | | |
|---|---|---|---|
| 2014/0282227 | A1 | 9/2014 | Nixon et al. |
| 2014/0282257 | A1 | 9/2014 | Nixon et al. |
| 2014/0297225 | A1 | 10/2014 | Petroski et al. |
| 2014/0316579 | A1 | 10/2014 | Taylor et al. |
| 2014/0358256 | A1 | 12/2014 | Billi et al. |
| 2014/0359552 | A1 | 12/2014 | Misra et al. |
| 2015/0024710 | A1 | 1/2015 | Becker et al. |
| 2015/0067163 | A1 | 3/2015 | Bahnsen et al. |
| 2015/0106578 | A1 | 4/2015 | Warfield et al. |
| 2015/0172872 | A1 | 6/2015 | Alsehly et al. |
| 2015/0177718 | A1 | 6/2015 | Vartiainen et al. |
| 2015/0220080 | A1 | 8/2015 | Nixon et al. |
| 2015/0246852 | A1 | 9/2015 | Chen et al. |
| 2015/0261215 | A1 | 9/2015 | Blevins et al. |
| 2016/0098021 | A1 | 4/2016 | Zornio et al. |
| 2016/0098037 | A1 | 4/2016 | Zornio et al. |
| 2016/0098388 | A1 | 4/2016 | Blevins et al. |
| 2016/0098647 | A1 | 4/2016 | Nixon et al. |
| 2016/0132046 | A1 | 5/2016 | Beoughter et al. |
| 2016/0327942 | A1 | 11/2016 | Nixon et al. |

FOREIGN PATENT DOCUMENTS

| | | |
|---|---|---|
| DE | 19882113 T1 | 1/2000 |
| DE | 19882117 T1 | 1/2000 |
| EP | 0 335 957 A1 | 10/1989 |
| EP | 1 344 291 A1 | 9/2003 |
| EP | 1 414 215 A2 | 4/2004 |
| EP | 1 564 647 A2 | 8/2005 |
| EP | 1 912 376 A1 | 4/2008 |
| EP | 2 003 813 A1 | 12/2008 |
| EP | 2 112 614 A1 | 10/2009 |
| EP | 2 469 475 A1 | 6/2012 |
| EP | 1 344 291 B1 | 8/2012 |
| EP | 2 685 329 A1 | 1/2014 |
| EP | 2 801 939 A1 | 11/2014 |
| FR | 2 966 625 A1 | 4/2012 |
| GB | 2 336 977 B | 11/1999 |
| GB | 2 336 923 B | 6/2002 |
| GB | 2 403 028 A | 12/2004 |
| GB | 2 453 426 A | 4/2009 |
| GB | 2 512 984 A | 10/2014 |
| GB | 2 512 997 A | 10/2014 |
| JP | 08-234951 | 9/1996 |
| JP | 2001-512593 A | 8/2001 |
| JP | 2006-221376 A | 8/2006 |
| JP | 2007-536631 A | 12/2007 |
| JP | 2007-536648 A | 12/2007 |
| JP | 2009-140380 A | 6/2009 |
| JP | 2012-084162 A | 4/2012 |
| JP | 4-934482 B2 | 5/2012 |
| JP | 2014-116027 A | 6/2014 |
| WO | WO-02/50971 | 6/2002 |
| WO | WO-03/073688 A1 | 9/2003 |
| WO | WO-2005/083533 A1 | 9/2005 |
| WO | WO-2005/109123 A1 | 11/2005 |
| WO | WO-2009/046095 A1 | 4/2009 |
| WO | WO-2011/120625 A1 | 10/2011 |
| WO | WO-2012/022381 A1 | 2/2012 |
| WO | WO-2014/005073 A1 | 1/2014 |

OTHER PUBLICATIONS

Sunindyo et al., An event-based empirical process analysis framework, Sep. 2010, 1 page.*
Communication Relating to the Results of the Partial International Search, dated Jul. 11, 2014.
International Search Report and Written Opinion for Application No. PCT/US2014/030627, dated Sep. 11, 2014.
U.S. Appl. No. 13/784,041, filed Mar. 4, 2013.
U.S. Appl. No. 14/028,785, filed Sep. 17, 2013.
U.S. Appl. No. 14/028,897, filed Sep. 17, 2013.
U.S. Appl. No. 14/028,913, filed Sep. 17, 2013.
U.S. Appl. No. 14/028,921, filed Sep. 17, 2013.
U.S. Appl. No. 14/028,923, filed Sep. 17, 2013.
U.S. Appl. No. 14/028,964, filed Sep. 17, 2013.
U.S. Appl. No. 14/212,493, filed Mar. 14, 2014, "Distributed Big Data in a Process Control System".
Search Report for Application No. GB1513617.9, dated Jan. 21, 2016.
International Search Report and Written Opinion for Application No. PCT/US2015/053931, dated Jan. 26, 2016.
Krumeich et al., "Big Data Analytics for Predictive Manufacturing Control—A Case Study from Process Industry," IEEE International Congress on Big Data, pp. 530-537 (2014).
U.S. Appl. No. 14/212,493, entitled "Distributed Big Data in a Process Control System", filed Mar. 14, 2014, 61 pages.
"Control Loop Foundation—Batch and Continuous Processes", by Terrence Blevins and Mark Nixon, *International Society of Automation*, 2011, Chapter 7.
"ANSI/ISA-S5.4-1991 American National Standard Instrument Loop Diagrams" by Instrument Society of America, 1986, 22 pages.
U.S. Appl. No. 14/174,413, entitled "Collecting and Delivering Data to a Big Data Machine in a Process Control System", filed Feb. 6, 2014, 61 pages.
U.S. Appl. No. 13/784,041, entitled "Big Data in Process Control Systems", filed Mar. 4, 2013, 65 pages.
"IoT and Big Data Combine Forces," (2013). Retrieved from the Internet at: URL:http://wiki.advantech.com/images/7/73/iot2013_whitepaper.pdf.
Bryner, "Smart Manufacturing: The Next Revolution," Chemical Engineering Process (2012). Retrieved from the Internet at: URL:http://www.aiche.org/sites/default/files/cep/20121004a.pdf.
Building Smarter Manufacturing with the Internet of Things (IoT), (2014). Retrieved from the Internet at: URL:http://www.cisco.com/web/solutions/trends/iot_in_manufacturing_january.pdf.
Examination Report for Application No. GB1017192.4, dated May 28, 2014.
Examination Report for Application No. GB1017192.4, dated Sep. 5, 2013.
First Office Action for Chinese Application No. 201010589029.X, dated Dec. 10, 2013.
International Search Report and Written Opinion for Application No. PCT/US2015/020148, dated Jun. 18, 2015.
Notice of Reasons for Rejection for Japanese Application No. 2010-229513, dated Jul. 29, 2014.
Search Report for Application No. GB1017192.4, dated Feb. 15, 2011.
Search Report for Application No. GB1402311.3, dated Aug. 6, 2014.
Search Report for Application No. GB1403251.0, dated Aug. 8, 2014.
Search Report for Application No. GB1403407.8, dated Aug. 8, 2014.
Search Report for Application No. GB1403408.6, dated Aug. 8, 2014.
Search Report for Application No. GB1403471.4, dated Sep. 9, 2014.
Search Report for Application No. GB1403472.2, dated Aug. 22, 2014.
Search Report for Application No. GB1403474.8, dated Aug. 26, 2014.
Search Report for Application No. GB1403475.5, dated Sep. 3, 2014.
Search Report for Application No. GB1403476.3, dated Aug. 27, 2014.
Search Report for Application No. GB1403477.1, dated Aug. 28, 2014.
Search Report for Application No. GB1403478.9, dated Aug. 21, 2014.
Search Report for Application No. GB1403480.5, dated Aug. 28, 2014.
Search Report for Application No. GB1403615.6, dated Aug. 18, 2014.
Search Report for Application No. GB1403616.4, dated Sep. 1, 2014.

(56) References Cited

OTHER PUBLICATIONS

Smalley, "GE Invests in Project to Embed Predictive Analytics in Industrial Internet," (2013). Retrieved from the Internet at: URL:http://data-informed.com/de-invents-in-project-to-embed-predictive-analytics-in-industrial-internet/.

U.S. Appl. No. 14/506,863, filed Oct. 6, 2014, "Streaming Data for Analytics in Process Control Systems".

U.S. Appl. No. 14/507,252, filed Oct. 6, 2014, "Automatic Signal Processing-Based Learning in a Process Plant".

U.S. Appl. No. 62/060,408, filed Oct. 6, 2014, "Data Pipeline for Process Control System Analytics".

Woo, "Intel Drops a Big Data Shocker", downloaded from the Internet at: http://forbes.com/sites/bwoo/2013/02/27/intel-drops-a-big-data-shocker/?partner=ya dated Feb. 27, 2013.

Bassat et al., "Workflow Management Combined with Diagnostic and Repair Expert System Tools for Maintenance Operations," IEEE, pp. 367-375 (1993).

Search Report for Application No. GB1501042.4, dated Feb. 2, 2016.

Search Report for Application No. GB1517034.3, dated May 26, 2016.

Search Report for Application No. GB1517038.4, dated Mar. 22, 2016.

Examination Report for Application No. EP 14724871.0, dated Aug. 17, 2016.

Adrian et al., "Model Predictive Control of Integrated Unit Operations Control of a Divided Wall Column," Chemical Engineering and Processing: Process Information, 43(3):347-355 (2004).

Daniel et al., "Conceptual Design of Reactive Dividing Wall Columns," Symposium Series No. 152, pp. 364-372 (2006).

Dejanovic et al., "Conceptual Design and Comparison of Four-Products Dividing Wall Columns for Separation of a Multicomponent Aromatics Mixture," Distillation Absorption, pp. 85-90 (2010).

Dongargaonkar et al., "PLC Based Ignition System," Conference Records of the 1999 IEEE Industry Application Conference, 1380-1387 (1999).

Hiller et al., "Multi Objective Optimisation for an Economical Dividing Wall Column Design," Distillation Absorption, pp. 67-72 (2010).

International Preliminary Report on Patentability for Application No. PCT/US2014/030627, dated Sep. 15, 2015.

International Preliminary Report on Patentability for Application No. PCT/US2015/020148, dated Sep. 14, 2016.

Kiss et al., "A control Perspective on Process Intensification in Dividing-Wall Columns," Chemical Engineering and Processing: Process Intensification, 50:281-292 (2011).

Pendergast et al., "Consider Dividing Wall Columns," Chemical Processing (2008). Retrieved from the Internet at: URL:///http://www.chemicalprocessing.com/articles/2008/245/?show=all.

Sander et al., "Methyl Acetate Hydrolysis in a Reactive Divided Wall Column," Symposium Series No. 152, pp. 353-363 (2006).

Schultz et al., "Reduce Costs with Dividing-Wall Columns," Reactions and Separations, pp. 64-71 (2002).

Shah et al., "Multicomponent Distillation Configurations with Large Energy Savings," Distillation Absorption, pp. 61-66 (2010).

Thotla et al., "Cyclohexanol Production from Cyclohexene in a Reactive Divided Wall Column: A Feasibility Study," Distillation Absorption, pp. 319-324 (2010).

Tututi-Avila et al., "Analysis of Multi-Loop Control Structures of Dividing-Wall Distillation Columns Using a Fundamental Model," Processes, 2:180-199 (2014).

U.S. Office Action for U.S. Appl. No. 13/784,041 dated Apr. 6, 2015.

U.S. Office Action for U.S. Appl. No. 13/784,041, dated Feb. 26, 2016.

U.S. Office Action for U.S. Appl. No. 13/784,041, dated Oct. 15, 2015.

* cited by examiner

150

| | 155a | 155b | 155c | 155d |
|---|---|---|---|---|
| | AREA | VESSEL/LINE | TAG | OTHER INFO |
| | SURGE TANK | PIPE 132 | LT307 | |
| | | | LC307 | |
| | | | LV307 | |
| | | TANK 118 | TI118 | |
| | | PIPE 135 | LT308 | |
| | | | LC308 | |
| | | | LY308 | |
| | SPRAY TOWER 1 | PIPE 138a | LY308A | |
| | | PUMP 139a | FT310 | |
| | | | FC310 | |
| | | | FY310 | |
| | | | PT311 | |
| | | | PC311 | |
| | | TOWER 120a | TI120A | |

*FIG. 2A*

DETERMINING ASSOCIATIONS AND ALIGNMENTS OF PROCESS ELEMENTS AND MEASUREMENTS IN A PROCESS

CROSS REFERENCE TO RELATED APPLICATIONS

The present disclosure is related to U.S. patent application Ser. No. 13/784,041, entitled "BIG DATA IN PROCESS CONTROL SYSTEMS" and filed Mar. 3, 2013; U.S. patent application Ser. No. 14/174,413, entitled "COLLECTING AND DELIVERING DATA TO A BIG DATA MACHINE IN A PROCESS CONTROL SYSTEM" and filed Feb. 6, 2014; and U.S. patent application Ser. No. 14/212,493, filed Mar. 14, 2014 and entitled "DISTRIBUTED BIG DATA IN A PROCESS CONTROL SYSTEM", the entire disclosures of each of which are hereby expressly incorporated by reference.

TECHNICAL FIELD

The present disclosure relates generally to process plants and to process control systems, and more particularly, to determining process element alignment in process plants and process control systems.

BACKGROUND

Distributed process control systems, like those used in chemical, petroleum, industrial or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters, etc. to control one or more process executing within the process plant or system. Smart field devices, such as the field devices conforming to the well-known Fieldbus protocol may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system. For example, the controllers and the field devices control at least a portion of a process being controlled by the process plant or system.

Information from the field devices and the controller is usually made available over a data highway or communication network to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Process Management, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

In a process plant or process control system, when evidence of an abnormal condition or fault occurs (e.g., when an alarm is generated, or when a process measurement or actuator is found to have excessive variation), an operator, instrument technician or process engineer typically uses an analytics tool in combination with his or her knowledge of the process being controlled by the system and its flow path through the system to attempt to determine upstream measurements and process variables that may have contributed to the production of the evidence of the abnormal condition or fault. For example, an operator may use the DeltaV™ batch analytics product or another continuous data analytics tool to attempt to determine the contributions of various process variables and/or measurements to an abnormal or fault condition. Typically, an operator or user identifies candidate upstream factors (e.g., measurements, process variables, etc.) based on his or her knowledge of the process and provides these candidates to the analytics tool. Subsequently, these data analytics tools utilize principal component analysis (PCA) to determine which of the candidate upstream factors impact downstream predicted quality parameters. The process control systems that are currently commercially available typically do not provide information on the flow path through the process and associated measurements and actuators along this path, and instead rely on a human to input this information into analytics tools. Consequently, as the set of candidates that is input into the tool is filtered by a person, the list of candidates may be incomplete and/or erroneous, and may not be consistent from person to person.

Additionally, the architecture of currently known process control plants and process control systems is strongly influenced by limited controller and device memory, communications bandwidth and controller and device processor capability. For example, in currently known process control system architectures, the use of dynamic and static non-volatile memory in the controller is usually minimized or, at the least, managed carefully. As a result, during system configuration (e.g., a priori), a user typically must choose which data in the controller is to be archived or saved, the frequency at which it will be saved, and whether or not compression is used, and the controller is accordingly configured with this limited set of data rules. Consequently, data which could be useful in troubleshooting and process analysis is often not archived, and if it is collected, the useful information may have been lost due to data compression.

The limitations of currently known process plants and process control systems discussed above and other limitations may undesirably manifest themselves in the operation and optimization of process plants or process control systems, for instance, during plant operations, trouble shooting, and/or predictive modeling. For example, such limitations force cumbersome and lengthy work flows that must be performed in order to obtain data for troubleshooting and generating updated models, and even then, the troubleshooting results and models may be incomplete or not fully representative of the actual system, as the inputs to their generation rely on a particular operator's experience and knowledge.

"Big data" generally refers to a collection of one or more data sets that are so large or complex that traditional database management tools and/or data processing applications (e.g., relational databases and desktop statistic packages) are not able to manage the data sets within a tolerable amount of time. Typically, applications that use big data are transactional and end-user directed or focused. For example, web search engines, social media applications, marketing applications and retail applications may use and manipulate big data. Big data may be supported by a distributed database which allows the parallel processing capability of modern multi-process, multi-core servers to be fully utilized.

SUMMARY

Techniques, systems, apparatuses, and methods for automatically identifying potential sources of faults, abnormal operations, and/or variations in the behavior of process elements used to control a process in a process plant are disclosed. Generally, said techniques, systems, apparatuses, and methods automatically determine or define, without any user input, the alignment of process elements in a flow path of a process, e.g., a process element alignment map. The process elements included in the map comprise a plurality of control devices, process variables, measurements, and/or other process elements, each of which has an active role during run-time to control the process. Additionally or alternatively, said techniques, systems and methods automatically determine, without any user input and using the process element alignment map, one or more process elements that contribute to faults, abnormal operations, and/or variations in the behaviors of other process elements.

For example, systems, apparatuses, and/or techniques that are particularly configured to perform a method of determining sources of faults, abnormal operations, and/or variations in the behavior of process elements that are controlling a process are disclosed. The method includes receiving (e.g., manually or automatically) an indication of a target process element that is included in the plurality of process elements and at which faults, abnormal operations, and/or variations in behavior are observed or detected. The method also includes defining, based on the target process element and a plurality of diagrams of the process or of the process plant, at least a portion of a process element alignment map of the process. Additionally, the method includes determining, based on the process element alignment map, a set of process elements that are upstream, in the flow path of control of the process, of the target process element, and providing indications of the upstream process elements to a data analysis (e.g., data analytics) to determine a respective strength of an impact of each upstream process element on the behavior of the target process element. In particular, the set of inputs to the data analysis includes the indications of the upstream set of process elements and excludes any user-generated input. The method further includes determining, based on the respective strengths of impacts of the upstream set of process elements, at least a subset of the upstream set of process elements to be the one or more sources of a variation in the behavior of the target process element, and causing an indication of the one or more sources of the variation in the behavior of the target process element to be provided to a recipient application. The recipient application may be a user interface application or another application.

Systems, apparatuses, and/or techniques that are particularly configured for performing a method to automatically determine a process element alignment map of a plurality of process elements controlling at least a portion of a process in a process plant are disclosed. The method includes obtaining or extracting a set of data from a plurality of data sources. The plurality of data sources stores data descriptive and/or indicative of the plurality of the process elements, and the obtained or extracted data includes, for each of the plurality of process elements, a respective identification of the each process element and an indication of a respective physical location of the each process element in the process plant. The method further includes determining, based on the obtained or extracted set of data, the process element alignment map of the process, where the process element alignment map indicates, for each process element, the respective identification of the each process element and an indication of a respective order of the process element in the process element alignment map.

Systems, apparatuses, and/or techniques that are particularly configured for performing a method to automatically determine one or more sources of a fault, an abnormal operation, and/or a variation of a behavior of a target process element used in a process plant to control a process are disclosed. The method includes receiving an indication of the target process element (e.g., manually or automatically), and determining, using at least a portion of a process element alignment map, a subset of the plurality of process elements that are upstream of the target process element, where each upstream process element has a respective order in the process element alignment map that is ahead of or adjacent to the respective order of the target process element in the process element alignment map. Additionally, the method includes causing the set of upstream process elements to be used in a data analysis to determine respective impact delays for the upstream process elements, where a respective impact delay of a specific upstream process element corresponds to a time offset from a time at which a particular event occurs at the specific upstream process element to a time at which a change in the behavior of the target process element resulting from the occurrence of the particular event at the specific upstream process element occurs. The method further includes determining, based on the respective impact delays of the upstream process elements, at least a portion of the set of upstream process elements to be the one or more sources of the fault, abnormal operation, and/or variation of the behavior of the target process element, and providing, identifying, or indicating the one or more sources to one or more recipient applications.

BRIEF DESCRIPTION OF THE DRAWINGS

FIGS. 2A-2C each illustrates a different example format for presenting at least a portion of a process element alignment map of a process;

DETAILED DESCRIPTION

Figure 1:
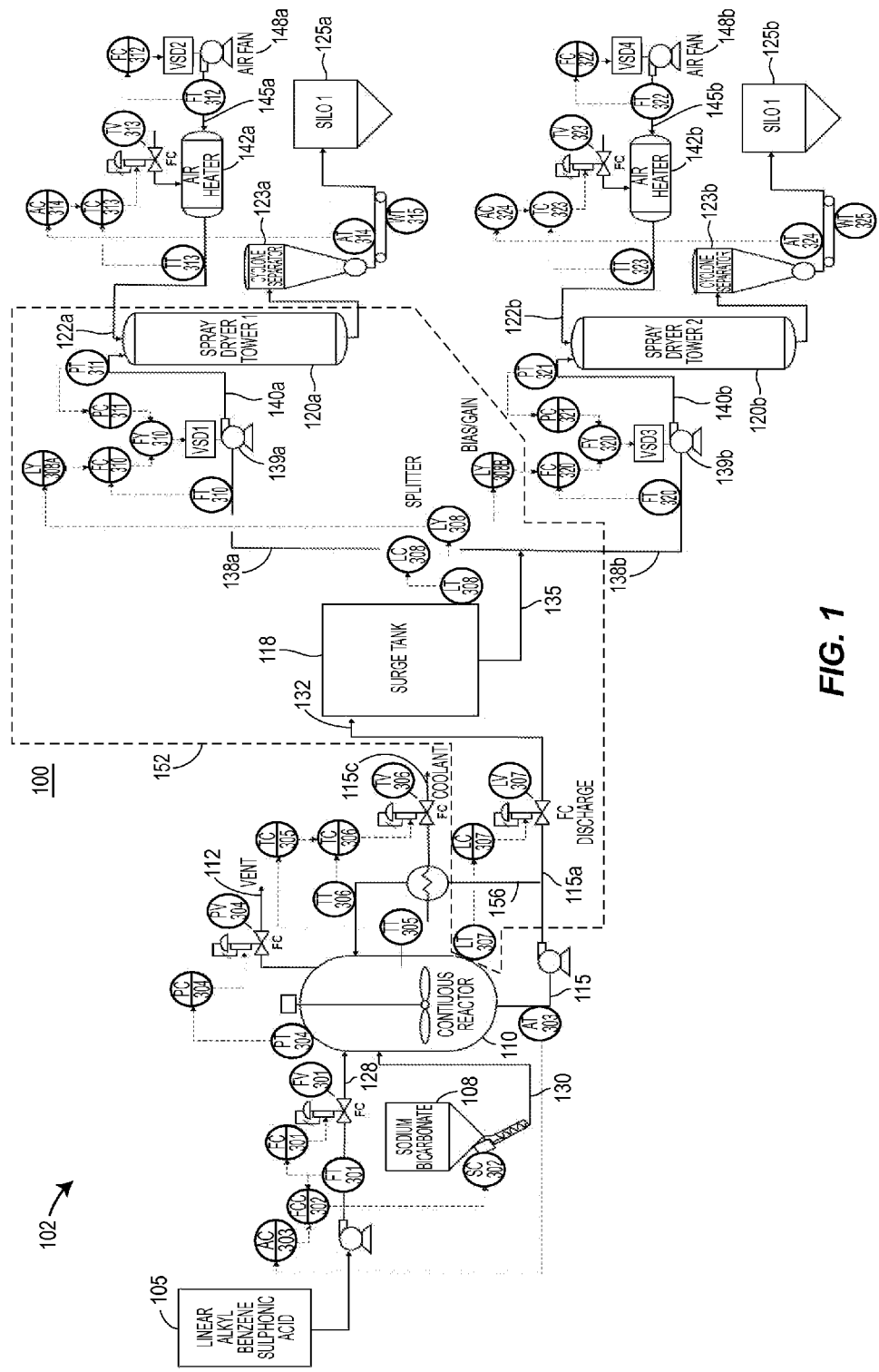
FIG. 1 illustrates an example set of primary process elements used to control an example process in a process plant or process control system.

Techniques, systems, and methods for automatically identifying potential sources of variation in and/or abnormal operation of process elements used to control a process in a process plant are disclosed herein. Generally, said techniques, systems and methods automatically determine or define, without any user input, a process flow path or process element alignment map of a process. Additionally or alternatively, said techniques, systems and methods automatically determine, again without any user input and using the process alignment map, one or more process elements that are sources of variation of behaviors of other process elements, as is explained below.

In currently known process control plants and systems, when evidence of an abnormal condition, variation or fault at a particular process element (e.g., a process device, a process variable, or a process measurement) occurs, typically an operator, instrument technician, or process engineer uses an analytics tool in combination with his or her knowledge of the process being controlled by the system to attempt to determine upstream measurements and process variables that may have contributed to the production of the evidence of the abnormal condition, variation or fault. Upon being alerted to the abnormal condition (e.g., by an alert or an alarm), an operator attempts to determine the cause of this condition by using an analytics tool and indications of measurements and/or process variables that he or she feels may be contributing to this condition. The analytics tool performs an analysis to determine the relative effects of the input measurements and/or process variables on the abnormal behavior of the particular or target process element, and the analytics tool provides information regarding the relative effects of the operator-indicated process elements to the operator so that he or she can further investigate the condition.

This approach may suffer from incompleteness, as well as from being cumbersome and requiring a relatively large amount of time to execute. For example, this approach is dependent on the particular operator's knowledge of the process, which may or may not be complete, thorough, or accurate. Accordingly, the information generated by the analytics tool may not reflect the actual source of the variation, and can be maximally only as accurate or correct as the data which was input by the operator.

On the other hand, the automatically determined process element alignment map disclosed herein indicates all process elements (e.g., a complete or comprehensive set of process variables, process measurements, process devices and/or other process elements) that have an active role during run-time to control the process during normal operations, e.g., by taking a measurement, performing a physical function or causing another element to perform a physical function, controlling a variable, providing a value to another process element to control a variable, generating dynamic data, receiving and operating on dynamic data, and the like. This complete or comprehensive set of process elements that have active roles in control of the process is generally referred to interchangeably herein as "primary sources" of process control, or as "primary process elements" or "primary control sources" of the process. For example, manipulated and controlled variables (e.g., as identified by tags or other identifiers) of a control routine that has been instantiated in a particular controller are primary sources of control of the process and as such, are indicated in the process element alignment map, whereas the yet-to-be-instantiated, user-generated configuration of the control routine that is produced at a user workstation is not a primary source of control of the process, as the yet-to-be-instantiated version of the configuration does not directly operate to control the process during run-time in the process plant. In other examples, indications of controlled variables, sensors, and valves are included in the process element alignment map, whereas indications of operator display views, diagnostic equipment, and auxiliary piping are excluded from the process element alignment map.

Typically, the process element map is automatically determined (e.g., determined without using or requiring any user input), for example, by extracting or obtaining identifications, physical locations within the process plant, and, optionally, other descriptive information of process elements from multiple data sources. The extracted or obtained data may then be automatically ordered to reflect the relative sequence of activation or active participation of the primary process elements to control the process during run-time. Thus, for each primary process element indicated in the process element alignment map, the map includes an indication of an order of participation or activation of that primary process element (e.g., with respect to an order of participation or activation of another primary process element) while the process is being controlled, and these relative orders or positions within the process element alignment map may be described or indicated accordingly. For example, a process element corresponding to a first valve that is controlled to release raw input materials into a tank for initial processing is ordered in the process element alignment map ahead of (e.g., is "upstream of") a process element corresponding to a second valve that is controlled to release the final product or output of the process into a holding area to await packaging. Conversely, the second valve is ordered after or is "downstream" of the first valve within the process element alignment map of the process.

To illustrate the concept of a process element alignment map of a process being controlled by a process plant or process control system, and the ordered participation of process elements included therein to control the process, FIG. 1 depicts a block diagram of primary process elements of an example process plant 100 that operates to control an example process 102 for producing powdered laundry detergent. In FIG. 1, the process elements used in controlling the process 102 are indicated by their respective tags, which represented in FIG. 1 using the convention of a circle enclosing a three-digit loop number and two or three leading letters that identify the process element's function. Some tags may also include one or more letters appended to the tag or loop number.

The example process 102 combines the raw materials linear alkyl benzene sulfonic acid 105 and sodium bicarbonate 108 in a reactor 110. The reaction produces soap, and also produces water and carbon dioxide as by-products. The chemical reaction may be represented by the expression:

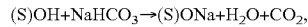

$$(S)OH + NaHCO_3 \rightarrow (S)ONa + H_2O + CO_2,$$

where (S) is the sulfonate group $HSO_2$. The carbon dioxide by-product is vented 112 from the reactor 110, and at least a portion 115a of the reactor discharge (which includes both soap and water) is transferred to a surge tank 118 for temporary storage. The surge tank 118 may be sized to serve as a buffer between different sections of the process plant 100, one section of which performs the chemical reaction in the reactor 110, and another section that processes the output of the chemical reaction in spray dryer towers 120a, 120b.

In the latter section of the process plant 100, the reactor discharge 135 stored in the surge tank 118 is sprayed 140a, 140b into the tops of one or both of the spray dryer towers 120a, 120b. As the discharge particles fall down the length of the towers 120a, 120b, the particles are exposed to respective hot streams of air 122a, 122b that cause moisture to be removed from the particles. The drier particles settle at the bottom of the spray dryer towers 120a, 120b and are separated, e.g., by using cyclone separators 123a, 123b. In the example process plant 100, any residual moisture remaining in the separated particles is detected and/or quantified for quality control, safety, and/or process control purposes. For example, residual moisture remaining in the particles after separation 123a, 123b may be detected respectively by weight sensors WT315 and WT325, and/or by moisture sensors AT314 and AT324. The separated particles, e.g., the powdered laundry detergent end-product produced by the process 102, are collected and stored in silos 125a, 125b, from which the end-product will eventually removed for packaging (not shown).

As shown in FIG. 1, at various points along the process element alignment map of the process 102, controllers execute respective algorithms to control respective portions of the overall process 102. For example, with regard to portions of the process 102 corresponding to the reactor 110, the loop 301 adjusts the flow rate 128 of linear alkyl benzene sulfonic acid 105 into the reactor 110. Specifically, in the loop 301, a controller FC301 (e.g., a flow controller) executes a respective control algorithm to control a valve FV301 to adjust the input flow rate 128, and a measurement device or sensor FT301 determines the output flow rate from the pump connected to the acid source 105, and provides an indication of the flow rate to the controller FC301 to use as an input to the control algorithm to determine the adjustment of the valve FV301. Another loop 302 controls the amount of sodium bicarbonate 130 provided to the reactor 110. Specifically, in the loop 302, a controller FFC302 executes a respective control algorithm to control the input amount of sodium bicarbonate based on the detected, measured, or sensed stream FT301 of the sulfonic acid and based on a detection, measurement, or sensing AT303 of any residual solids that are leftover from the reaction, e.g., solids that were not utilized in the reaction. The occurrence of residual solids may be caused by, for example, differing concentrations across different stocks or lots of input materials 105, 108.

With further regard to portions of the process 102 corresponding to the reactor 110, in the loop 304, a controller PC304 controls a valve PV304 to vent 112 the by-product carbon dioxide from the reactor 110. The controller PC304 adjusts the valve PV304 to vent more or less carbon dioxide based on a pressure of the reactor 110, e.g., as detected by pressure sensor PT304. Additionally, in the loop 307, an amount or level of reactants contained within the reactor 110 is controlled. For instance, a controller LC307 adjusts a valve LV307 based on a level or amount of reactants in the reactor 110, e.g., as measured or detected by sensor LT307, to change the flow rate of reactor discharge 132 (e.g., the soap and the water produced by the chemical reaction) into the surge tank 118, thus changing the level of reactants contained within the reactor 110. For example, if the level of reactants measured by sensor LT307 rises above a predetermined level, the controller LC307 may adjust the valve LV307 to increase the flow of reactor discharge 132 into the surge tank 118.

Further, the loops 305 and 306 allow the process 102 to monitor the temperature of the reactor discharge 115 as compared with the temperature of the reactants currently contained within the reactor 110. For example, the sensor TT305 measures the temperature of the reactants currently contained within the reactor, and the sensor TT306 measures a temperature of a portion 115b of the reactor discharge 115. Based on a comparison of these temperatures, controller TC306 executes a respective control algorithm to control a valve TV306 to shunt away more or less of the reactor discharge 115c for cooling purposes rather than returning the discharge 115b back to the reactor 110. In some cases (not shown), shunted reactor discharge 115c that has been sufficiently cooled may be returned to the reactor 110.

Turning now to the surge tank 118, in the loop 308, a sensor LT308 measures a level of reactor discharge contained within the tank 118, and based on the measured level, a controller LC308 controls a splitter LY308 to indicate a desired division of the output of the surge tank reactor discharge 135 across two spray dryer towers 120a, 120b, e.g., by indicating respective splits (e.g., bias and/or gain) LY308A and LY308B to the respective controllers FC310 and FC320 (e.g., flow controllers) respectively controlling the streams of reactor discharge provided to the dryers 120a, 120b and included in the loop 308 (e.g., streams 138a and 138b, respectively).

With specific regard to the spray dryer tower 120a, in the loop 310, the controller FC310 adjusts the flow rate of the reactor discharge spray 140a into the top of the tower 120a by executing a respective control algorithm that controls a variable speed drive VSD1 connected to a pump 139a. As discussed above, controller FC310 receives an indication of a desired or target portion of the surge tank reactor discharge 135 (e.g., as indicated by LY308A) that is to be provided to the tower 120a, and utilizes this target or setpoint LY308A in combination with an actual detected, measured, or sensed portion 138a of the surge tank output 135 (e.g., as detected by sensor FT310) to determine a suitable control signal to provide to the VSD1 for controlling the pump 139a.

With further regard to control of portions of the process 102 that correspond to the spray dryer tower 120a, in the loop 313, a controller TC313 executes a respective control algorithm to control an air heater 142a (e.g., a gas air heater or other suitable type of heater) to vary the temperature of the hot air stream 122a into the tower 120a. As shown in FIG. 1, the control algorithm executed by controller TC313 receives, as inputs, an indication of a quantity of detected moisture included in the end-product (e.g., a quantity or ratio of detected moisture as detected by sensor AT314) and an indication of a temperature of an actual, real-time flow of hot air 122a into the tower 120a (e.g., as detected by sensor TT313). Based on the received inputs, the controller TC313 adjusts an amount of gas, fuel or other energy provided to the heater 142a (e.g., by controlling valve TV313), thus controlling the actual temperature of the hot air 122a generated by the heater 142a and provided to the tower 120a. In another loop 312, another controller FC312 executes a respective control algorithm to control a variable speed drive VSD2 to adjust the volume of air 145a provided to the air heater 142a. For example, based on a measured actual volume of air generated by an air fan 148a (e.g., as detected by sensor FT312) and based on a desired production rate of the powdered laundry detergent, the controller FC312 determines an adjustment to control the volume of air provided by the air fan 148a to the heater 142a, and provides an indication of this adjustment to the variable speed driver VSD2. The desired production rate may be configured into the control algorithm executed by the controller FC312, or may be provided to the controller FC312 as an additional input, either manually or automatically (not shown).

Occasionally, the spray dryer tower 120a may become less than optimally operable. The process 102 detects and mitigates this undesirable situation by using the loop 311 to sense a pressure of the spray tower 120a, e.g., by using pressure sensor PT311 and providing the sensed pressure as an input to a controller PC311. The controller PC311 executes a respective control algorithm which will send a signal to override the control signal to the driver VSD1 that drives the pump 139a. For example, the controller PC311 may send an override signal to the control selector FY310 when the sensed pressure reaches a particular threshold (and in some cases, has been sustained at this threshold over a defined duration of time), or the controller PC311 may continuously send a signal indicative of the sensed pressure to the selector FY310. The control selector FY310 selects the VSD1 control signal generated by controller FC310 or the override signal generated by the controller PC311, and provides an indication of the selected input to the variable speed drive VSD1 to control the flow of reactor discharge 140a provided to the spray dryer tower 120a. For example, the control selector FY310 may default to providing the flow control signal generated by controller FC310 to the drive VSD1, and may switch to providing the override signal generated by the controller PC311 to the drive VSD1 when the override signal is generated, when the override signal is above or below a certain threshold, and/or when the override signal has been above or below the threshold for a predetermined amount of time. In some situations, the control selector FY310 may cause an alarm or other alert to be generated. In some embodiments, the control selector FY310 may cause the splitter LY308, LY308A, LY308B to divert a higher (or lower) proportion of the surge tank output 135 to the other spray tower 120b.

It is noted that while the above discussion focuses primarily on the spray dryer tower 120a, the spray dryer tower 120b includes controllers, sensors, and other equipment and entities similar to those discussed for the spray dryer tower 120a, and may operate in a similar manner as the spray dryer tower 120a. In FIG. 1, the equipment and other entities corresponding to spray dryer tower 120b are denoted by the same reference numbers as used for the spray dryer tower 120a, but said reference numbers are appended with a "b" suffix instead of an "a" suffix.

In view of the above, the process element alignment map of the process 102 as shown in FIG. 1 generally occurs, moves, flows, or is ordered from left to right, e.g., from obtaining the input raw materials from sources 105, 108, to processing the raw materials in the reactor 110, to processing the reacted materials in the spray dryer towers 120a, 120b, to storing the end product 125a, 125b. Accordingly, terms that indicate the relative orders of the process elements that actively participate in controlling the process 102 in real-time are used herein. As an example, as used herein, the term "upstream process elements" refers to primary process elements that generally have an earlier, active participation in controlling the process in real-time, and the term "downstream process elements" refers to primary process elements that generally have a later, active participation in controlling the process. For instance, combining the reactants 105, 108 in the reactor 110 occurs upstream of drying the reactor discharge 135 in the spray dryer towers 120a, 120b. As such, the process elements participating in controlling the release of reactants 105, 108 into the reactor 110 (e.g., process elements AT303, AC303, FFC302, FT301, FC301, FV301, and SC302) are upstream of (or ordered in front of or before) the process elements participating in controlling the rate of drying in a spray dryer tower (e.g., process elements TT313, AC314, TC313, TV313, FT312 and FC312 for spray dryer tower 120*a*). Storing the end product in the silos 125*a*, 125*b* occurs downstream of splitting the surge tank discharge 135. Thus, the process elements AT314 and WT315 are downstream of (or ordered after) the process elements LT308, LC308 and LY308 in the process element alignment map.

In some cases, a relative order of a particular process element may be equivalent to the relative order of another particular process element. For example, the valve FV301 controlling the release of acid flow into the reactor 110 is ordered, in the process alignment map, adjacent to the speed/frequency process element SC302 that controls the release of sodium bicarbonate into the reactor 110.

The process element alignment map may be represented, e.g., at a user interface, in any suitable format. FIG. 2A illustrates, in an example table format 150, a portion of an example process element alignment map representation corresponding to the portion 152 of the process 102 indicated by the dashed area 152 in FIG. 1. In the embodiment shown in FIG. 2A, the flow or progression of the process 102 moves from top to bottom of the table 150, so that the process elements indicated near the top of the table 150 generally are upstream of process elements indicated near the bottom of the table 150. In other embodiments, though, the progression of the process 120 may be ordered in the table format 150 from bottom to top, from left to right, or in any other desired direction.

Specifically, the table format 150 includes an ordering or alignment of process elements by area (reference 155*a*), e.g., the area corresponding to the surge tank 118 is indicated as being upstream of the area corresponding to the spray dryer tower 1 (reference 120*a*). Within each area, the order or alignment of vessels and lines associated with the area is indicated (reference 155*b*) in the table 150. For example, within the area of the surge tank 118, the pipe 132 is shown as being upstream of the tank 118 which, in turn, is upstream of the pipe 135. Additionally, for each vessel or line, an ordering or alignment of primary process elements that actively participate in controlling the process 102 is indicated (reference 155*c*) in the table 150, e.g., by using their respective tags or defined identifiers. For example, the flow through the pipe 132 is controlled by the loop 307 including the process elements LT307, LC307 and LV307.

The table 150 may optionally include or provide links or references to any additional information 155*d* that is descriptive of a particular area 155*a*, vessel or line 155*b*, and/or process element 155*c*. For example, the other information 155*d* may include, for any primary process elements 155*c* that are physical devices such as valves, sensors, and other field devices, an image of the device, a model and/or serial number, and/or an indication of an absolute physical location of the physical device within the process plant (e.g., by using global positioning satellite (GPS) coordinates or other suitable location identifier).

Figure 2B:
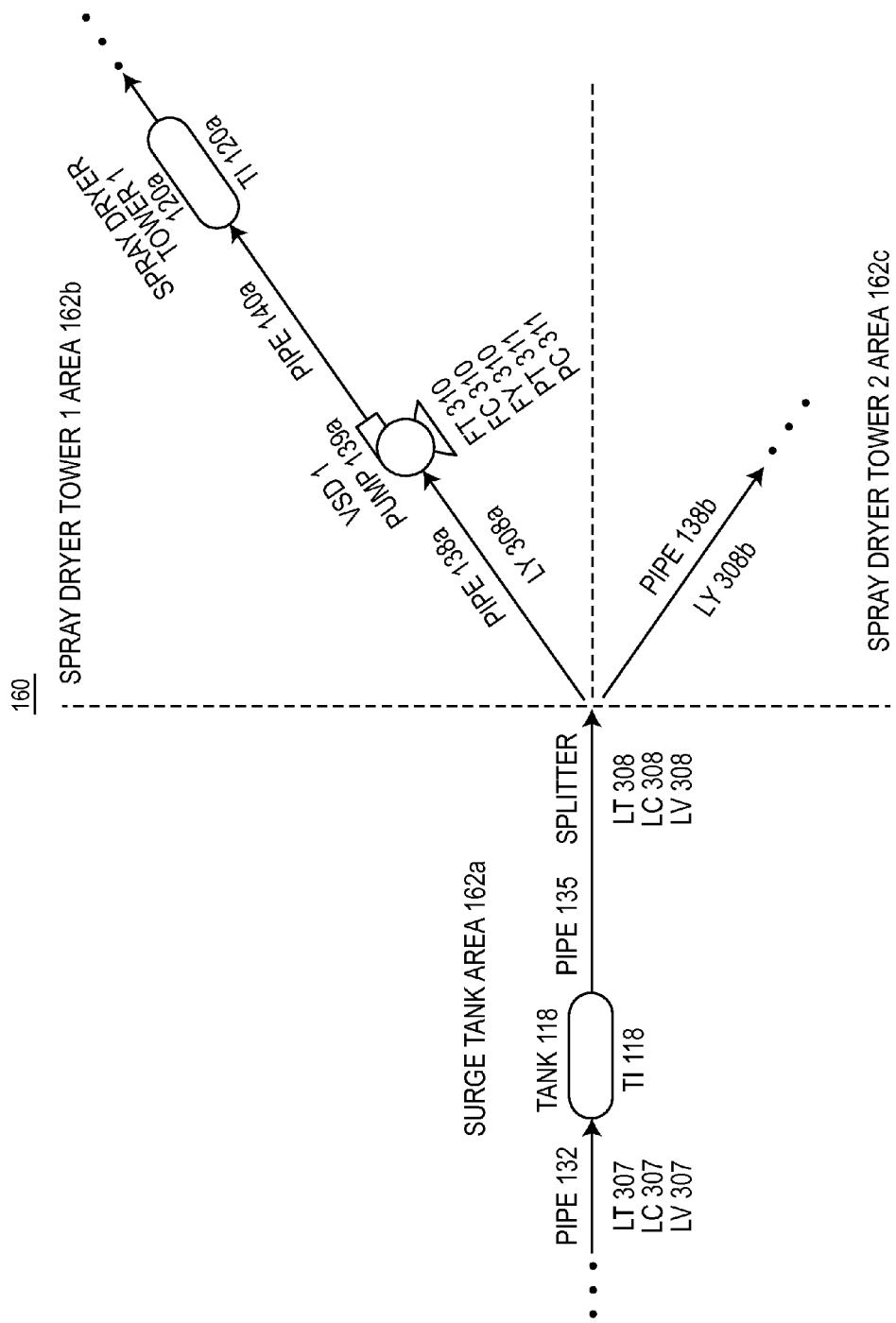

FIG. 2B illustrates, in an example graph or graphic format 160, a portion of an example process element alignment map representation corresponding to the portion 152 of the process 102. In the embodiment shown in FIG. 2B, the flow or progression of the process 102 moves from left to right, so that the process elements indicated nearer to the left of the graph 160 generally are upstream of process elements indicated nearer to the right of the graph 160. In other embodiments, though, the progression of the process 120 may be ordered from right to left, from bottom to top, or in any other desired direction. In the graph format 160, surge tank area 162*a*, spray dryer tower area 1 (reference 162*b*), and spray dryer tower area 2 (reference 162*c*) are separated by dashed lines and respectively labeled. Vessels and equipment are represented by graphical shapes, and lines or pipes are represented by directional vectors or lines indicating the directional flow of materials (which, in some cases, may be intermediate materials) through the controlled process 102. Identifiers of process elements that respectively are associated with or correspond to specific vessels and lines are positioned proximate to the graphic of the specific vessel or line. For example, the graph 160 indicates that, in the surge tank area 162*a*, intermediate materials flow through the pipe 132 to be received by the surge tank 118, and this flow of the materials into the surge tank 118 is controlled by the process elements LT307, LC307 and LV307 of the loop 307. It is understood that although graphical shapes and arrows are used as conventions in the format 160, any desired directed graph symbols and representations may be additionally or alternatively utilized in graph or graphic formats 160.

Figure 2C:
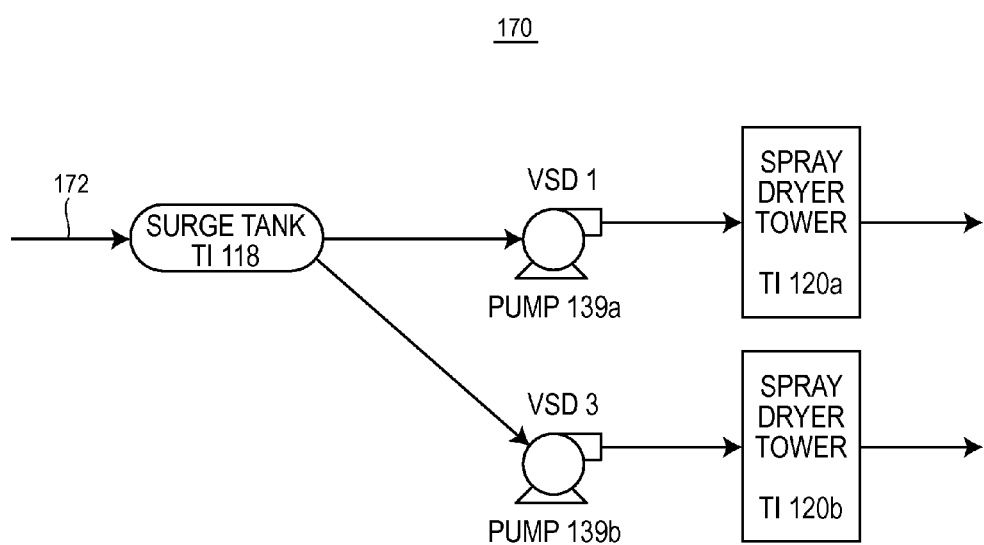

Referring to FIG. 2C, in another example format 170, nested views of a process element alignment map representation that include active links or user controls is provided on a user interface. A top or initial view 170 indicates the alignment or flow of the portion 152 of the process 102 through various areas of the process plant (e.g., from the surge tank 118 to the spray dryer tower 1 (reference 120*a*) and to the spray dryer tower 2 (reference 120*b*) using graphical shapes and arrows, although any desired convention may be additionally or alternatively used to represent process elements and flows in the format 170, such as selectable text. In the example format 170, if a user selects the graphic of the line 172 and/or the surge tank 118 graphic, a subsequent view that includes details of the selected items (and optionally, surrounding items) may be displayed. For example, upon selection of the graphic of the line 172 and/or the surge tank 118 graphic of FIG. 2C, the area surge tank graphic 162*a* of FIG. 2B including selectable elements thereon may be displayed. If the user then selects a particular graphic or identifier included in the area surge tank graphic 162*a*, still additional nested information may be displayed. For example, if the user selects the identifier LT307 on the area surge tank graphic 162*a* of FIG. 2B, a pop-up window including an image of the physical sensor device and/or a GPS coordinate of the particular sensor within the process plant may be displayed. Additionally or alternatively, other information associated with LT307 may be displayed.

The table format 150, the graph format 160, and the nested view format 170 are only examples of possible formats in which at least portions of the process element alignment map may be presented, e.g., at a user interface. Any desired or suitable format may be utilized for presentation of some or all of the process element alignment map.

Furthermore, any desired or suitable format for storing the process element alignment map may be utilized. For example, an indication of a particular process element used for controlling the process 102 in real-time may be stored in a database (or in some other suitable data storage format) along with an indication of the relative order of the particular process element in the process alignment map to one or more other process elements used for controlling the process 102 in real-time. In some scenarios, metadata corresponding to the particular process element is also stored. For example, an image of the particular process element, an indication of its physical location within the process plant, and/or a link to these and/or other identifying or descriptive information of the particular process element may be stored as metadata corresponding to the particular process element in the process element alignment map. The process element map may be stored in any desired or suitable data storage entity or plurality thereof that is communicatively connected a communication network of the process plant. A detailed description of said storage is provided in a later section.

Figure 3:
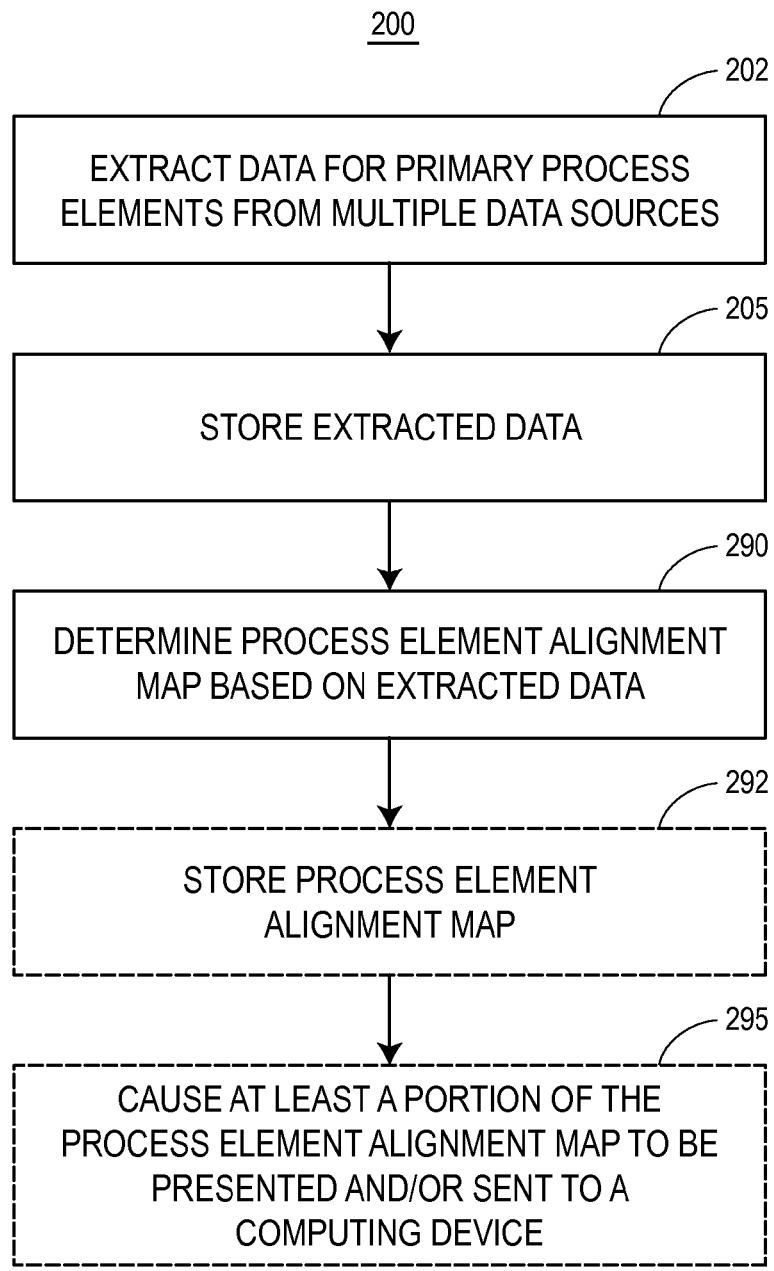
FIG. 3 is a flow diagram of an example method for automatically determining at least a part of a process element alignment map of a process.

The techniques, methods and systems described herein may be specifically and particularly configured to automatically create a process element alignment map or portion thereof. To illustrate, FIG. 3 illustrates an example method 200 for automatically determining a process element alignment map of a plurality of process elements used, in real-time or run-time, to control at least a portion of a process in a process plant. In an embodiment, the method 200 is performed at least in part by an apparatus or system (e.g., one or more computing devices) particularly configured with computer-executable instructions stored on one or more tangible, non-transitory computer-readable media that, when executed by one or more processors, cause the apparatus to perform one or more portions of the method 200. It is noted that although the method 200 creates a process element alignment map for a particular process flow within a process plant, the process plant may support multiple independent flows, each of which may have a respective process element alignment map. For example, a process plant may include a material feed flow, a hydrogen flow, and a steam flow. In some process plants, multiple independent flows may combine into an integral flow further downstream.

In any event, the method 200 includes extracting, procuring, or otherwise obtaining a set of data from a plurality of data sources storing and/or providing data descriptive of the plurality of the process elements (block 202) of the process plant. The plurality of process elements are primary process elements of the process, and includes a plurality of devices (e.g., wired or wireless field devices, controllers, input/output (I/O) devices, and other control devices), a plurality of process variables, a plurality of measurements or sensed conditions, and other process elements. Each of the plurality of primary process elements is a primary source of process control within the process plant, e.g., is directly used, in real-time or during run-time, to control the process. Additionally, the obtained set of data includes, for each of the plurality of primary process elements, a respective identification of the each process element and an indication of a respective physical location of the each process element in the process plant.

The plurality of data sources from which the data is obtained 202 collectively stores and/or provides the respective identification of the each process element and an indication of the respective physical location of the each process element in the process plant, but typically a single data source included in this plurality of data sources is not suitable as a lone or only source of data for defining the process element alignment map. For example, some sources do not individually have the complete or comprehensive set of data for all of the plurality of primary process elements, or do not even indicate the entire set of the primary process elements. Some sources include other data that is superfluous to primary process control, and thus, if used in a data analysis, would significantly increase the time and resources required to determine sources of variation of process elements.

In the method 200, the plurality of data sources from which the data is extracted, procured or obtained 202 includes multiple, different types of data sources, such as one or more process flow diagrams (PFDs), Piping and Instrumentation Diagrams (P&IDs), loop diagrams, operator display views, streamed data, and/or other data sources. Examples of some of these different types data sources is provided in each of FIGS. 4A-4D. As will be discussed, as illustrated in these examples, it is evident how each different type of data source is not individually suitable as the only source for defining the process element alignment map.

Figure 4A:
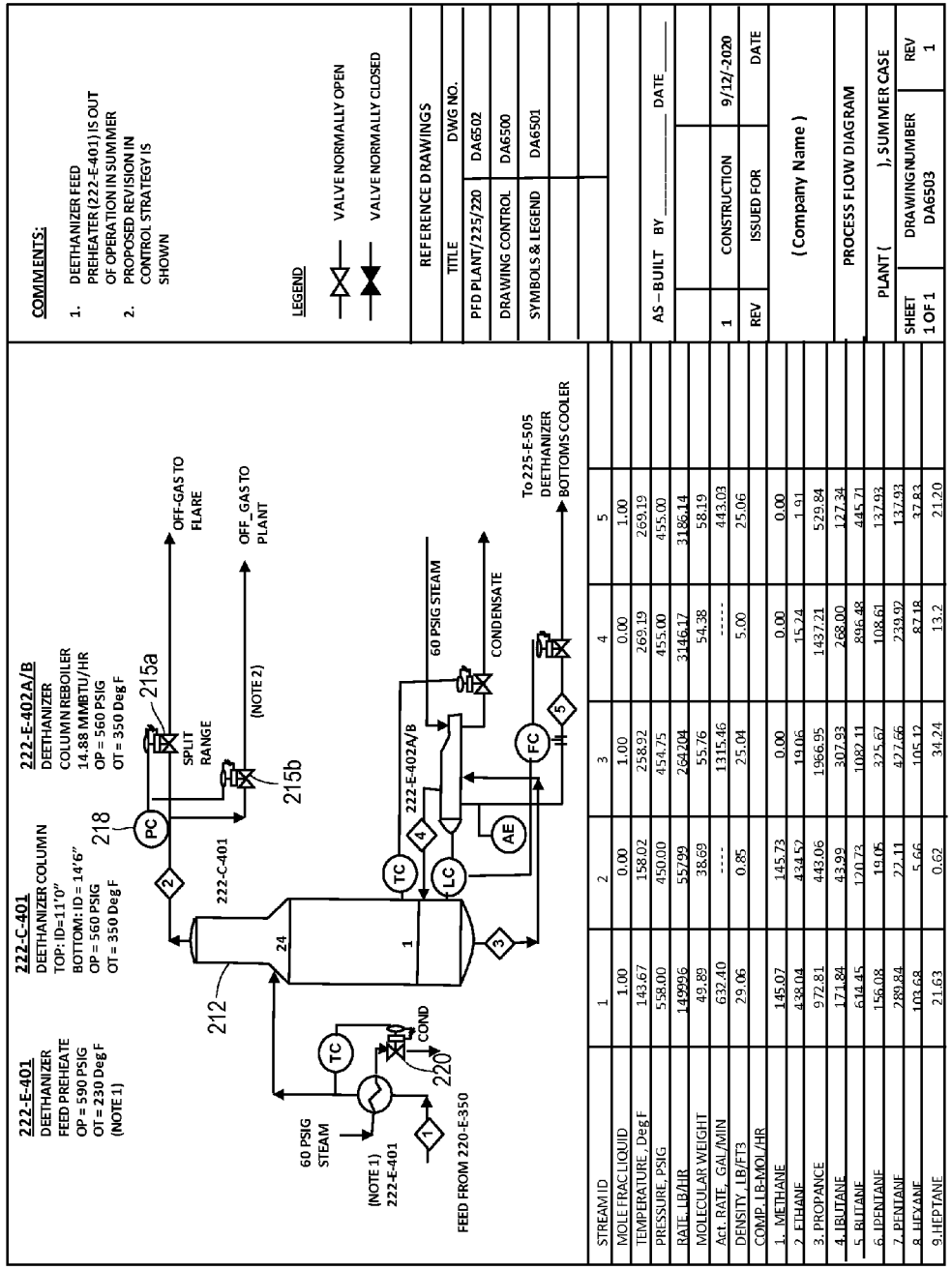
FIGS. 4A-4D each illustrate a different example type of data source from which a process element alignment map is able to be determined.

Specifically, FIG. 4A is an illustration of a process flow diagram (PFD) 210 of a portion of an example process in which a de-ethanizer column 212 separates ethane from a gas. PFDs are generally utilized for designing a process and, as such, PFDs typically only indicate the general piping or flows between a subset of the primary process elements (e.g., the major pieces of equipment in a plant) for expected, normal operating conditions. PFDs, though, typically do not show all transmitters and regulating valves that are required in implementation to control the process during different operating conditions. For example, the PFD 210 does not include any regulating process elements that monitor or detect whether or not one or more of the downstream valves 215a, 215b is sticking or is plugged, and that control the splitter 218 or the input control valve 220 accordingly.

Figure 4B:
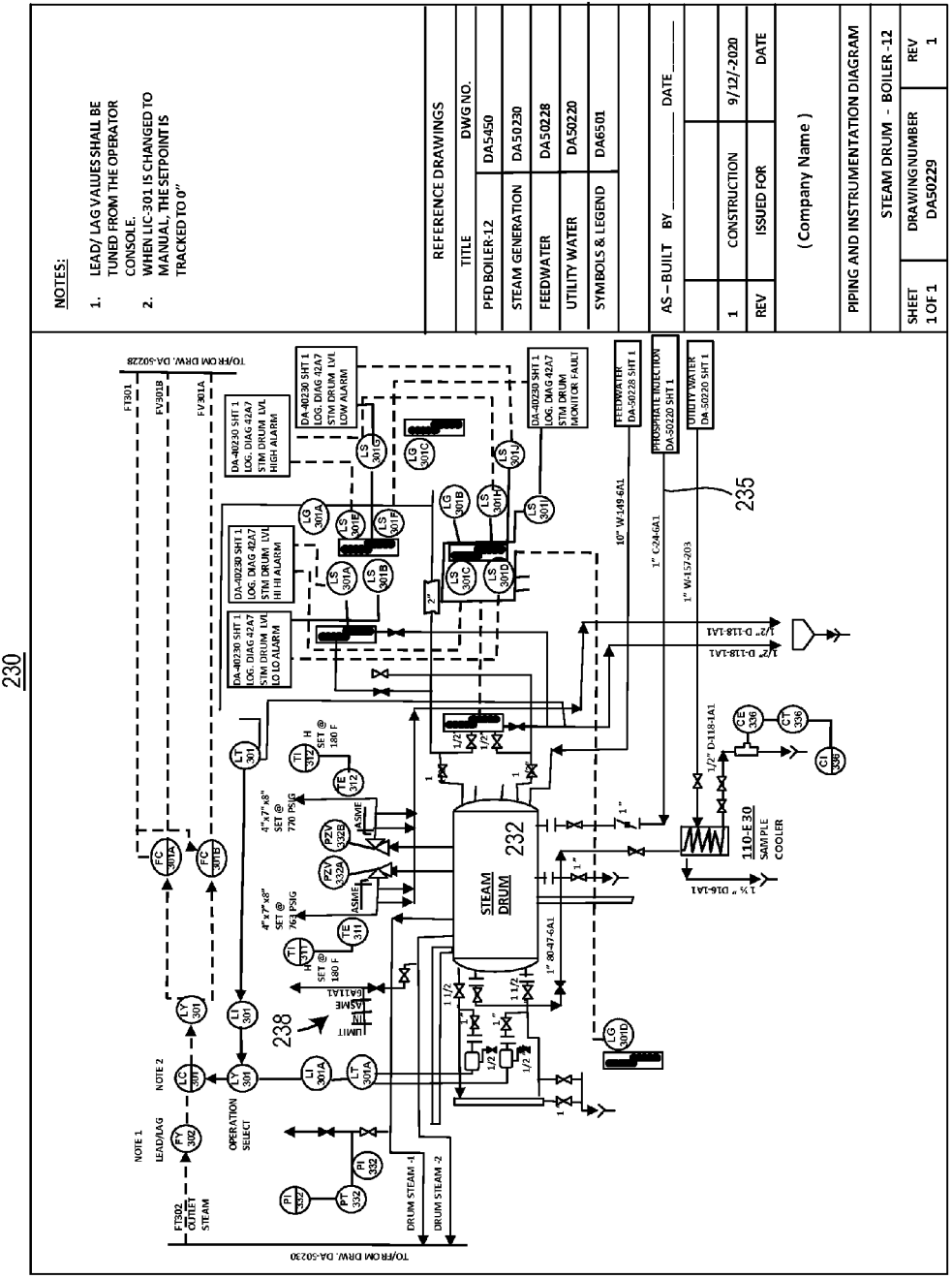

FIG. 4B is an illustration of a Piping and Instrumentation (P&ID) diagram 230 of a portion of an example process in which steam is provided from a steam drum 232. P&IDs are generally created from PFDs, and thus include the primary piping and primary process elements, but also include numerous other elements that are not primary elements, such as local/field indicators, auxiliary valves and piping, and/or manually operated block valves that are not connected or used in control of the process. For example, in the P&ID 230 of FIG. 4B, numerous primary process elements are shown (e.g., process elements of the loop 301 having tags LC301, LY301, LT301, LI301 to control steam that is output from the drum 232). However, the P&ID 230 also includes other elements that are not primary process elements, such as the phosphate injection mechanism 235 to mitigate scale adhesion and corrosion of the steam drum 232, and the field instrumentation 238. If such non-process control-affecting, extraneous elements were to be included in a data analysis used to determine sources of variation within the process, numerous inefficiencies in processing time and costs to perform the analysis would be introduced. Further, in addition to including extraneous elements which may add to analysis inefficiencies, in some situations, a P&ID may not even include sufficient primary process element information. In particular, while P&IDs may include indications of closed loop control (e.g., automatic regulation of the inputs to a process based on a measurement of an output of the process), details of the closed loop control implementation are typically not included in P&IDs.

Figure 4C:
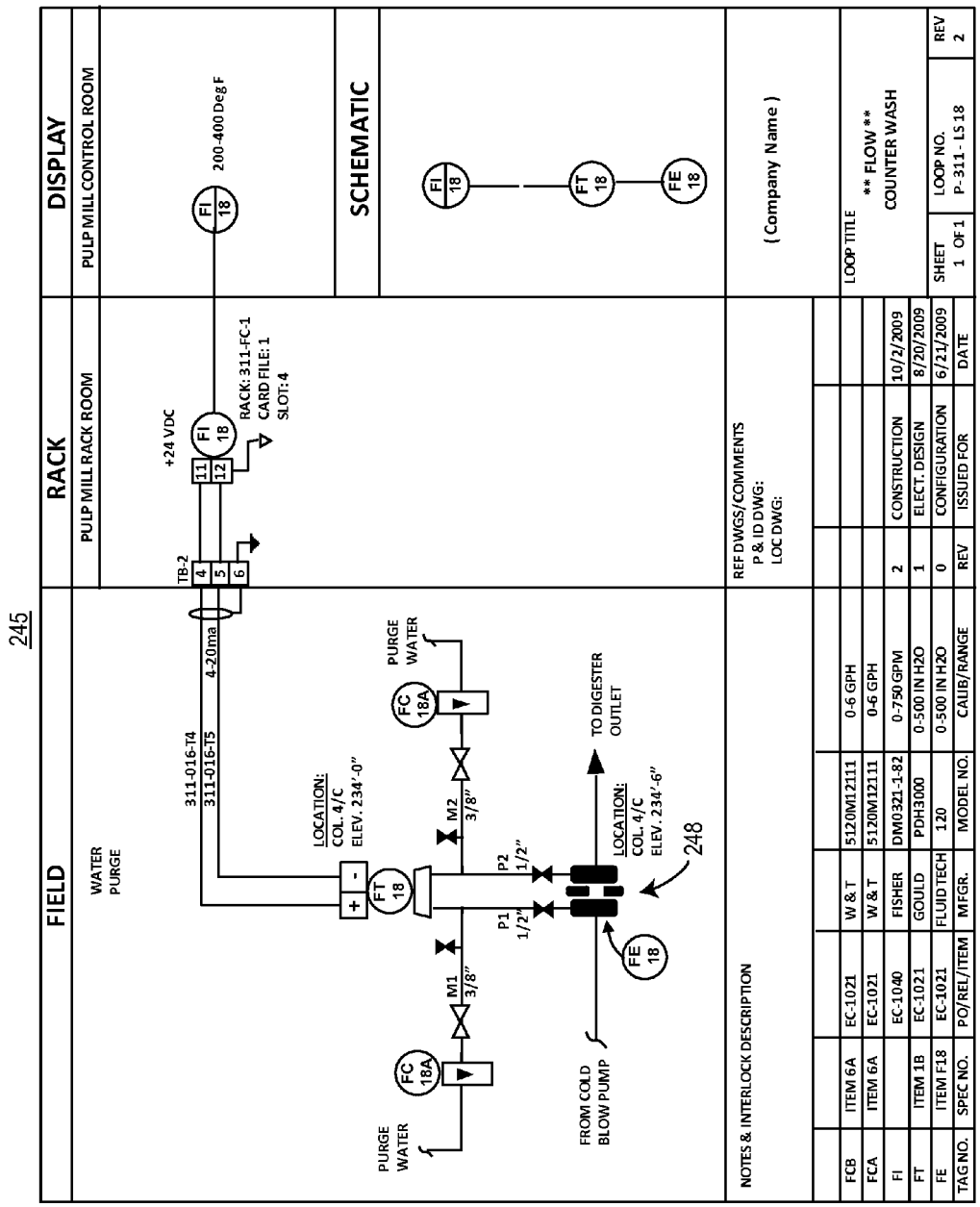

FIG. 4C is an illustration of a loop diagram 245 of a portion of an example process in which is used in a pulp mill. Loop diagrams generally provide detailed information that is needed to install or troubleshoot a measurement and/or a valve or other device that performs some function to control the process. The measurement and/or devices typically are assigned the same loop number (i.e., in FIG. 4C, the loop 18), and the loop diagram for the loop number includes indications of the devices, wiring, junction block termination, and other installation details. However, loop diagrams usually do not indicate how the measurements and/or devices depicted therein relate or are connected to other portions of the process, and in some cases, do not contain any definitions of how these measurements and devices are used to control the process. For example, the loop diagram 245 shows a flow measurement made by measuring the differential pressure across an orifice plate 248 (e.g., by using process elements having tags FE18, FT18 and FI18 of the loop 18), and the orifice plate 248 is sized to give a specific pressure drop at a maximum flow rate of the process. However, the loop diagram 245 does not indicate if and how the detected differential pressure affects other portions of the pulp mill process. That is, the loop diagram 245 does not indicate which other loops to which the loop 18 connects to control the process, or how the pulp mill process is controlled based on the detected differential pressure FT18 either at the maximum flow rate or at any other flow rate. Accordingly, a loop diagram generally does not provide sufficient (if any) alignment information between primary process elements across different loops to enable the determination of actual primary process element alignment.

Figure 4D:
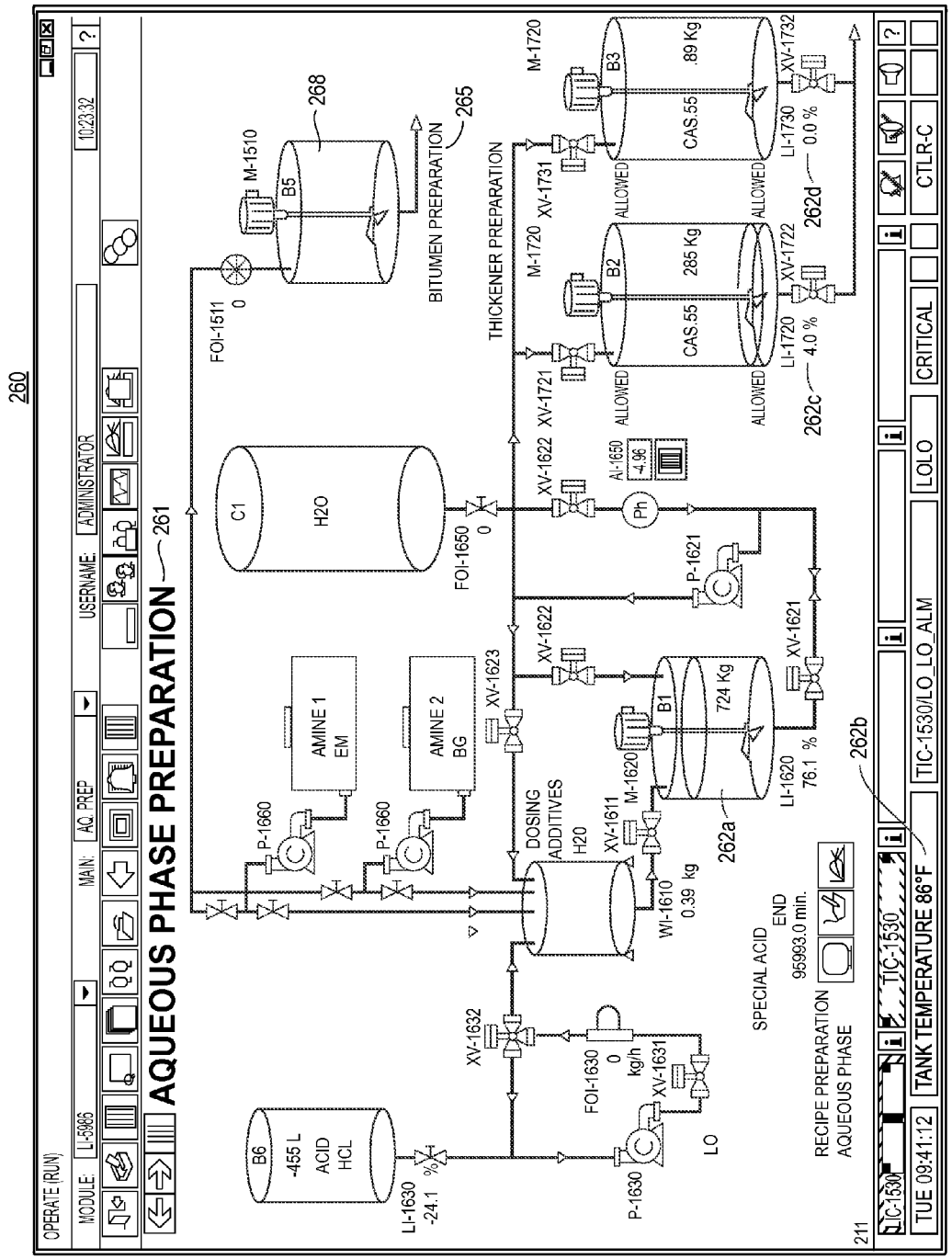

Other possible data sources that may be used by the method 200 are operator display views, such as the example operator display view 260 depicted in FIG. 4D. As generally understood, an operator display view typically is configured to provide dynamic and/or static information regarding the process and/or the process plant at a user interface. For example, the operator display view 260 is a display view that provides an operator the ability to monitor in real-time the performance of an aqueous phase preparation stage 261 in a batch process, and as such, the display view 260 provides some information regarding indications of raw material sources, tanks, valves, dryers, and the like along the primary flow path of the process. The operator display view 260 also provides dynamic graphics that indicate, in real-time, changing values of the stage 261, e.g., how much material is in a particular tank 262*a*, current tank temperature 262*b*, flow rates 262*c*, 262*d*, etc. However, as seen in FIG. 4D, operator display views typically do not provide sufficient (if any) alignment information between all primary process elements that are included in the area of the plant shown in the view, and operator display views typically do not provide sufficient (if any) alignment information across multiple views to enable the determination of actual primary process element alignment. For example, the operator display view 260 does not depict the process element that senses the tank temperature 262*c*, and does not depict the control loop that executes to maintain the tank temperature 262*c* within a desired range. Further, although the operator display view 260 indicates that the bitumen preparation phase 265 is downstream of the aqueous preparation phase 261, the display view 260 does not indicate what process element of the bitumen preparation phase 265 receives the output from the tank 268 of the aqueous preparation phase, and how the flow rate of the output of the tank 268 is controlled.

It is noted that although only four types of data sources or diagrams have been discussed herein as being candidates for inclusion in the plurality of data sources from which the method 200 obtains primary process element information (e.g., in FIGS. 4A-4D), one or more other types of data sources or diagrams may be additionally or alternatively used by the method 200, such as plot plans, other to-scale diagrams, stored streamed data, logical diagrams or mappings, and/or other process data sources. In some cases, a data source may be user input or a manually generated diagram.

Returning now to the method 200, as none of these different types of diagrams individually is able to provide and/or winnow to provide only the complete set of primary process elements of a process, the method 200 extracts, procures, or otherwise obtains data 202 from a plurality of different types of data sources. The obtained data includes at least an indication of an identifier of each primary process element and an indication of a location (e.g., a physical, geo-spatial location) of each primary process element. In some cases, the indications of the identifier and the location of a first primary process element may be obtained from a first P&ID diagram, while the indications of the identifier and the physical location of a second primary process element may be obtained from a second P&ID diagram. For example, with reference to FIG. 1, indications of identifiers and physical locations of primary process elements associated with the continuous reactor 110 may be extracted from a P&ID for the continuous reactor 110, whereas indications of identifiers and physical locations of primary process elements associated with spray dryer tower 2 (reference 120*b*) may be extracted from a different P&ID for the with spray dryer tower 2 (reference 120*b*). In an embodiment, the descriptive or indicative information of two different primary process elements is distributively stored across data sources in a mutually exclusive manner, e.g., the P&ID for the spray dryer tower 2 (reference 120*b*) does not store any descriptive or indicative information of the process elements FT301, FC301 and FV301 controlling the input flow 128 into the continuous reactor 110, and the P&ID for the continuous reactor 110 does not store any descriptive information for the process elements TT323, TC323, TV323 controlling the temperature inside the tower 2 (reference 120*b*).

In some cases, an indication of an identifier of a particular primary process element is obtained from a first data source, while an indication of the location of the particular primary element may be obtained from a second data source. For example, the tag of a particular primary process element may be extracted from a PFD, whereas an indication of the geo-spatial physical location may be extracted from an operator display view that presents the geo-spatial layout of equipment in the process plant.

Indeed, the method 200 may extract or obtain 202 at least some of the primary process element data from two or more of any number of different types of data sources, e.g., from two or more of a PFD, a P&ID, a loop diagram, stored streamed data, manually generated data, or an operator or display view, each of which corresponds to a respective at least a portion of the process or of the process plant. The method 200 may additionally or alternatively extract or obtain 202 at least some of the primary process element data from two or more instances of a same type of data source. For example, the method 200 may extract or obtain 202 the primary process element data from two or more operator display views or from two or more loop diagrams, each of which is associated with a specific portion or view of the process or of the process plant.

Figure 5:
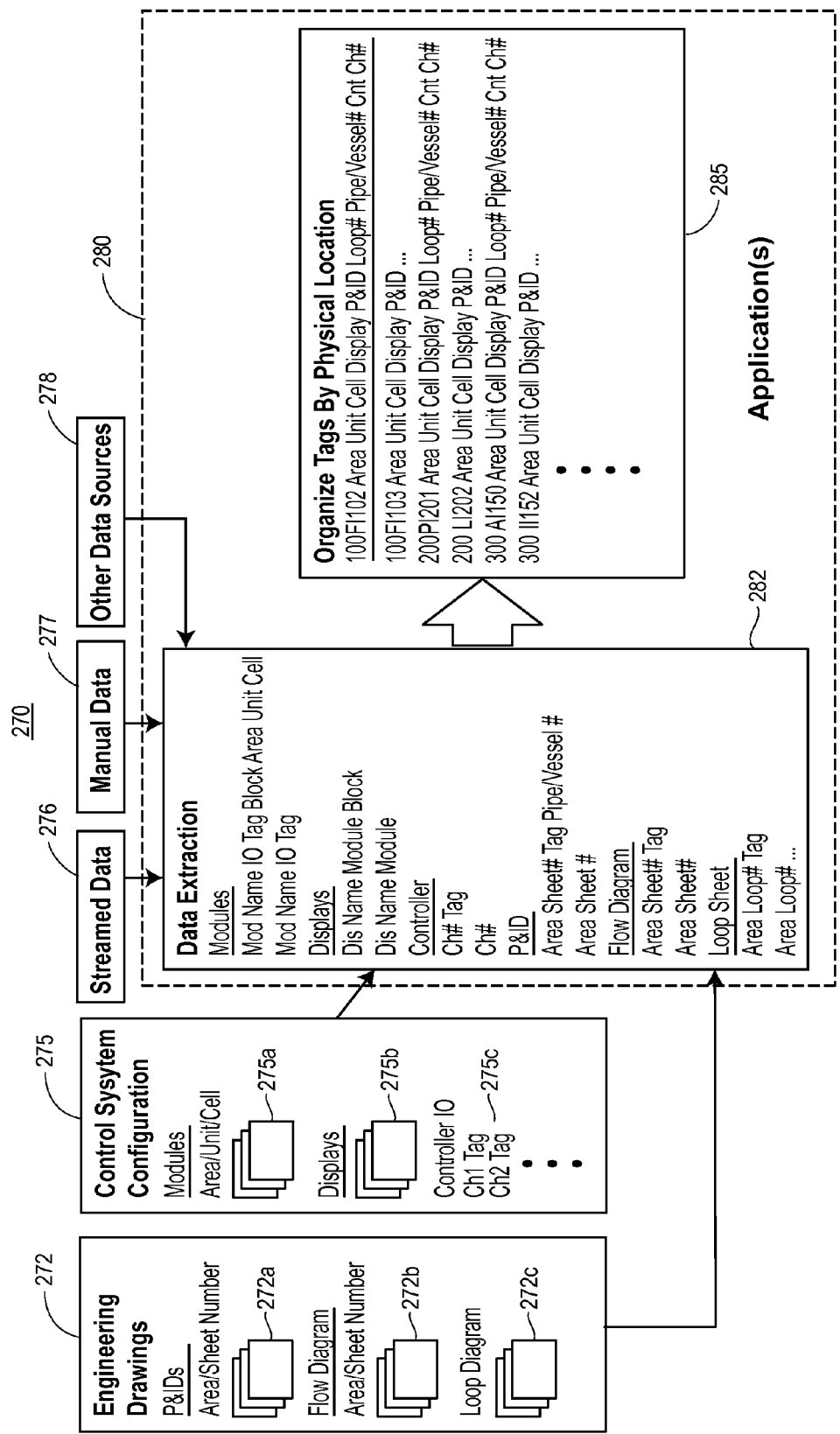
FIG. 5 is a block diagram of an example data flow used to generate a process element alignment map.

To illustrate example concepts and techniques associated with the procurement of primary process element information 202, FIG. 5 includes an example flow 270 of data to generate a process element alignment map. In FIG. 5, data descriptive or indicative of a plurality of primary process elements of a process plant is stored across or provided by multiple diagrams or data sources 272, 275, 276, 277, 278. For example, some of the example primary process element data is stored in one or more engineering drawings 272, such as one or more P&IDs 272*a*, one or more process flow diagrams 272*b*, and/or one or more loop diagrams 272*c*. Additionally, some of the example primary process element data is stored in one or more control system configurations 275, such as one or more control module configurations 275a, one or more operator views or displays 275b, and/or one or more device configurations 275c (e.g., configurations of controllers, I/O devices, field devices, etc.). Further, streamed data 276 from one or more other process elements or devices may provide data descriptive or indicative of the plurality of process elements. The streamed data 276 may be stored streamed data (e.g., obtained streamed data that has been stored in a centralized big data appliance and/or in an embedded big data appliance), or the streamed data 276 may be a real-time stream. Still further, manually generated inputs 277 such as manually generated charts, diagrams, or mappings and/or user input may provide data descriptive or indicative of the plurality of process elements. At least some of the primary process element data may be stored in or provided by one or more other data sources 278, such as plot plans or other diagrams.

The primary process plant data stored in and/or provided by these multiple data sources 272, 275-278 is obtained or extracted 202, for example, by one or more applications 280 executing on one or more computing devices associated with the process plant. For example, the applications 280 may extract data from a stored data source, or the applications 280 may extract, filter, or otherwise obtain data provided by a real-time streaming data source. As illustrated in FIG. 5, the obtained data 282 includes indications of identifications of the various primary process elements, such as tags and names. The obtained data 282 also includes indications of physical locations of the various primary process elements, such as area sheet and loop numbers, or GPS coordinates. The one or more applications 280 are configured to sort, order, or organize the obtained data 282 based on physical location to determine a relative ordering 285 of the primary process elements within the flow of the process, e.g., the process element alignment map. In FIG. 5, the relative ordering 285 is displayed in an ordered listing, however, this embodiment is only one of many embodiments in which the relative ordering is reflected. For example, the relative ordering of each particular primary process element may be reflected by a code, tag, or other indicator.

Returning to FIG. 3, in some embodiments, the method 200 may include determining one or more members of the set of primary process elements (e.g., as previously discussed with respect to FIG. 1). For example, for a first particular data source, first a determination of the subset of primary process elements whose descriptive data is at least partially stored in the first particular data source may be made (e.g., by type of process element and/or by type of data), and then only the descriptive or indicative data for that subset of primary process elements is extracted or obtained 202. In another example, a general extraction of data from a second particular data source may be performed 202, and then the extracted data 202 may be whittled to a subset based on the determination or identification of the primary process elements represented therein.

At block 205, the method 200 includes causing the extracted or obtained data to be stored. For example, the method 200 may cause at least some of the extracted or obtained data to be stored temporarily, e.g., in a cache or in re-writable storage, and/or the method 200 may cause at least some of the extracted or obtained data to be stored on a longer term basis, such as at a local or remote big data appliance storage area or at a perpetual data storage area.

With further respect to blocks 202 and 205 and as discussed above, in some cases, for at least some of the primary process elements the method 200 also includes extracting or obtaining 202 other descriptive or indicative information corresponding to the primary process elements, such as GPS coordinates, an image of the primary process element or its immediate environs, a model/make/serial number, and the like. Such other descriptive or indicative information may be stored 205 as metadata, if desired, e.g., as metadata associated with the indications of the identifier and the physical location of the primary process element.

At block 290, the method 200 includes determining the process element alignment map for the process based on the obtained set of data. As discussed above, the process element alignment map indicates primary process elements for the process, and include or indicates a respective identification of each primary process element as well as a respective order of each primary process element with respect to one or more other primary process elements. For example, for each primary process element, the process element map includes a respective indication of a respective order of an occurrence of an event at the each primary process element to control the process relative to an occurrence of another event at least one other primary process element to control the process. As such, to determine the process element alignment map 290, the method 200 determines the relative connection ordering or alignment of some or all of the primary process elements within the flow of the process.

In some scenarios, the determined process element alignment map may be stored (block 292). For example, the method 200 may cause at least some of the determined process element alignment map to be stored 292 temporarily, e.g., in a cache or in re-writable storage, and/or the method 200 may cause at least some of the determined process element alignment map to be stored 292 on a longer term basis, such as at a local and/or remote big data appliance storage area or at a perpetual data storage area.

In some scenarios, the method 200 includes causing at least a portion of the determined process element alignment map to be delivered to another application and/or to another computing device 295. In some scenarios, the method 200 additionally or alternatively includes causing at least a portion of the determined process element alignment map to be presented at a user interface 295, such as displayed on a local or a remote display, on one or more operator views, or printed on a report. The at least the portion of the process element alignment map may be presented in any desirable format, such as in a table format, a graph format, or some other format, such as previously discussed.

In an example scenario, the at least a portion of the determined process element alignment map is presented 295 at a user interface, e.g., as a draft process element alignment map. User input including user-indicated changes to the draft process element alignment map is received, and the draft process element alignment map is modified based on the received user input. For example, a user may indicate that a new primary process element that has not yet been configured for the process control system is to be added to the map, the user may add additional descriptive data to the map (e.g., attaching a newly captured image as metadata for a particular element), or the user may indicate that a particular group of primary process elements are to be removed from the map as they are temporarily out-of-service. The modified process element alignment map may be stored 292, presented at a user interface, and/or caused to be delivered to another application and/or computing device 295.

Referring again to the example process 102 shown in FIG. 1, it is apparent that for a given process variable, certain process variables and/or measurements have a stronger alignments or associations with the given process variable (e.g., have a greater impact or effect on the behavior of the given process variable), while other process variables have a weaker alignments or associations (e.g., have a lesser impact or effect of the behavior of the given process variable), if any at all. For example, referring to the control strategy executed by the controller LC307, the measurement of the current amount of reactants as determined by the sensor LT307 is extremely aligned or associated with the controller LC307, as the measurement LT307 is a direct input into the control algorithm executed by the controller LC307. The amount of leftover solids from the reactor 110 as detected by the sensor AT303 also has an alignment or association with the with the controller LC307, albeit a less strong one than that of the measurement performed by sensor LT307, as AT303 first directly affects the amount of sodium bicarbonate released from the stock 108 which then is provided into the reactor 110 to react to form the contained reactants therein, therefore affecting the level of the contained reactants LT307 which is provided to the controller LC307. On the other hand, measurements or process variables that are sufficiently downstream in the process element alignment map from the controller LC307 typically have no or negligible association or alignment with process variables that are controlled by the controller LC307. For example, a detected pressure PT311 of a spray dryer tower 120a has negligible, if any, effect or impact on the controller LC307, and a weight of the end-product measured by WT315 also has negligible, if any, effect on the controller LC307.

In known process control plants and systems, when evidence of a fault or an abnormal condition or variation occurs, typically an operator, instrument technician or process engineer uses his or her knowledge of the process being controlled by the system in combination with an analytics tool to determine upstream measurements and process variables that may have contributed to the production of the evidence of the fault or the abnormal condition/variation, e.g., that are sources of the fault or the abnormal condition/variation. To illustrate, referring to FIG. 1 in an example scenario, the controller LC307 detects that the level of reactants contained within the reactor 110 has been above a desired threshold for a pre-determined amount of time, and the controller LC307 causes an alert or alarm to be generated. Upon being alerted to the alert or alarm, an operator attempts to determine the cause of this condition by providing, to an analytics tool, indications of measurements and/or process variables that he or she feels may be contributing to this condition. Based on the input data, the analytics tool performs an analysis such as Principal Component Analysis (PCA) to determine the relative effects of the input measurements and/or process variables on the abnormal behavior detected by LC307, and the analysis tool provides this information to the operator so that he or she can further investigate the condition.

Having an operator use an analytics tool to determine the source of the variation, though, suffers from incompleteness, as well as being cumbersome and requiring a relatively large amount of time to execute. For example, having an operator use an analytics tool is dependent on the extent of the operator's knowledge of the process, which may not be complete, thorough, or accurate. The operator typically consults diagrams of the process plant to augment the operator's knowledge (e.g., PI&Ds, Process Flow Diagrams (PFDs), loop diagrams, etc.), however, said diagrams each contain a different perspective of the process plant and the process control system provided in the plant, and are not sufficiently detailed for the operator to accurately determine an elemental process element alignment map of the process.

Figure 6:
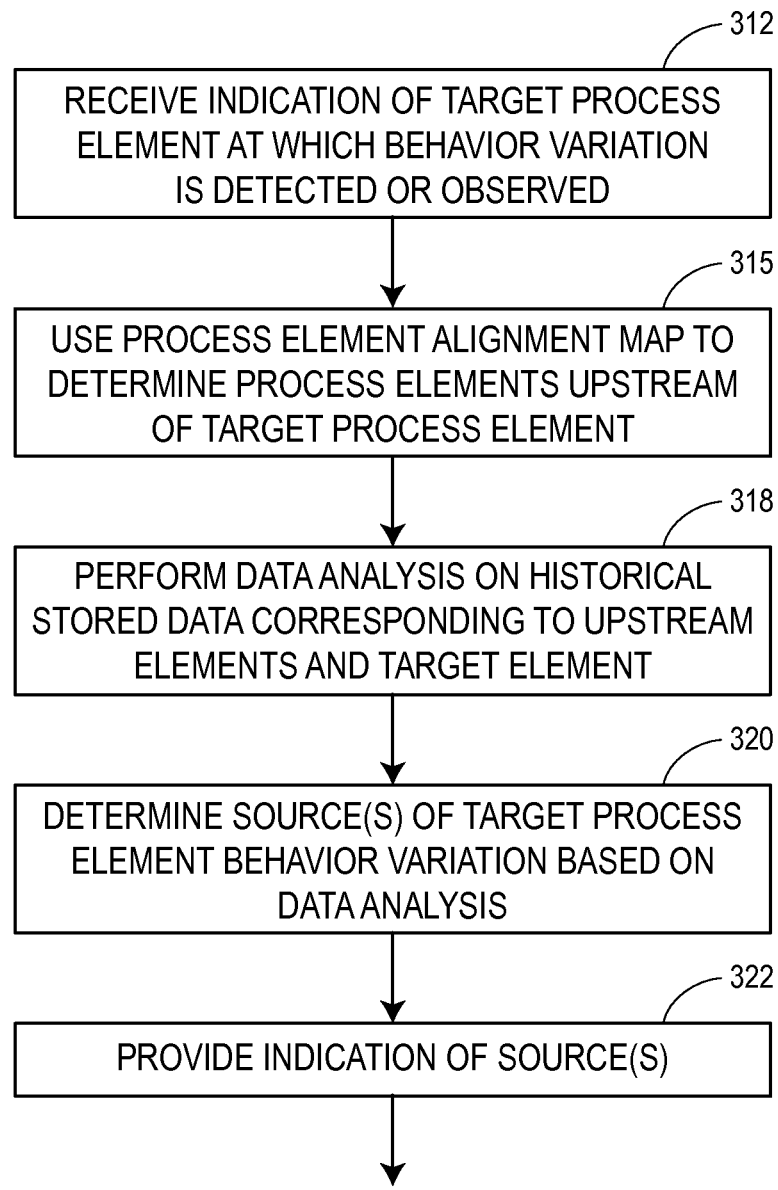
FIG. 6 is a flow diagram of an example method for determining sources of variations of process elements operating in a process plant to control a process.

However, using the techniques, systems and methods described herein, one or more sources of the fault or the abnormal variation/behavior are easily and accurately determined, and can be consistently determined irrespective of particular operators' knowledge and practice. For example, FIG. 6 illustrates an example method 310 of automatically determining one or more sources of a variation of a behavior of a target process element used in a process plant to control a process in real-time or during run-time. In some situations, the method 310 operates in conjunction with the method 200, for example, one or more portions of the method 310 may be pre-pended, appended, and/or interleaved with elements of the method 200. The method 310 may be executed or performed by the same set of computing devices that performs the method 200, or the method 310 may be executed by a different of computing devices from those performing the method 200.

In an embodiment, the method 310 is performed at least in part by an apparatus or system (e.g., one or more computing devices) particularly configured with computer-executable instructions stored on one or more tangible, non-transitory computer-readable media that, when executed by one or more processors, cause the apparatus to perform one or more portions of the method 310. For example, at least a portion of the method 310 may be performed by one or more applications hosted by one or more computing devices.

The method 310 includes receiving 312 an indication of a particular or target process element of the process control system or process plant. The target process element is one of a plurality of process elements used to control a process during run-time or real-time, and may be a field device, a measurement, a process variable, or other process element. Typically, but not necessarily, the target process element is a primary process element at which faults, abnormal operations, and/or variations in behavior have been detected or observed. Additionally, an indication of the target process element may be of any suitable format, for example, a tag, an identification number or code, a reference, an address or location, a flag, a value, or any other data that is indicative of the target process element.

In some cases, the indication of the target process element is received 312 from an application, e.g., from a user-interface application or another application executing on the same or different set of computing devices on which the method 310 is executed. For example, a user-interface application receives an indication of the target process element from a user (e.g., via a user interface when an operator identifies a fault or a variation in the behavior of the target process element, and desires to obtain information about possible sources or causes of the fault or variation), and the user-interface application forwards said indication so that it is received 312. In another example, the indication of the target process element is received from another application, such as by a learning, discovery, training, or other analytics application.

In some scenarios, the learning, discovery, training, or analytics application is an unsupervised application, that is, the application initiates and executes without and/or independent of any user input. The unsupervised application may be a machine learning or predictive analysis application executing on the same or different set of computing devices on which the method 310 is being executed. Additionally or alternatively, the unsupervised application may be a data mining or data discovery application executing on the same or different set of computing devices on which the method 310 is being executed. In some cases, the unsupervised application operates on locally stored, distributed big data of a process control system (e.g., at a distributed big data device of the process control system), or operates on centrally stored big data of the process control system (e.g., at a centralized big data appliance of the process control system). Some examples of unsupervised learning, discovery, training, or analytics applications that are used on centrally stored big data in process plants and process control systems and that may operate in conjunction with any or all of the methods, techniques and systems described herein are found in aforementioned U.S. patent application Ser. No. 13/784,041 entitled "BIG DATA IN PROCESS CONTROL SYSTEMS." Some examples of unsupervised learning, discovery, training, or analytics applications that are used on locally and distributively stored big data in process plants and process control systems and that may operate in conjunction with any or all of the methods, techniques and systems described herein are provided in aforementioned U.S. patent application Ser. No. 14/212,493, filed Mar. 14, 2014 and entitled "Distributed Big Data in a Process Control System". Further, in some embodiments, at least a portion of method 310 and/or of the other methods described herein is performed by one or more centralized learning, discovery, training, or analytics applications (which may or may not be unsupervised) at a centralized process control system big data appliance. Additionally or alternatively, at least a portion of method 310 and/or of the other methods described herein is performed by one or more distributed learning, discovery, training, or analytics applications (which typically, but not necessarily, is unsupervised) at a distributed or embedded big data appliance that is included in a process control device of the process control plant. In an example, a primary process element includes an embedded big data appliance. Distributed and centralized big data in process control plants and systems is discussed in more detail in a later section.

The method 310 includes determining 315, using at least a portion of a process element alignment map of the process, a set of primary process elements that are upstream of the target process element, e.g., "upstream process elements." Typically, but not necessarily, the set of primary process elements that are upstream of the target process element is a subset of the entire, comprehensive, or complete set of primary process elements that are used to control the process, and each of the set of upstream process elements is ordered in the process element alignment map ahead of (and in some cases, adjacent to) the target process element.

The process element alignment map used in the determination 315 of the upstream process elements may have been generated by the method 200, or may have been generated by another suitable method. In some scenarios, at least part of the process element map may have been generated manually. As previously discussed, the process element alignment map includes indications of primary process elements and their relative locations or order within the process flow. Thus, using the target process element that was received 312 as a reference or entry point of the process element alignment map, the process elements that are ordered ahead of the target process element are determined 315 to be the set of upstream elements corresponding to the target process element. It is noted that entire process element alignment map is not required to be searched or used to determine the upstream elements. For example, areas or other portions of the process or process plant that are identified as being significantly downstream of the process plant need not be searched or utilized.

In some embodiments, such as when the method 310 is performed by an unsupervised application, the method 310 includes determining at least a part of the process element alignment map based on the received target process element (reference 312), for example, by using at least a portion of the method 200 in conjunction with the method 300. As discussed above, the method 200 for automatically determining a process element alignment map of a process includes extracting or obtaining data 202 from multiple data sources which, in some embodiments, may include extracting or obtaining the data 202 for all primary process elements of the process. However, when the method 200 is used in conjunction with the method 300 and an indication of a target process element is received 312, the data that is extracted or obtained 202 from the multiple data sources may be only a subset of all of the data for all primary process elements. For example, only data corresponding to an area in which the target process element is included or corresponding to an upstream area of the area in which the target process element is included may be extracted or obtained 202.

In an illustrative but non-limiting example, referring to FIG. 1, suppose an amplitude range or a frequency of variation of a measurement taken by sensor TT305 is determined to be abnormal. As seen in FIG. 1, and as indicated in a process element alignment map of the process 102 of FIG. 1, sensor TT305 is located between the area of the continuous reactor 110 and the area of the surge tank 118. Thus, when obtaining data 202 to determine the process element alignment map as part of the method 310, only data corresponding to the area of the process plant of the continuous reactor 110 and the area of the surge tank 118 is obtained, while data corresponding to the areas of the spray dryer towers 120a, 120b need not be obtained. Consequently, only the portion of the process element alignment map that corresponds to the TT305 (e.g., the target process element) is determined (block 290 of FIG. 3), and only this determined portion of the map is used to determine (block 315 of FIG. 6) the upstream process elements of TT305. In such a manner, time, processing, and other resources are optimized as compared with determining and using the complete, comprehensive process element alignment map for the entire process.

Returning to FIG. 6 and the method 310, one or more data analyses are performed on stored data corresponding to the upstream process elements and the target process element (reference 318). Generally, stored data that has been collected over time for each upstream process element and for the target process element (e.g., historical real-time data that has been collected for each upstream process element and for the target process element as a result of the elements operating to control the process) is provided as inputs to the data analysis. At least some stored data is stored big data, for example. In some cases, the method 310 prevents data corresponding to any process element that is not upstream with respect to the target process element from being used as an input to the data analysis so that the data analysis is performed only on the data of the upstream process elements. In such cases, by limiting the input data set, the time, processing, and other resources required to determine the sources of variation of the target process element may be decreased or minimized.

In some embodiments, the data analysis operates on its inputs to determine time offsets of the upstream process elements with respect to the target process element. A "time offset," as generally used herein, refers to an offset from a time at which a particular event occurs or behavior is observed (e.g., change in measurement) at an upstream process element to a time at which the effect of the particular upstream event or observed behavior is reflected at a downstream element, such as by an occurrence of a related particular event or a particular change in behavior of the downstream element. In these cases, the data analysis operates on the stored historical data to determine the time offsets corresponding to the occurrences of various events or behaviors at one or more upstream process elements with respect to the occurrences of their respective effects or behaviors at the target process element. The data analysis to determine time offsets of upstream process elements may utilize cross correlation, principal component analysis (PCA), partial least squares regression analysis (PLS), and/or other suitable analytics technique.

In some embodiments, a data analysis (e.g. the data analysis to determine the time offsets described above, or another data analysis) operates on its inputs to determine respective strengths of impact of the upstream process elements on the behavior (or variation thereof) of the target process element. For example, given the set of upstream process elements, the data analysis may operate on historical data obtained from each of the upstream process elements over some given or predetermined period of time to estimate the degree of association of each upstream element and the target process element, e.g., the strength of impact of each upstream element on the behavior of the target process element. To illustrate using just one of many examples, based on the historical data, the data analysis estimates a degree of percent variation of the behavior of each upstream element associated with the degree of percent variation of the behavior of the target process element. Using the estimations, the upstream elements causing the greater percent variations in the behavior of the target process element are determined to have higher degrees of association or strengths of impact on the behavior of the target process element, and these upstream elements causing the greater percent variations are included in a model generated by the data analysis. Upstream elements having a degree of association or strength of impact that is significantly less than a threshold (e.g., a percentage of total variation of the target process element behavior) may be excluded from the model. In some instances, the threshold is determined based on heuristic data and/or desired or actual model quality.

In some embodiments, a data analysis (e.g., one of the data analyses described above, or another data analysis) operates to determine the process impact delays of upstream process element with respect to the target process element. As used interchangeably herein, the "process impact delay" or "impact delay" of a particular upstream process element with respect to the target process element generally refers to an amount of delay, during operation and control of the process, between a contribution or involvement of the particular upstream process element and a resulting contribution or involvement of the target process element. For example, the data analysis to determine the process impact delays determines the degree of percent variation of the behavior of the particular upstream element with respect to the degree of percent variation of the behavior of the target process element for the various time offsets corresponding to the particular upstream process element. The time offsets corresponding to the particular upstream process element may have been determined by the techniques described above, or by other suitable techniques. The particular time offset causing the greatest percent variation in the behavior of the target process element is determined to be the process impact delay of the particular upstream element with respect to the target process element. The data analysis to determine impact delays of upstream process elements may utilize any suitable analytics technique, such as cross correlation, principal component analysis (PCA), partial least squares regression analysis (PLS), and/or other technique.

The method 310 includes determining, identifying, or selecting 320 one or more upstream process elements as a source of the variation of the behavior of the target process element, e.g., based on the time offsets, the strengths of impacts, and/or the impact delays determined by the data analysis or analyses. For example, upstream process elements that have non-negligible impact delays are eligible candidates of sources of variation, and the determination or selection of the one or more sources from the pool of eligible candidates may be winnowed or finalized based on a threshold. In an example, only the upstream process elements having a respective impact delay equal to or surpassing a threshold (e.g., a contribution greater than X %, the top Y contribution percentages, only process elements added to the process plant only after a certain date, etc.) are identified or indicated as a source of variation. The threshold may be predefined, and/or the threshold may be configurable.

The method 310 includes causing the one or more sources of the variation of the behavior of the target process element to be indicated, identified, or provided (block 322). In some cases, the indications or the identifications of the one or more sources are provided 322 to a user interface. Additionally or alternatively, the indications or the identifications of the one or more sources of behavior variation in the target process element are provided 322 to an application, e.g., to an application that is executing on the same set of computing devices on which the method 310 is operating, or to an application that is executing on another set of computing devices. For example, the identifications or indications of the one or more sources of variations of the target process element may be provided 322 to a requesting application, e.g., an application from which the indication of the target process element was received 312. In some scenarios, the requesting application is an unsupervised learning, discovery, training, or analytics application operating on big data within the process plant.

Figure 7:
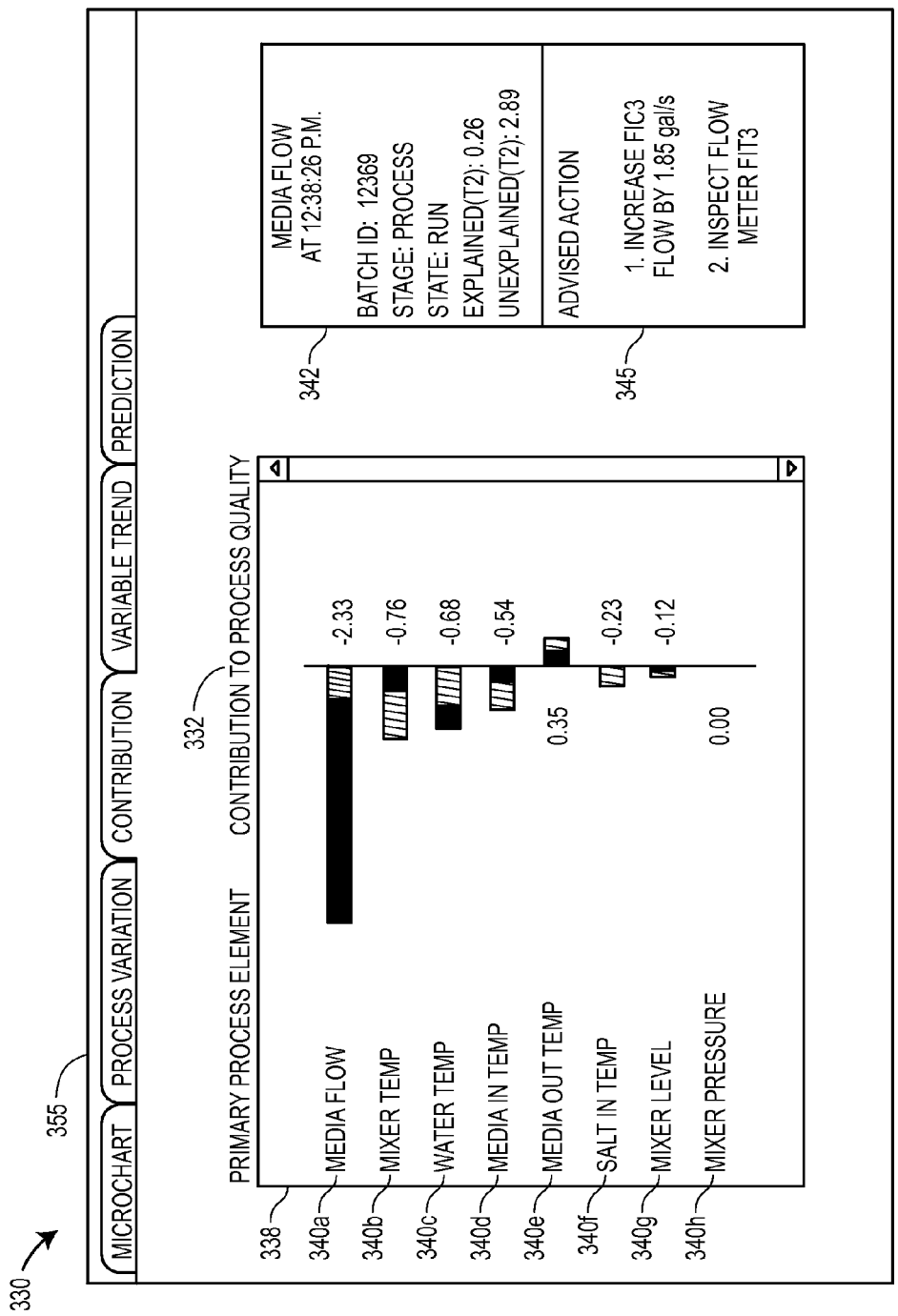
FIG. 7 is an example of a user interface display that indicates a set of sources of variations in the behavior of a particular process element and their respective contributions.

In some situations, each of the one or more sources of variation of the particular or target process element is indicated, provided, or identified to the recipient application in conjunction with other descriptive or indicative information of the source, such as its absolute geo-spatial location within the process plant, make/model/serial number, an image, etc. In some situations, an indication of the relative contribution of the each source of variation to the changes in behavior of the target process element is indicated or provided. FIG. 7 illustrates one example display 330 that provides the relative contributions of upstream process elements (e.g., the sources of variations) to a target process element using bar graphs on a screen display. In FIG. 7, the example display 330 includes unexplained and explained process variations of primary process elements that impact a measure of process quality 332, which, in this example, is the target process element (e.g., as indicated at the block 312 of the method 310) at which variations have been observed. In particular, the example contribution graph 335 includes a bar chart 338 that displays the contributions of explained variations (e.g., solid black bars or bar portions) and unexplained variations (e.g., striped bars or bar portions) of each upstream primary process element 340a-340h to the process quality variation 332. Additionally, the primary process elements 340a-340h are organized on the chart 338 by displaying the element having the greatest contribution to the overall process variation 332 at the top of the chart 338 (e.g., Media Flow 340a). In other examples, the upstream primary process elements 340a-340h may be organized by preferences of a process control operator, or in any desired manner.

Each of the upstream primary process elements 340a-340h within the bar chart 338 includes a numerical value associated with a variation of the process element. For example, the −2.33 value associated with the Media Flow process element 340a may indicate that a fluid is flowing 2.33 gal/sec slower than a mean value or a threshold value. Alternatively, the −2.33 value may indicate a statistical contribution amount that the Media Flow process element 340a contributes to the variation of the process quality 332.

In FIG. 7, the explained and unexplained variations for each primary process element 340a-340h are superimposed or shown together to provide an easy graphical display for a process control operator. The explained variations of each process element 340a-340h may be calculated, for example, by utilizing a model variation T2 statistic, and the unexplained variation of each primary process element may be calculated, for example, by utilizing a Q statistical test. In other examples, the bar chart 338 may display other values of the primary process elements 340a-340h, e.g., the mean values of the elements, standard deviations for each of the elements, and/or other outputs that have been generated based on performed data analyses.

The example contribution graph 335 includes a process information faceplate 342 that displays process information, process time of the displayed variations, and numerical values of explained and unexplained variations for a selected process element 340a-340h. For example, in FIG. 7, the process information faceplate 342 shows that at 12:38:26 P.M., the Media Flow element 340a has a 0.26 explained contribution and a 2.89 unexplained contribution to the overall process quality variation 332. Additionally, the contribution graph 335 includes an advised action faceplate 345. The advised action faceplate 345 may display process correction recommendations to remediate a detected process fault. For example, in FIG. 7, the advised action faceplate 345 recommends improving the variation in the process quality 332 by increasing the Media Flow by 1.85 gal/s in the field device FIC3, which may correspond, for example, to a valve or a pump within the process control system 106 that is capable of modifying the Media Flow rate. Additionally, the advised action faceplate 345 includes a recommendation to inspect a Flow Meter FIT3. By inspecting the Flow Meter FIT3, an operator may determine if the Flow Meter is outputting an accurate Media Flow value. The advised actions displayed in the faceplate 345 may have been determined by one or more data analyses, for example.

Of course, while FIG. 7 illustrates one example of a screen 330 displaying sources of variation of a target process element, other representations of indications or identifications of sources of variation of the target process element may be provided, such as a trend display view, an alphanumeric report, directed graph, other types of graphics, any type of data file, and/or any other desired format. A user may be able to manipulate aspects of the display, if desired. For example, a user may be able to sort, filter, select, or otherwise organize the display and/or the information corresponding to the one or more sources of variation.

In some scenarios, the indication of the target process element, its corresponding portion of the process element alignment map, the determined one or more sources, and/or their relative contributions are stored (not shown), for example, in a database, locally at a computing device on which the method 310 is operating, in a local embedded big data appliance, or at another remote data storage device such as a centralized big data appliance or other centralized system data storage area. An operator or user may provide an identifier or name for any or all of said stored data. For example, referring to FIG. 7, the operator or user may provide a name or identifier for the fault or abnormal behavior detected at AT360 (e.g., "AT360-F05"), and optionally may provide a description (e.g., "greater than 5% swing over 24 hours detected on Apr. 28, 2013, 8:04 a.m."). The operator may also cause the identifications and relative contributions of FT302, TT345 and TT355 be stored in conjunction with the stored fault AT360-F05.

Figure 8:
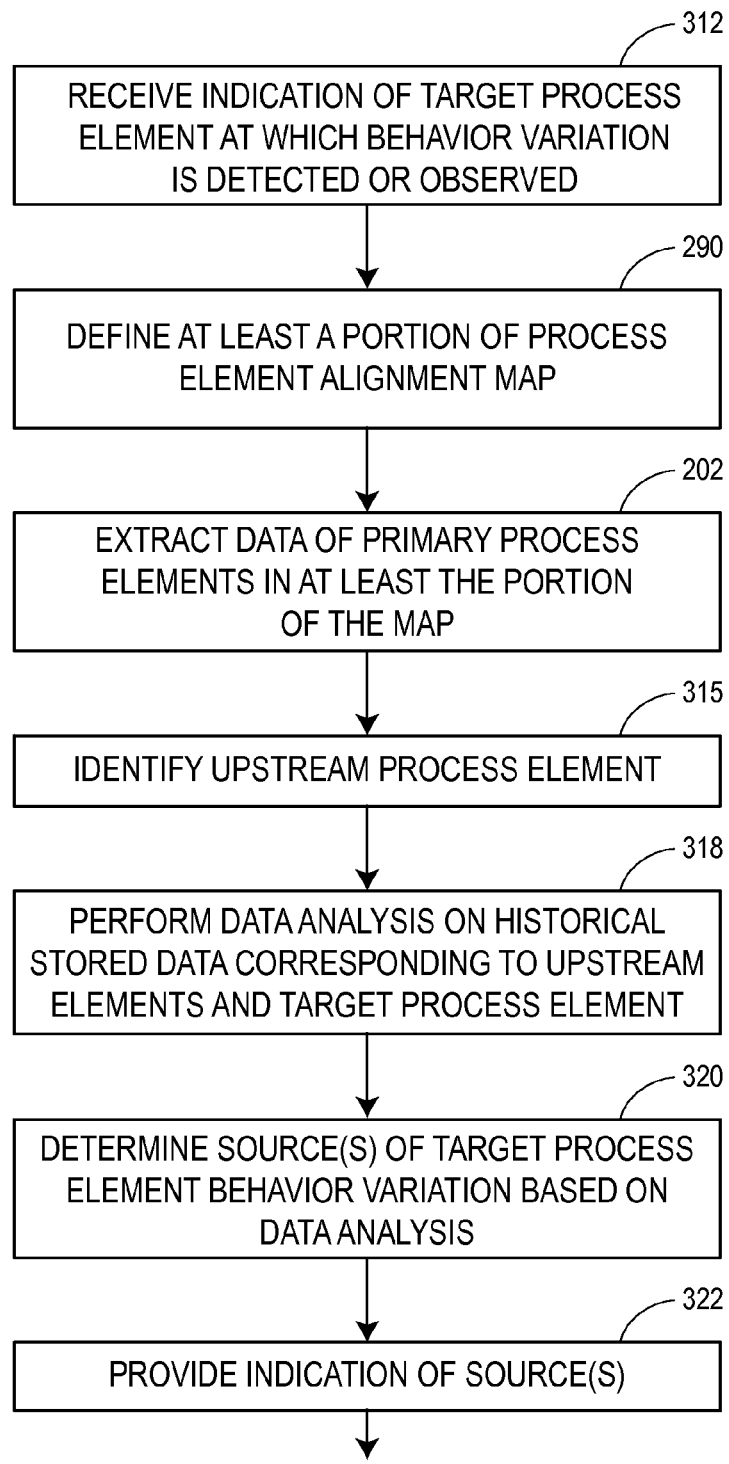
FIG. 8 is a flow diagram of an example method for determining sources of variations of process elements operating in a process plant to control a process.

As mentioned above, in some situations, at least some portions of the method 200 of FIG. 3 and the method 310 of FIG. 6 are combined into an integral method for determining one or more sources of a variation in behavior of a target process element that is operating to control a process in a process plant. To illustrate, FIG. 8 includes a block diagram of an example method 350 that combines portions of the methods 200 and 310. It is noted that although the method 350 includes selected portions of the methods 200 and 310, in some embodiments, other portions of the methods 200 and 310 are additionally or alternatively combined. Additionally or alternatively, in some embodiments, at least some portions of the method 350 illustrated in FIG. 8 are omitted. In the discussion below, portions of the method 350 are discussed using their reference numbers originally presented in the description of FIGS. 2 and 6.

In FIG. 8, the method 350 includes receiving an indication of the target process element 312, and defining at least a portion of a process element alignment map 290 of a process that is controlled in part by the target process element. For example, the at least the portion of the process element is determined based on the target process element. The method 350 includes obtaining or extracting data 202 for primary process elements included in the defined at least a portion of the process element alignment map. For example, data corresponding to primary process elements in areas of the process plant that are upstream of and that include the target process element is obtained or extracted 202.

Based on the determined at least the portion of the process element map and the obtained data, process elements that are upstream of the target process element are identified 315. Additionally, the respective time offsets, strengths of impact, impact delays and/or relative contributions of the upstream elements on the target process element are determined by using one or more data analyses 318 on data that has been stored over time and that was generated as a result of controlling the process in real-time over time (e.g., historical data). For example, the data analysis 318 may be performed on historical big data collected for the upstream process elements and for the target process element. One or more particular upstream process elements are determined or identified 320, using the results or outputs of the data analysis or analyses, to be the sources of variation in the behavior of the target process element, for example, based on their respective impact delays, a threshold, and/or other criteria. The determined one or more sources of the variation in the behavior of the target process element are caused to be indicated, provided, or identified 322 as sources of variation in the behavior of the target process element.

Any or all of the systems, methods, and techniques disclosed herein may be utilized in any process plant that is configured to control a process in real-time. The process plant may include, for example, one or more wired communication networks and/one or more wireless communication networks. Similarly, the process plant may include therein one or more wired process elements and/or one or more wireless process elements. The process plant may include centralized databases, such as continuous, batch and other types of historian databases.

Some of the process plants in which at least portions of the systems, methods, and techniques disclosed herein are utilized include a process control big data network and process control big data network devices. For example, at least some of the systems, methods, and techniques disclosed herein are implemented in a process plant that supports centralized big data, such as described in aforementioned U.S. application Ser. No. 13/784,041. Such a process plant includes a centralized big data appliance, and at least some of the techniques disclosed herein may be implemented by the centralized big data appliance. For instance, at least portions of the method 200, the method 310, and/or of the method 350 may be executed by a centralized big data appliance.

Additionally or alternatively, at least portions of the systems, methods, and techniques disclosed herein are utilized in a process plant that supports distributed or embedded big data, such as described in aforementioned co-pending U.S. patent application Ser. No. 14/212,493, filed Mar. 14, 2014 and entitled "DISTRIBUTED BIG DATA IN A PROCESS CONTROL SYSTEM." As such, a process plant may include one or more distributed big data devices, each of which includes a respective distributed or embedded big data appliance. An embedded big data appliance may implement at least some of the techniques disclosed herein, for example, an embedded big data appliance may implement at least a portion of the method 200, at least a portion of the method 310, and/or at least a portion of the method 350. In some cases, one or more of the distributed big data devices are communicatively connected by a process control big data network.

Figure 9:
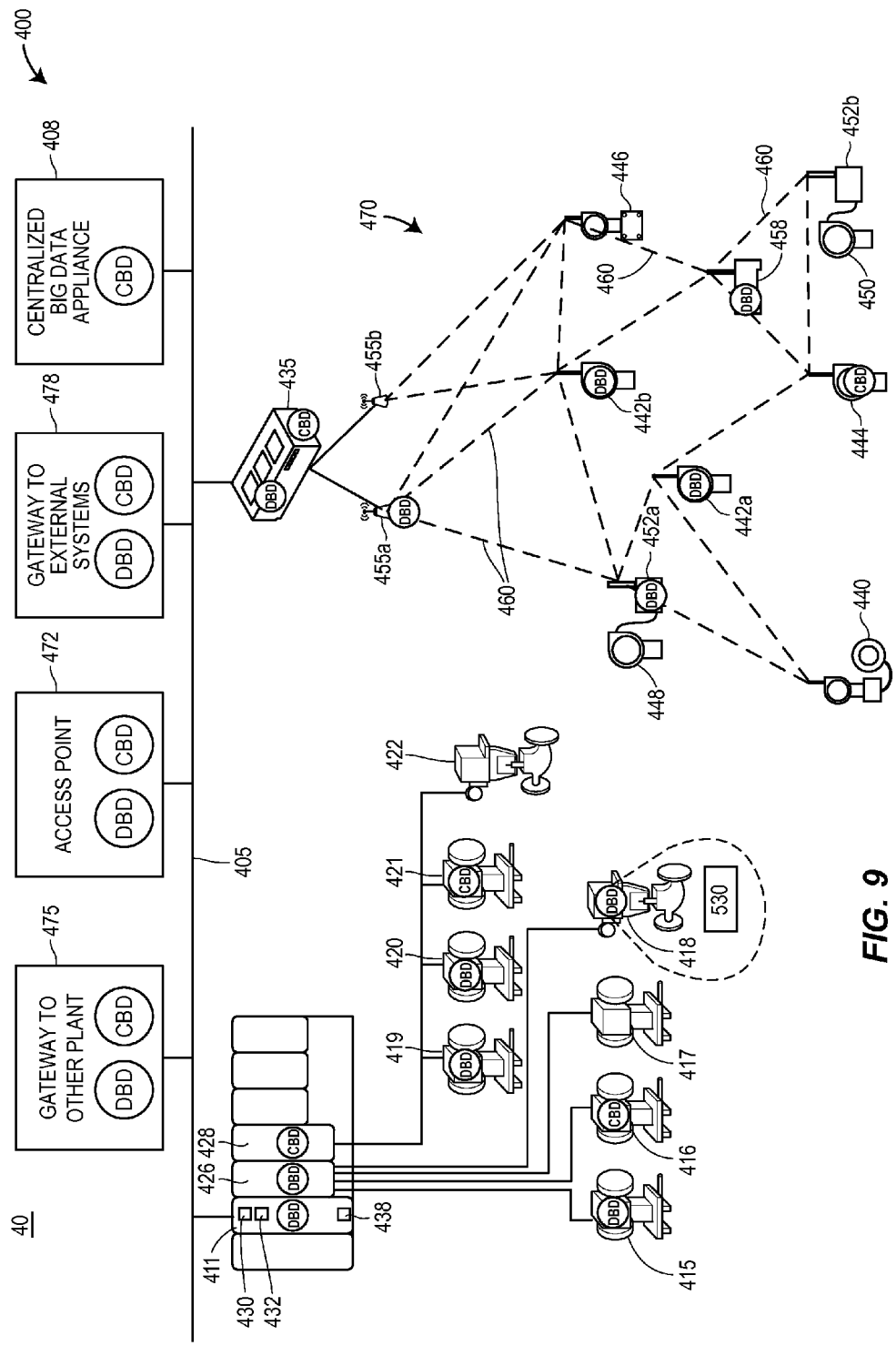
FIG. 9 is a block diagram of an example process control system in which the techniques disclosed herein may be implemented and included.

To illustrate, FIG. 9 is a block diagram including various example aspects of an example process plant or process control system 40 in which the techniques, methods, systems and apparatuses disclosed herein may be implemented and included. In FIG. 9, distributed big data devices are indicated by a "DBD" reference that signifies the inclusion of a respective embedded big data appliance 530 therein to locally manage big data, and centralized big data devices are indicated by a "CBD" reference, signifying that at least some of the big data collected by the CBD device is transmitted for storage at a centralized big data appliance 408. In some process plants, the centralized big data appliance 408 is the process control big data appliance described in aforementioned U.S. patent application Ser. No. 13/784, 041, although other process control big data appliances may be additionally or alternatively utilized. Generally, the process control big data apparatus or appliance 408 is centralized within the system 40, and is configured to receive and store data (e.g., via streaming and/or via one or more other protocols) from the centralized big data nodes (CBD). Optionally, the process control centralized big data apparatus or appliance 408 also receives and stores data from one or more distributed big data nodes (DBD).

In FIG. 9, the process control big data devices CBD and DBD and the process control centralized big data appliance 408 are nodes of a process control big data network 400, and are communicatively connected via a process control system big data network backbone 405. The backbone 405 includes a plurality of networked computing devices or switches that are configured to route packets to/from various process control big data devices CBD and DBD and to/from the process control big data appliance 408. The plurality of networked computing devices of the backbone 405 may be interconnected by any number of wireless and/or wired links, and the big data network backbone 405 may support one or more suitable routing protocols, e.g., protocols included in the Internet Protocol (IP) suite (e.g., UPD (User Datagram Protocol), TCP (Transmission Control Protocol), Ethernet, etc.), or other suitable routing protocols, which may be public or proprietary. In an embodiment, at least some of the nodes connected to the backbone 405 utilize a streaming protocol such as the Stream Control Transmission Protocol (SCTP).

Figure 10A:
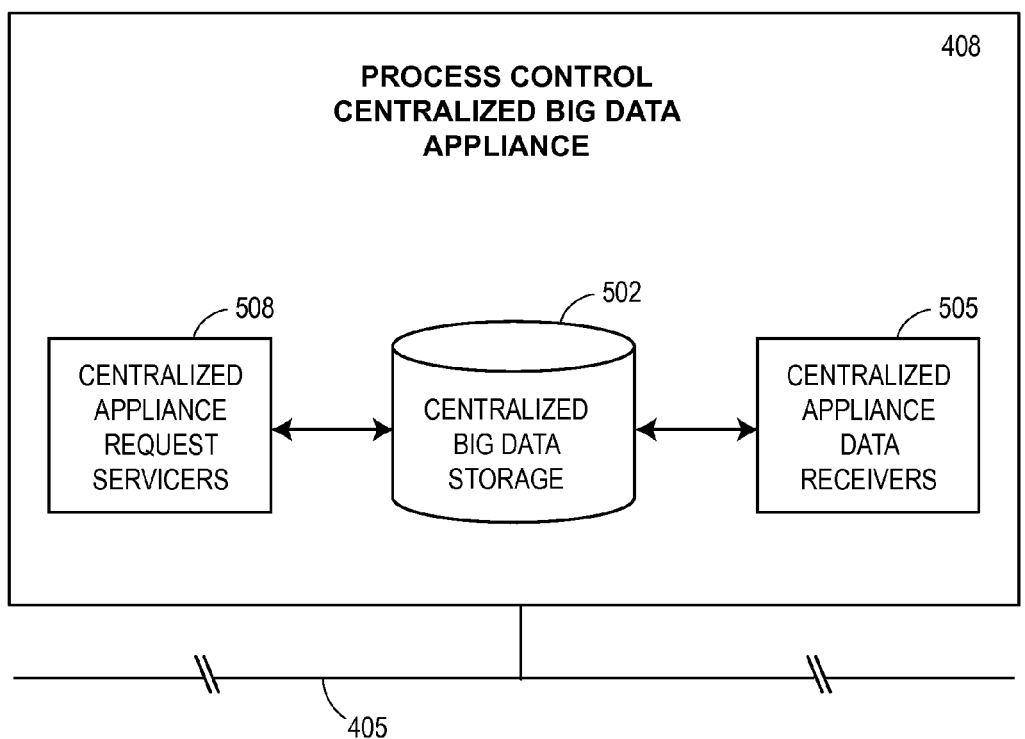
FIG. 10A is a block diagram of an example process control centralized big data appliance in a process control system or plant.

With particular regard to the process control centralized big data appliance 408, and referring to FIG. 10A, an example process control centralized big data apparatus or appliance 408 includes a data storage area 502 for historizing or storing the data that is received from the process control centralized big data devices CBD (and optionally some of the process control distributed big data devices DBD), a plurality of centralized appliance data receivers 505, and a plurality of centralized appliance request servicers 508. The process control system big data storage area 502 may comprise multiple physical data drives or storage entities, such as RAID (Redundant Array of Independent Disks) storage, cloud storage, or any other suitable data storage technology that is suitable for data bank or data center storage. However, to the big data nodes CBD and DBD of the network 400, the data storage area 502 has the appearance of a single or unitary logical data storage area or entity and is addressable as such. Consequently, the data storage 502 is viewed as a centralized big data storage area 502. The structure of the centralized big data storage area 502 supports the storage of any type of process control system related data, including historical data. In an example, each entry, data point, or observation of the data storage entity includes an indication of the identity of the data (e.g., source, device, tag, location, etc.), a content of the data (e.g., measurement, value, etc.), and a time stamp indicating a time at which the data was collected, generated, received or observed. As such, these entries, data points, or observations are referred to herein as "time-series data." The data may be stored in the data storage area 502 using a common format including a schema that supports scalable storage, streamed data, and low-latency queries, for example.

In addition to the centralized big data storage 502, the process control system centralized big data appliance 408 includes one or more centralized appliance data receivers 505, each of which is configured to receive data packets from the network backbone 405, process the data packets to retrieve the substantive data and timestamp carried therein, and store the substantive data and timestamp in the data storage area 502. The centralized appliance data receivers 505 may reside on a plurality of computing devices or switches, for example.

The process control system big data appliance 408 also includes one or more centralized appliance request servicers 508, each of which is configured to access time-series data and/or metadata stored in the process control system centralized big data appliance storage 502, e.g., per the request of a requesting entity or application. The centralized appliance request servicers 508 may reside on a plurality of computing devices or switches, for example. In an embodiment, at least some of the centralized appliance request servicers 508 and the centralized appliance data receivers 505 reside on the same computing device or devices (e.g., on an integral device), or are included in an integral application. Referring to some of the techniques disclosed herein as illustrative examples, one or more of the centralized appliance request servicers 508 may retrieve some of the stored data per the request of a data analysis application to determine at least a portion of a process element alignment map (block 290 of FIG. 3). A centralized appliance request servicer 508 may retrieve some of the stored data per the request of a data analysis application to determine upstream process elements of a target process element (block 315) of FIG. 6. A centralized appliance request servicer 508 may retrieve some of the stored data per the request of a data analysis application to determine one or more source(s) of behavior variation of a target process element (blocks 318, 320 of FIG. 6), or per request of other data analyses performed by the methods, systems, apparatuses and techniques described herein. In some cases, a data analysis performed by the methods, systems, apparatuses and techniques described herein is performed by one or more of the centralized appliance request servicers 508.

Turning now to the centralized big data devices CBD of FIG. 9, generally, each centralized big data device CBD is configured to collect, store and transmit, to the centralized big data appliance 408, data (e.g., big data) corresponding to a process plant and/or to a process controlled in the process plant for historization or long-term storage. The centralized process control big data device CBD may be a device as described in aforementioned U.S. patent application Ser. No. 13/784,041, although other centralized big data devices may be additionally or alternatively utilized in conjunction with the techniques described herein. The CBD may be a process controller, a field device, an I/O device, a user interface device, a networking or network management device, or a historian device whose primary function is to temporarily store data that is accumulated throughout the process control system 400, and to cause the delivered data to be historized at the centralized big data appliance 408.

Figure 10B:
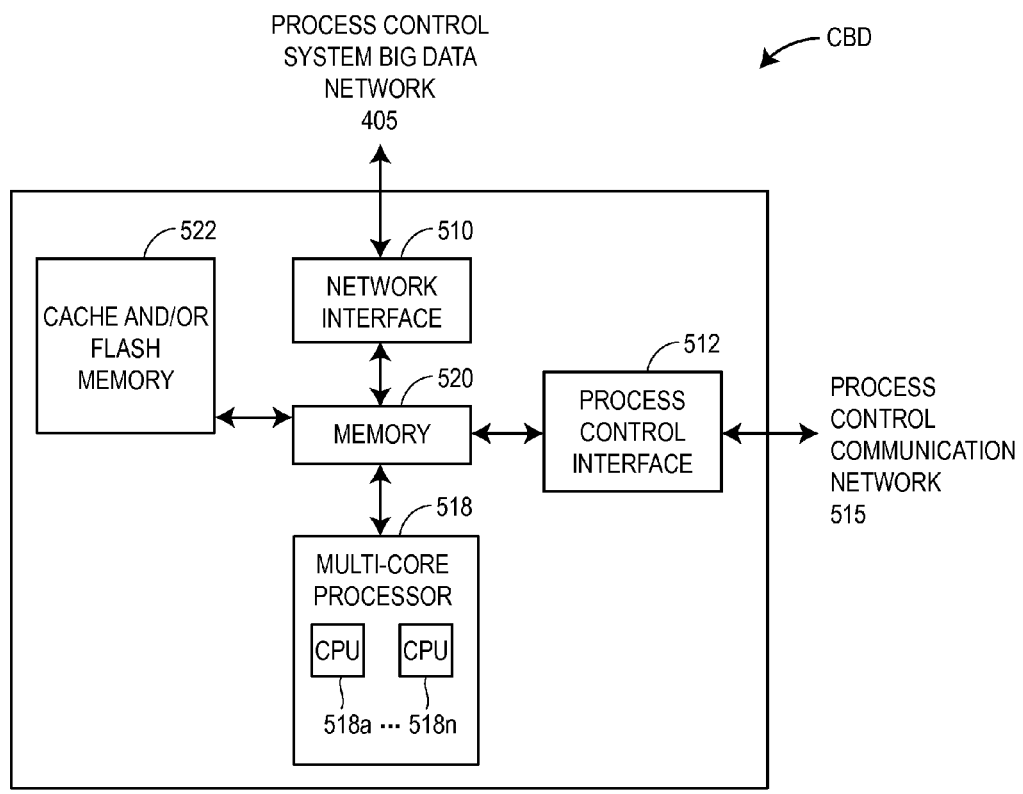
FIG. 10B is a block diagram of an example centralized big data device in a process control system or plant.

As shown in the block diagram of FIG. 10B, an example centralized big data device CBD is configured to collect real-time data that is directly transmitted by the device CBD and/or directly received at the device CBD, and to transmit the collected data for historization at the centralized big data storage appliance 408, e.g., via an interface 510 to the process control system big data network 405. Some centralized big data devices CBD include another interface 512 via which process control data is transmitted to and received from a process control communication network 515 (e.g., by using a process control protocols such as FOUNDATION® Fieldbus, HART®, the WirelessHART®, PROFIBUS, DeviceNet, etc.) to control a process executed by the process plant or system 400, and at least some of the data sent and received over the process control interface 512 is collected and temporarily stored or cached at the centralized big data device CBD.

In addition to the interfaces 510, 512, the centralized big data device CDB includes a multi-processing element processor 518 configured to execute computer-readable instructions, a memory 520, and a cache and/or flash memory 522. The multi-processing element processor 518 is a computing component (e.g., an integral computing component) having two or more independent central processing units (CPU) or processing elements 518a-518n, so that the multi-processing element processor 518 is able to perform multiple tasks or functions concurrently or in parallel by allocating multiple calculations across the multiple processing elements. The memory 520 of the device CDB includes one or more tangible, non-transitory computer-readable storage media, and may be implemented as one or more semiconductor memories, magnetically readable memories, optically readable memories, molecular memories, cellular memories, and/or any other suitable tangible, non-transitory computer-readable storage media or memory storage technology. The memory 520 uses mass or high density data storage technology, in an example. The memory 520 stores one or more sets of computer-readable or computer-executable instructions that are executable by at least some of the processing elements 518a-518n of the multi-processing element processor 518 to perform collecting, caching, and/or transmitting of data that is to be stored at the centralized big data appliance 408.

The cache 522 of the centralized big data device CBD may utilize data storage technology similar to that utilized by the memory 520, or may utilize different data storage technology, such as a flash memory. In an example, the cache 522 uses mass or high density data storage technology to temporarily store data collected by the device CBD prior to the data's transmission for historization at the centralized big data appliance 408. The cache 520 may or may not be included in the memory 520, and a size of the cache 520 may be selectable or configurable. The cache 522 is configured to store one or more data entries, and each data entry includes a value of a datum or data point collected by the device CBD, and a respective timestamp or indication of an instance of time at which the data value was generated by, created by, received at, or observed by the device CBD. Both the value of the process control data and the timestamp stored in each data entry of the cache 522 are transmitted for storage to the centralized big data appliance 408. In an embodiment, a schema utilized by the cache 522 for data storage at the device CBD is included in a schema utilized by the centralized big data appliance 408.

The device CBD centralized big data collects data that is directly generated by and/or directly received at the device CBD, e.g., at the rate at which the data is generated or received. For example, the device CBD collects all data that is directly generated by and/or directly received at the device CBD at the rate at which the data is generated or received. The device CBD may stream at least some of the data in real-time as the data is generated, created, received or otherwise observed by the device CBD, e.g., without using lossy data compression or any other techniques that may cause loss of original information. Additionally or alternatively, the device CBD may temporarily store at least some of the collected data in its cache 522, and push at least some of the data from its cache 522 when the cache 522 is filled to a particular threshold or when some other criteria is met.

Figure 10C:
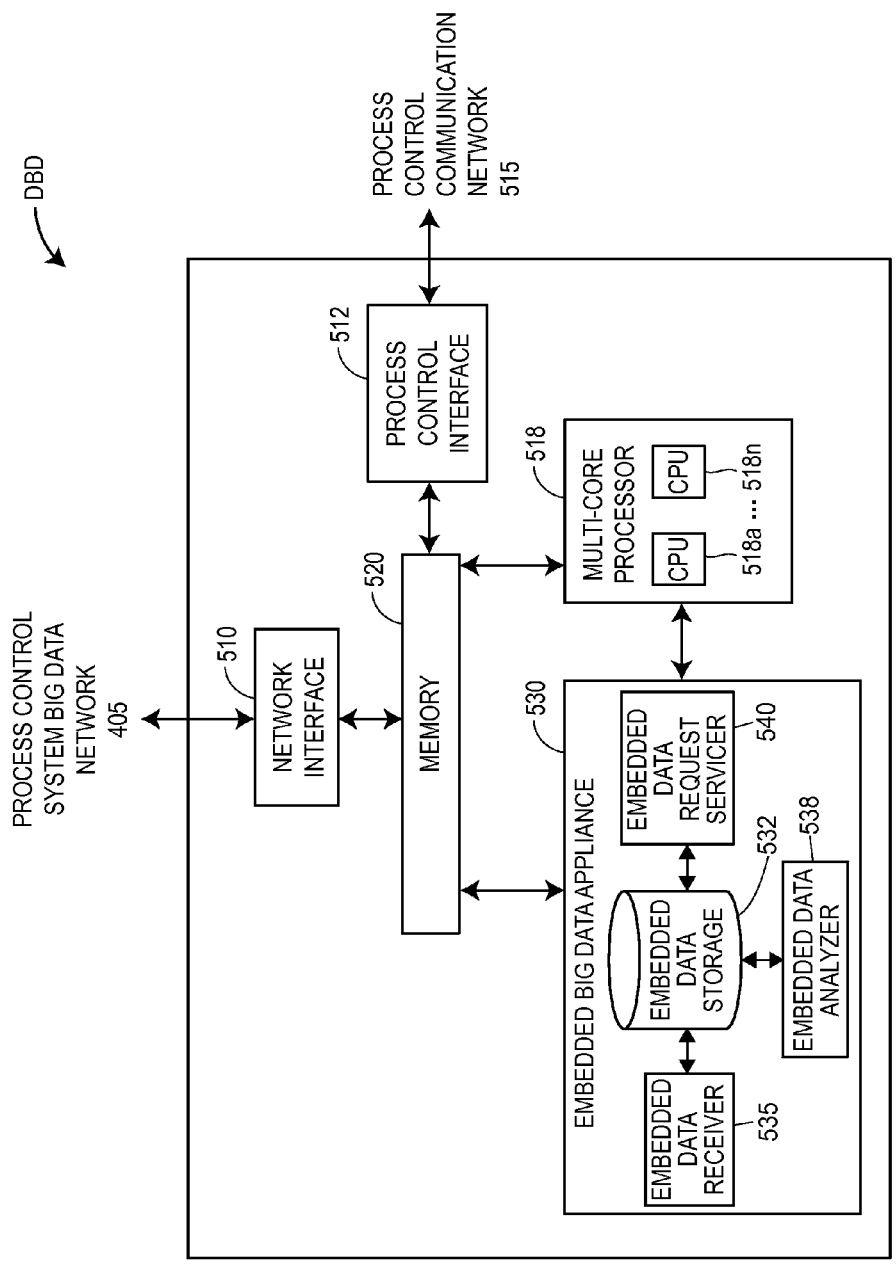
FIG. 10C is a block diagram of an example distributed big data device in a process control system or plant.

On the other hand, and referring now to the example block diagram of FIG. 10C, a distributed process control big data device DBD included in the process plant 40 of FIG. 9 is configured to collect and locally store or historize data (e.g., big data) corresponding to a process plant or to a process controlled in the process plant, and does not rely on a centralized big data appliance 408 for data historization. Similar to the centralized distributed big data device CBD, the distributed big data device DBD includes a multi-core processor 518a and a memory 520, and in some cases, an interface 512 to a process control communication network 515.

However, instead of a cache 522 for temporary big data storage, the distributed big data device DBD includes a respective embedded big data apparatus or appliance 530 for long-term big data storage and historization, as well as for big data analysis. The embedded big data appliance 530 includes, for example, an embedded big data storage 532 for local storage or historization of data, one or more embedded big data receivers 535, one or more embedded big data analyzers 538, and one or more embedded big data request servicers 540. In an embodiment, the embedded big data receivers 535, the embedded big data analyzers 538, and the embedded big data request servicers 540 comprise respective computer-executable instructions that are stored on a tangible, non-transitory computer readable storage medium (e.g., the embedded big data storage 120 or the memory 520), and that are executable by the one or more processors (e.g., one or more of the cores 518a-518n).

The embedded big data storage 532 of the distributed big data device DBD includes one or more tangible, non-transitory memory storages that utilize high density memory storage technology, for example, solid state drive memory, semiconductor memory, optical memory, molecular memory, biological memory, or any other suitable high density memory technology. To the other nodes or devices of the network 400, the embedded big data storage 532 may have the appearance of a single or unitary logical data storage area or entity, which may or may not be addressed in the network 400 as a different entity from the actual process control big data device DBD.

The structure of the embedded big data storage 532 supports the long-term storage of any and all process control system and plant related data collected by the process control distributed big data device DBD, in an embodiment. Each entry, data point, or observation stored in the embedded big data storage 532 includes, for example, time-series data such as an indication of the identity of the data (e.g., device, tag, location, etc.), a content of the data (e.g., measurement, value, etc.), and a timestamp indicating a time at which the data was collected, generated, created, received, or observed. The data is stored in the embedded big data storage 120 of the device DBD using a common format including a schema that supports scalable storage, for example, and which may or may not be the same schema as utilized by other distributed big data devices DBD, and which may or may not be the same schema as utilized by the centralized process control big data appliance 408.

The embedded big data appliance 530 of the distributed big data device DBD includes one or more embedded big data receivers 535, each of which is configured to receive data collected by the device DBD and cause the collected data to be stored in the embedded big data storage 532. The device DBD collects data that is directly generated by and/or directly received at the device DBD, e.g., at the rate at which the data is generated or received. For example, the device DBD collects all data that is directly generated by and/or directly received at the device DBD at the rate at which the data is generated or received via the interfaces 512 and 510.

Additionally, the embedded big data appliance 530 of the distributed big data device DBD includes one or more embedded big data analyzers 538, each of which is configured to carry out or perform one or more learning analyses on data stored in the embedded big data storage 532. At least some of the embedded big data analyzers 538 may perform large scale data analysis on the stored data (e.g., data mining, data discovery, etc.) to discover, detect, or learn new information and knowledge based on the aggregated data. For example, data mining generally involves the process of examining large quantities of data to extract or discover new or previously unknown interesting patterns such as unusual records or multiple groups of data records. At least some of the embedded big data analyzers 538 may perform large scale data analysis on the stored data (e.g., machine learning analysis, data modeling, pattern recognition, correlation analysis, predictive analysis, etc.) to predict, calculate, or identify implicit relationships or inferences within the stored data. For example, the embedded data analyzers 538 may utilize any number of data learning algorithms and classification techniques such as partial least square (PLS) regression, random forest, and principle component analysis (PCA). From the large scale data analysis, the embedded big data analyzers 538 of the device DBD may create or generate ensuing learned data or knowledge, which may be stored in or added to the embedded big data storage 120 of the device DBD. For example, one or more of the data analyzers 538 performs a data analysis to determine at least a portion of a process element alignment map (block 290 of FIG. 3), to determine upstream process element (block 315) of FIG. 6, to determine one or more source(s) of behavior variation of a target process element (blocks 318, 320 of FIG. 6, or other data analyses performed by the methods, systems, apparatuses and techniques described herein. The embedded big data analyzers 538 may create or generate additional data that was previously unknown to the host distributed big data device DBD. Additionally or alternatively, the embedded big data analyzers 538 may create a new or modified application, function, routine, or service based on the results of their data analysis or analyses.

Furthermore, the embedded big data appliance 532 of the device DBD may include one or more embedded big data request servicers 540, each of which is configured to access localized data stored in the embedded big data storage 532, e.g., per the request of a requesting entity or application. In an embodiment, at least some of the embedded big data request servicers 540 are integral with at least some of the embedded big data analyzers 538.

Returning to FIG. 9, as discussed above, the distributed big data devices DBD and the centralized big data devices CBD may include devices whose main function is to automatically generate and/or receive process control data that is used to perform functions to control a process in real-time in the process plant environment 40, such as process controllers, field devices and I/O devices. In a process plant environment 40, process controllers receive signals indicative of process measurements made by field devices, process this information to implement a control routine, and generate control signals that are sent over wired or wireless communication links to other field devices to control the operation of a process in the plant 40. Typically, at least one field device performs a physical function (e.g., opening or closing a valve, increase or decrease a temperature, etc.) to control the operation of a process, and some types of field devices may communicate with controllers using I/O devices. Process controllers, field devices, and I/O devices may be wired or wireless, and any number and combination of wired and wireless process controllers, field devices and I/O devices may be distributed big data nodes DBD and/or centralized big data nodes of the process control big data network 400, each of which locally collects, analyzes and stores big data.

For example, FIG. 9 illustrates a distributed big data process controller device 411 that locally collects, analyzes and stores big data of the process control network or plant 40. The controller 411 is communicatively connected to wired field devices 415-422 via input/output (I/O) cards 426 and 428, and is communicatively connected to wireless field devices 440-446 via a wireless gateway 435 and the network backbone 405. (In another embodiment, though, the controller 411 may be communicatively connected to the wireless gateway 435 using a communications network other than the backbone 405, such as by using another wired or a wireless communication link.) In FIG. 9, the controller 411 is a distributed big data provider node DBD of the process control system big data network 400, and is directly connected to the process control big data network backbone 405.

The controller 411, which may be, by way of example, the DeltaV™ controller sold by Emerson Process Management, may operate to implement a batch process or a continuous process using at least some of the field devices 415-422 and 440-446. In an embodiment, in addition to being communicatively connected to the process control big data network backbone 405, the controller 411 may also be communicatively connected to at least some of the field devices 415-422 and 440-446 using any desired hardware and software associated with, for example, standard 4-20 mA devices, I/O cards 426, 428, and/or any smart communication protocol such as the FOUNDATION® Fieldbus protocol, the HART® protocol, the WirelessHART® protocol, etc. In an embodiment, the controller 411 may be communicatively connected with at least some of the field devices 415-422 and 440-446 using the big data network backbone 405. In FIG. 9, the controller 411, the field devices 415-422 and the I/O cards 426, 428 are wired devices, and the field devices 440-446 are wireless field devices. Of course, the wired field devices 415-422 and wireless field devices 440-446 could conform to any other desired standard(s) or protocols, such as any wired or wireless protocols, including any standards or protocols developed in the future.

The process controller device 411 includes a processor 430 that implements or oversees one or more process control routines (e.g., that are stored in a memory 432), which may include control loops. The processor 430 is configured to communicate with the field devices 415-422 and 440-446 and with other nodes that are communicatively connected to the backbone 405 (e.g., other distributed big data devices DBD, centralized big data devices CBD, and/or the centralized big data appliance 408). It should be noted that any control routines or modules (including quality prediction and fault detection modules or function blocks) described herein may have parts thereof implemented or executed by different controllers or other devices if so desired. Likewise, the control routines or modules described herein which are to be implemented within the process control system 40 may take any form, including software, firmware, hardware, etc. Control routines may be implemented in any desired software format, such as using object oriented programming, ladder logic, sequential function charts, function block diagrams, or using any other software programming language or design paradigm. The control routines may be stored in any desired type of memory, such as random access memory (RAM), or read only memory (ROM) Likewise, the control routines may be hard-coded into, for example, one or more EPROMs, EEPROMs, application specific integrated circuits (ASICs), or any other hardware or firmware elements. Thus, the controller 411 may be configured to implement a control strategy or control routine in any desired manner.

In some embodiments, the controller 411 implements a control strategy using what are commonly referred to as function blocks, wherein each function block is an object or other part (e.g., a subroutine) of an overall control routine and operates in conjunction with other function blocks (via communications called links) to implement process control loops within the process control system 40. Control based function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 40. Of course, hybrid and other types of function blocks exist. Function blocks may be stored in and executed by the controller 411, which is typically the case when these function blocks are used for, or are associated with standard 4-20 ma devices and some types of smart field devices such as HART devices, or may be stored in and implemented by the field devices themselves, which can be the case with Fieldbus devices. The controller 411 may include one or more control routines 438 that may implement one or more control loops. Each control loop is typically referred to as a control module, and may be performed by executing one or more of the function blocks.

Other examples of devices DBD that support distributed big data in the process plant or system 40 are the wired field devices 415, and 418-420 and the I/O card 426 shown in FIG. 9. As such, at least some of the wired field devices 415, 418-420 and the I/O card 426 may be distributed big data nodes DBD of the process control system big data network 400. Additionally, FIG. 9 demonstrates that the example process plant 40 includes wired centralized big data devices (e.g., wired field devices 416, 421 and I/O card 428, as indicated in FIG. 9 by the reference "CBD") and wired legacy devices (e.g., devices 417 and 422), which may operate in conjunction with the wired distributed big data devices 415, 418-420, 426 within the process plant. The wired field devices 415-422 may be any types of devices, such as sensors, valves, transmitters, positioners, etc., while the I/O cards 426 and 428 may be any types of I/O devices conforming to any desired communication or controller protocol. In FIG. 9, the field devices 415-418 are standard 4-20 mA devices or HART devices that communicate over analog lines or combined analog and digital lines to the I/O card 426, while the field devices 419-422 are smart devices, such as FOUNDATION® Fieldbus field devices, that communicate over a digital bus to the I/O card 428 using a Fieldbus communications protocol. In some embodiments, though, at least some of the big data wired field devices 415, 416 and 418-421 and/or at least some of the big data I/O cards 426, 428 additionally or alternatively communicate with the controller 411 using the big data network backbone 405.

The wireless field devices 440-446 shown in FIG. 9 include examples of wireless devices DBD that support distributed big data in the process plant or system 40 (e.g., devices 442a and 42b). FIG. 9 also includes an example of a wireless centralized big data device (e.g., device 444) as well as an example of a legacy wireless device (e.g., device 446). The wireless field devices 440-446 communicate in a wireless network 470 using a wireless protocol, such as the WirelessHART protocol. Such wireless field devices 440-446 may directly communicate with one or more other devices or nodes (e.g., distributed big data nodes DBD, centralized big data nodes CBD, or other nodes) of the process control big data network 400 that are also configured to communicate wirelessly (using the wireless protocol, for example). To communicate with one or more other nodes (e.g., distributed big data nodes DBD, centralized big data nodes CBD, or other nodes) that are not configured to communicate wirelessly, the wireless field devices 440-446 may utilize a wireless gateway 435 connected to the backbone 405 or to another process control communications network. Any number of wireless field devices that support distributed big data may be utilized in a process plant 40.

The wireless gateway 435 may be a distributed big data device DBD and/or a centralized big data device CBD that is included in the process control plant or system 40, and provides access to various wireless devices 440-458 of a wireless communications network 470. In particular, the wireless gateway 435 provides communicative coupling between the wireless devices 440-458, the wired devices 411-428, and/or other nodes or devices of the process control big data network 400 (including the controller 411 of FIG. 9). For example, the wireless gateway 435 may provide communicative coupling by using the big data network backbone 405 and/or by using one or more other communications networks of the process plant 40. The wireless gateway 435 may support distributed big data, centralized big data, or both distributed big data and centralized big data.

The wireless gateway 435 provides communicative coupling, in some cases, by the routing, buffering, and timing services to lower layers of the wired and wireless protocol stacks (e.g., address conversion, routing, packet segmentation, prioritization, etc.) while tunneling a shared layer or layers of the wired and wireless protocol stacks. In other cases, the wireless gateway 435 may translate commands between wired and wireless protocols that do not share any protocol layers. In addition to protocol and command conversion, the wireless gateway 435 may provide synchronized clocking used by time slots and superframes (sets of communication time slots spaced equally in time) of a scheduling scheme associated with the wireless protocol implemented in the wireless network 470. Furthermore, the wireless gateway 435 may provide network management and administrative functions for the wireless network 470, such as resource management, performance adjustments, network fault mitigation, monitoring traffic, security, and the like.

Similar to the wired field devices 415-422, the wireless field devices 440-446 of the wireless network 470 may perform physical control functions within the process plant 40, e.g., opening or closing valves or take measurements of process parameters. The wireless field devices 440-446, however, are configured to communicate using the wireless protocol of the network 470. As such, the wireless field devices 440-446, the wireless gateway 435, and other wireless nodes 452-458 of the wireless network 470 are producers and consumers of wireless communication packets.

In some scenarios, the wireless network 470 may include non-wireless devices, which may or may not be big data devices, whether centralized and/or distributed. For example, a field device 448 of FIG. 9 may be a legacy 4-20 mA device and a field device 450 may be a traditional wired HART device. To communicate within the network 470, the field devices 448 and 450 may be connected to the wireless communications network 470 via a wireless adaptor (WA) 452a or 452b. In FIG. 9, the wireless adaptor 452b is shown as being a legacy wireless adaptor that communicates using the wireless protocol, and the wireless adaptor 452a is shown as supporting distributed big data and thus is communicatively connected to the big data network backbone 405. Additionally, the wireless adaptors 452a, 452b may support other communication protocols such as Foundation® Fieldbus, PROFIBUS, DeviceNet, etc. Furthermore, the wireless network 470 may include one or more network access points 455a, 455b, which may be separate physical devices in wired communication with the wireless gateway 435 or may be provided with the wireless gateway 435 as an integral device. In FIG. 9, the network access point 455a is illustrated as being a distributed big data device DBD, while the network access point 455b is a legacy access point. The wireless network 470 may also include one or more routers 458 to forward packets from one wireless device to another wireless device within the wireless communications network 470, each of which may or may not support distributed big data in the process control system 40. The wireless devices 440-446 and 452-458 may communicate with each other and with the wireless gateway 435 over wireless links 460 of the wireless communications network 470, and/or via the big data network backbone 405, if the wireless devices are distributed and/or centralized big data devices.

Accordingly, FIG. 9 includes several examples of big data devices DBD, CBD which primarily serve to provide network routing functionality and administration to various networks of the process control system. For example, the wireless gateway 435, the access point 455a, and the router 458 each include functionality to route wireless packets in the wireless communications network 470. The wireless gateway 435 performs traffic management and administrative functions for the wireless network 470, as well as routes traffic to and from wired networks that are in communicative connection with the wireless network 470. The wireless network 470 may utilize a wireless process control protocol that specifically supports process control messages and functions, such as WirelessHART. As shown in FIG. 9, the devices 435, 455a, 452a, 442a, 442b and 458 of the wireless network 470 support distributed big data in the process control plant 40, however, any number of any types of nodes of the wireless network 470 may support distributed big data in the process plant 40.

Other devices that communicate using other wireless protocols may be big data devices DBD and/or CBD of the process control big data network 400. In FIG. 9, one or more wireless access points 472 are big data devices DBD and/or CBD that utilize other wireless protocols, such as WiFi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 472 allow handheld or other portable computing devices (e.g., user interface devices) to communicative over a respective wireless network that is different from the wireless network 470 and that supports a different wireless protocol than the wireless network 470. In some scenarios, in addition to portable computing devices, one or more process control devices (e.g., controller 411, field devices 415-422, or wireless devices 435, 440-458) may also communicate using the wireless protocol supported by the access points 472.

Additionally in FIG. 9, one or more gateways 475, 748 to systems that are external to the immediate process control system 40 are big data devices DBD and/or CBD of the process control big data network 400. Typically, such systems are customers or suppliers of information generated or operated on by the process control system 40. For example, a plant gateway node 475 may communicatively connect the immediate process plant 40 (having its own respective process control big data network backbone 405) with another process plant having its own respective process control big data network backbone. In an embodiment, a single process control big data network backbone 405 may service multiple process plants or process control environments.

In FIG. 9, a plant gateway node 475 communicatively connects the immediate process plant 40 to a legacy or prior art process plant that does not include a process control big data network 400 or backbone 405. In this example, the plant gateway node 475 may convert or translate messages between a protocol utilized by the process control big data backbone 405 of the plant 40 and a different protocol utilized by the legacy system (e.g., Ethernet, Profibus, Fieldbus, DeviceNet, etc.). The one or more external system gateway nodes 478 communicatively connect the process control big data network 400 with the network of an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

Although FIG. 9 only illustrates a single controller 411 with a finite number of field devices 415-22 and 440-446, this is only an illustrative and non-limiting embodiment. Any number of controllers 411 may support distributed and/or centralized big data, and any of the controllers 411 may communicate with any number of wired or wireless field devices 415-422, 440-446 to control a process in the plant 40. Furthermore, the process plant 40 may also include any number of wireless gateways 435, routers 458, access points 455, wireless process control communications networks 470, access points 472, and/or gateways 475, 478. Still further, FIG. 9 may include any number of centralized big data appliances 408, which may receive and store collected data and/or generated learned data or knowledge from any or all of the devices in the process plant 40.

Further, the combination of aspects, devices, and components included in the example process plant 40 as illustrated by FIG. 9 (e.g., distributed big data devices DBD, centralized big data devices CBD, centralized big data appliance 408, wired devices, wireless devices, legacy devices, gateways, access points, etc.) is exemplary only. The techniques, systems, methods, and apparatuses disclosed herein may be utilized in process plants with zero or more any of the aspects illustrated in FIG. 9. For example, the techniques, systems, methods, and apparatuses disclosed herein may be utilized in a process plant without a centralized big data appliance 408, or with only centralized big data devices CBD and no distributed big data devices DBD. In another example, the techniques, systems, methods, and apparatuses disclosed herein may be utilized in a process plant with only legacy devices.

Embodiments of the techniques described in the present disclosure may include any number of the following aspects, either alone or combination:

1. A method for determining sources of variations of behaviors of process elements used in a process plant to control a process. The method includes receiving an indication of a target process element included in the plurality of process elements; defining, based on a plurality of diagrams of the process or of the process plant, at least a portion of a process element alignment map corresponding to a plurality of process elements used in the process plant to control the process; and determining, based on the at least the portion of the process element alignment map, an upstream set of process elements corresponding to the target process element. The method also includes providing indications of the upstream set of process elements to a data analysis to determine a respective strength of an impact of each upstream process element on a behavior of the target process element, where a set of inputs to the data analysis includes the indications of the upstream set of process elements and excludes any user-generated input. Additionally, the method includes determining, based on the respective strengths of impacts of the upstream set of process elements, at least a subset of the upstream set of process elements to be one or more sources of a variation in the behavior of the target process element; and causing an indication of the one or more sources of the variation in the behavior of the target process element to be provided to a recipient application, where the recipient application is a user interface application or another application. At least part of the method may be performed by one or more computing devices.

2. The method of the previous aspect, wherein defining the at least the portion of the process element alignment map of the process comprises defining at least a portion of a process element alignment map that includes, for each process element included in the plurality of process elements, a respective identifier of the each process element and an indication of a respective order of an occurrence of a respective event at the each process element to control the process relative to an occurrence of a respective event at at least one other process element to control the process. Additionally, the plurality of process elements includes a plurality of devices, a plurality of process variables, and a plurality of measurements.

3. The method of any one of the previous aspects, wherein defining the at least the portion of the process element alignment map includes extracting or obtaining a set of data from the plurality of diagrams. The extracted set of data includes, for each process element of at least a portion of the plurality of process elements, the respective identifier of the each process element and an indication of a respective physical location of the each process element in the process plant. Further, the method includes generating, based on the extracted or obtained set of data, the respective order of the each process element included in the at least the portion of the plurality of process elements.

4. The method of any one of the previous aspects, wherein extracting or obtaining the set of data from the plurality of diagrams comprises extracting the set of data from at least two or more of: a Piping and Instrumentation Diagram (PI&D), a Process Flow Diagram (PFD), a Loop Diagram, a display view, another diagram of the process plant, streamed data, or user input.

5. The method of any one of the previous aspects, further comprising receiving additional data via a user interface; and wherein defining the at the at least the portion of the process element alignment map is based on the extracted or obtained data and on the additional data.

6. The method of any one of the previous aspects, wherein determining the upstream set of process elements corresponding to the target process element comprises determining a subset of the plurality of process elements, where each process element of the subset has a respective order in the process element alignment map ahead of or adjacent to the respective order of the target process element in the process element alignment map.

7. The method of any one of the previous aspects, wherein receiving the indication of the target process element occurs prior to defining the at least the portion of the process element alignment map, and the method further comprises determining a subset of the plurality of process elements associated with the target process element. Additionally, defining the at least the portion of the process element alignment map comprises determining only a part of the process element alignment map, where the part of the process element alignment map corresponds to the determined subset of the plurality of process elements associated with the target process element.

8. The method of any one of the previous aspects, wherein receiving the indication of the target process element occurs after defining the at least the portion of the process element alignment map, and wherein the target process element is included in the at least the portion of the process element alignment map.

9. The method of any one of the previous aspects, wherein providing the indications of the upstream set of process elements to the data analysis comprises providing the indications of the upstream set of process elements to at least one of: a principal component analysis (PCA), a cross correlation analysis, a partial least squares regression analysis (PLS), or another predictive data analysis function.

10. The method of any one of the previous aspects, further comprising, determining, based on the at least the portion of the process element alignment map, a respective impact delay of the each upstream process element with respect to the target process element. The respective impact delay of the each upstream process element corresponds to the respective strength of impact of the each upstream process element and a time offset between the each upstream process element and the target process element. Further, determining the one or more sources of the variation in the behavior of the target process element based on the respective strengths of impacts of the upstream process elements comprises determining the one or more sources of variation in the behavior or the target process element based on the respective impact delays of the upstream process elements.

11. The method of any one of the previous aspects, wherein determining the at least the subset of the upstream set of process elements to be the one or more sources of the variation of the behavior of the target process element is based on at least one of (a) a threshold corresponding to an ordering of the upstream set of process elements, or (b) a threshold corresponding to the respective strengths of impacts of the upstream set of process elements.

12. The method of any one of the previous aspects, further comprising storing an identifier of the variation in the behavior of the target process element in conjunction with one or more identifiers of the determined one or more sources of the variation in the behavior of the target process element.

13. The method of any one of the previous aspects, wherein causing the indication of the one or more sources to be provided to the recipient application comprises causing the indication of the one or more sources to be automatically provided to the recipient application less than one second after receiving the indication of the target process element.

14. The method of any one of the previous aspects, wherein at least one of defining the at least the portion of the process element alignment map or determining the at least the subset of the upstream set of process elements to be the one or more sources of the variation in the behavior of the target process element is performed by a service application executing on the one or more computing devices.

15. The method of any one of the previous aspects, wherein the service application is hosted by a big data appliance for the process plant.

16. The method of any one of the previous aspects, wherein the executing service application is an instance of a service application hosted on a hosting device included in the process plant, and wherein one of: the hosting device is the target process element; or the hosting device is configured to, during run-time of the process, receive data originated by the target process element and automatically operate on the received data to control the process.

17. The method of any one of the previous aspects, wherein at least a portion of the method is performed in a background of the one or more computing devices.

18. The method of claim 1, wherein receiving the indication of the target process element comprises receiving the indication of the target process element from an unsupervised application. The unsupervised application may be executing at one or more computing devices at which the method is being executed, or may be executing at another one or more computing devices. Further, the unsupervised application is at least one of an unsupervised discovery, learning, training, or analytics application.

19. An apparatus for automatically determining a process element alignment map of a plurality of process elements used to control at least a portion of a process in a process plant. The apparatus may be configured to perform zero or more of any of the previous methods. Additionally, the apparatus includes one or more tangible, non-transitory, computer-readable storage media storing computer-executable instructions that, when executed by one or more processors, cause the apparatus to obtain a set of data from a plurality of data sources storing data descriptive of the plurality of the process elements. The obtained set of data includes, for each of the plurality of process elements, a respective identification of the each process element and an indication of a respective physical location of the each process element in the process plant. Further, the plurality of process elements includes a plurality of devices, a plurality of process variables, and a plurality of measurements used to control the process. The computer-executable instructions are also executable to determine, based on the obtained set of data, the process element alignment map, where the process element alignment map indicates, for each process element included in the plurality of process elements, the respective identification of the each process element and an indication of a respective order of an occurrence of a respective event at the each process element to control the process relative to an occurrence of a respective event at at least one other process element to control the process.

20. The apparatus of any one of the previous aspects, wherein the plurality of data sources includes at least two of a Piping and Instrumentation Diagram (PI&D), a Process Flow Diagram (PFD), a Loop Diagram, another diagram of the process plant, streamed data, or a manually generated data source.

21. The apparatus of any one of the previous aspects, wherein the plurality of data sources includes at least two different operator display views, and wherein each of the two different operator display views is configured for at least one of the process or the process plant.

22. The apparatus of any one of the previous aspects, wherein: a first data source of the plurality of data sources stores data descriptive of a first process element of the plurality of process elements and excludes any data descriptive of a second process element of the plurality of process elements; a second data source of the plurality of data sources stores data descriptive of the second process element and excludes any data descriptive of the first process element; and the computer-executable instructions are executable to cause the apparatus to determine the respective order corresponding to the first process element in the process element alignment map with respect to the respective order corresponding to the second process element in the process element alignment map.

23. The apparatus of any one of the previous aspects, wherein: a first data source of the plurality of data sources stores first data descriptive of a specific process element of the plurality of process elements and excludes second data descriptive of the specific process element; a second data source of the plurality of data sources stores the second data descriptive of the specific process element and excludes the first data descriptive of the specific process element; and the computer-executable instructions are executable to cause the apparatus to determine the respective order corresponding to the specific process element in the process element alignment map based on the first data and the second data.

24. The apparatus any one of the previous aspects, wherein: each data source of the plurality of data sources stores a respective subset of the obtained set of data, and the computer-executable instructions are further executable to cause the apparatus to determine the respective subsets of the obtained set of data.

25. The apparatus of any one of the previous aspects, wherein the computer-executable instructions are further executable to cause the apparatus to: receive additional data via a user interface; and determine the process element alignment map based on the obtained set of data and the additional data.

26. The apparatus of any one of the previous aspects, wherein the additional data is received as a response to a presentation of a draft of the process element alignment map at the user interface.

27. The apparatus of any one of the previous aspects, wherein the process alignment map further includes metadata for at least some of the process elements included in the plurality of process elements.

28. The apparatus of any one of the previous aspects, wherein the computer-executable instructions are further executable to cause the apparatus to store the process element alignment map.

29. The apparatus of any one of the previous aspects, wherein the process element alignment map is stored at a big data appliance of the process plant, and wherein the big data appliance is configured to provide access to contents of the process element alignment map.

30. The apparatus of any one of the previous aspects, wherein the process element alignment map is stored at a field device configured to operate during run-time to control the process in the process plant.

31. The apparatus of any one of the previous aspects, wherein the computer-executable instructions are executed by one or more processors of a big data appliance of the process plant.

32. The apparatus of any one of the previous aspects, wherein the computer-executable instructions are executed by one or more processors of a field device operating during run-time to control the process in the process plant.

33. The apparatus of any one of the previous aspects, wherein the computer-executable instructions are further executable to cause the apparatus to cause an indication of the process element alignment map to be provided to one or more recipient applications, where the one or more recipient applications include at least one of a user interface application or another application executing on one or more computing devices.

34. The apparatus of any one of the previous aspects, wherein the one or more recipient applications include at least one of a discovery, learning, training, or analytics application.

35. The apparatus of any one of the previous aspects, wherein the another application is an unsupervised application.

36. The apparatus of any one of the previous aspects, wherein: an initiation of an execution of the computer-executable instructions is based on a request to determine the process element alignment map, and the indication of the process element alignment map is provided to the one or more recipient applications, in real-time, as a response to the request.

37. The apparatus of any one of the previous aspects, wherein the computer-executable instructions are further executable to cause the apparatus to present an indication of the process element alignment map, in at least one of a table format or a graph format, on a user interface.

38. An apparatus for automatically determining sources of a variation of a behavior of a target process element used in a process plant to control a process. The apparatus may include zero or more of the previous aspects, and the apparatus comprises one or more tangible, non-transitory, computer-readable storage media storing computer-executable instructions that, when executed by one or more processors, cause the apparatus to receive an indication of the target process element. The target process element is included in a plurality of process elements used in the process plant to control the process, and the plurality of process elements includes a plurality of devices, a plurality of process variables, and a plurality of measurements. The computer-executable instructions are further executable to determine, using at least a portion of a process element alignment map, a subset of the plurality of process elements that are upstream of the target process element, where the process alignment map indicates, for each process element included in the plurality of process elements, a respective identifier of the each process element and an indication of a respective order of an occurrence of a respective event at the each process element to control the process relative to an occurrence of a respective event at at least one other process element to control the process. The subset of the plurality of process elements that are upstream of the target process element is a set of upstream process elements, and each upstream process element has a respective order in the process element alignment map that is ahead of or adjacent to the respective order of the target process element in the process element alignment map. The computer-executable instructions are still further executable to cause the set of upstream process elements to be used in a data analysis to determine, for each upstream process element, a respective impact delay, where the respective impact delay corresponds to a time offset from a time at which a particular event occurs at the each upstream process element to a time at which a change in the behavior of the target process element resulting from the occurrence of the particular event at the each upstream process element occurs. Additionally, the computer-executable instructions are executable to cause at least a portion of the set of upstream process elements to be indicated, to a recipient application, as one or more sources of the variation of the behavior of the target process element, where the at least a portion of the set of upstream process elements is determined based on the respective impact delays of the upstream process elements.

39. The apparatus of any one of the previous aspects, wherein the computer-executable instructions further cause the apparatus to prevent a process element of the plurality of process elements that is not upstream of the target process element from being used in the data analysis.

40. The apparatus of any one of the previous aspects, wherein the data analysis determines, for the each upstream process element and based on the respective impact delay of the each upstream process element, a respective strength of an impact of the each upstream process element on the variation in the behavior of the target process element; and wherein the computer-executable instructions cause the apparatus to determine the at least the portion of the plurality of process elements as the one or more sources of the variation of the behavior of the target process element based on the respective strengths of impacts of the upstream process elements.

41. The apparatus of any one of the previous aspects, wherein the computer-executable instructions cause the apparatus to determine the at least the portion of the plurality of process elements as the one or more sources of the variation of the behavior of the target process element further based on a threshold.

42. The apparatus of any one of the previous aspects, wherein the computer-executable instructions further cause the apparatus to cause indications of the respective strengths of impact corresponding to the at least the portion of the set of upstream process elements to be indicated to the recipient application.

43. The apparatus of any one of the previous aspects, wherein the data analysis is a predictive data analysis comprising at least one of: a principal component analysis (PCA), a cross correlation analysis, a partial least squares regression analysis (PLS), or other predictive analysis technique.

44. The apparatus of any one of the previous aspects, wherein the predictive data analysis further determines, for the each upstream process element, a respective strength of an impact of the each upstream process element on the variation in the behavior of the target process element; and wherein the respective impact delay of the each upstream process element is determined based on the respective strength of impact of the each upstream process element.

45. The apparatus of any one of the previous aspects, wherein at least a subset of the respective strengths of impact of the upstream process elements are included in a model generated by the data analysis; the time offset is a particular time offset included in a plurality of time offsets corresponding to the target process element; the time offset is determined based on the model; and the respective impact delay of the each upstream process element is determined based on the particular time offset.

46. The apparatus of any one of the previous aspects, wherein the process element alignment map is defined from a set of data obtained from a plurality of data sources descriptive of the plurality of process elements; the plurality of data sources includes, for each process element, a respective identification of the each process element and an indication of a respective physical location of the each process element in the process plant; and the time offset of the each upstream process element is determined based on the respective physical location of the each upstream process element.

47. The apparatus of any one of the previous aspects, wherein the plurality of data sources includes at least two diagrams selected from: a set of Piping and Instrumentation Diagrams (PI&Ds), a set of Process Flow Diagrams (PFDs), a set of Loop Diagrams, a set of operator display views configured for the process or for the process plant, or a set of other diagrams of the process plant.

48. The apparatus of any one of the previous aspects, wherein the computer-executable instructions are further executable to cause the apparatus to determine the at least the portion of the process element alignment map based on the received indication of the target process element.

49. The apparatus of any one of the previous aspects, wherein the indication of the at least the portion of the set of upstream process elements is provided to the recipient application as a real-time response to the reception of the indication of the target process element.

50. The apparatus of any one of the previous aspects, wherein the computer-executable instructions are included in an unsupervised application, where the unsupervised application is at least one of a discovery, learning, training, or analytics application.

51. The apparatus of any one of the previous aspects, wherein the indication of the target process element is received via an application that is at least one of: a user interface application; an unsupervised application executing, in a run-time environment of the process plant, on real-time data generated by the process plant; a discovery application; a learning application; a training application; an analytics application; an application operating in a background of one or more computing devices on which the computer-executable instructions are being executed; or an application executing on one or more computing devices different from one or more computing devices on which the computer-executable instructions are being executed.

52. The apparatus any one of the previous aspects, wherein the recipient application is at least one of: a user interface application; an unsupervised application executing, in a run-time environment of the process plant, on real-time data generated by the process plant; a discovery application; a learning application; a training application; an analytics application; an application operating in a background of one or more computing devices on which the computer-executable instructions are being executed; or an application executing on one or more computing devices different from one or more computing devices on which the computer-executable instructions are being executed.

53. The apparatus of any one of the previous aspects, wherein the computer-executable instructions are executed by one or more processors of a big data appliance of the process plant.

54. The apparatus of any one of the previous aspects, wherein the computer-executable instructions are executed by one or more processors of a field device operating in real-time to control the process in the process plant.

55. The apparatus of any one of the previous aspects, wherein the computer-executable instructions are further executable to store an identifier of the variation of the behavior of the target process element and of an indication of the at least one or more sources of the variation of the behavior of the target process element.

56. The apparatus of any one of the previous aspects, wherein the identifier of the variation of the behavior of the target process element and of the indication of the at least one or more sources is provided by a user.

57. Any one of the preceding aspects in combination with any one or more other preceding aspects.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed:

1. A method for determining sources of variations of behaviors of process elements used in a process plant to control a process, the method comprising:
   receiving, at the one or more computing devices, an indication of a target process element included in the plurality of process elements;
   defining, by one or more computing devices and based on a plurality of diagrams of the process or of the process plant, at least a portion of a process element alignment map corresponding to a plurality of process elements used in the process plant to control the process;
   determining, by the one or more computing devices and based on the at least the portion of the process element alignment map, an upstream set of process elements corresponding to the target process element;
   providing, by the one or more computing devices, indications of the upstream set of process elements to a data analysis to determine a respective strength of an impact of each upstream process element on a behavior of the target process element, wherein a set of inputs to the data analysis includes the indications of the upstream set of process elements and excludes any user-generated input;
   determining, by the one or more computing devices and based on the respective strengths of impacts of the upstream set of process elements, at least a subset of the upstream set of process elements to be one or more sources of a variation in the behavior of the target process element; and
   causing, by the one or more computing devices, an indication of the one or more sources of the variation in the behavior of the target process element to be provided to a recipient application, the recipient application being a user interface application or another application.

2. The method of claim 1, wherein:
   defining the at least the portion of the process element alignment map of the process comprises defining at least a portion of a process element alignment map that includes, for each process element included in the plurality of process elements, a respective identifier of the each process element and an indication of a respective order of an occurrence of a respective event at the each process element to control the process relative to an occurrence of a respective event at at least one other process element to control the process; and
   the plurality of process elements including a plurality of devices, a plurality of process variables, and a plurality of measurements.

3. The method of claim 2, wherein defining, by the one of more computing devices, the at least the portion of the process element alignment map comprises:
   extracting, by the one or more computing devices, a set of data from the plurality of diagrams, the extracted set of data including, for each process element included in at least a portion of the plurality of process elements, the respective identifier of the each process element and an indication of a respective physical location of the each process element in the process plant; and
   generating, based on the extracted set of data, the respective order of the each process element included in the at least the portion of the plurality of process elements.

4. The method of claim 3, wherein extracting the set of data from the plurality of diagrams comprises extracting the set of data from at least two or more of: a Piping and Instrumentation Diagram (PI&D), a Process Flow Diagram (PFD), a Loop Diagram, a display view, another diagram of the process plant, streamed data, or user input.

5. The method of claim 3,
   further comprising receiving additional data via a user interface; and
   wherein defining the at least the portion of the process element alignment map is based on the extracted data and on the additional data.

6. The method of claim 1, wherein determining the upstream set of process elements corresponding to the target process element comprises determining a subset of the plurality of process elements, each process element of which has a respective order in the process element alignment map ahead of or adjacent to the respective order of the target process element in the process element alignment map.

7. The method of claim 1, wherein:
   receiving the indication of the target process element occurs prior to defining the at least the portion of the process element alignment map;
   the method further comprises determining a subset of the plurality of process elements associated with the target process element; and
   defining the at least the portion of the process element alignment map comprises determining only a part of the process element alignment map, wherein the part of the process element alignment map corresponds to the determined subset of the plurality of process elements associated with the target process element.

8. The method of claim 1, wherein receiving the indication of the target process element occurs after defining the at least the portion of the process element alignment map, and wherein the target process element is included in the at least the portion of the process element alignment map.

9. The method of claim 1, wherein providing the indications of the upstream set of process elements to the data analysis comprises providing the indications of the upstream set of process elements to at least one of: a principal component analysis (PCA), a cross correlation analysis, a partial least squares regression analysis (PLS), or another predictive data analysis function.

10. The method of claim 1,
    further comprising, determining, by the one or more computing devices and based on the at least the portion of the process element alignment map, a respective impact delay of the each upstream process element with respect to the target process element, the respective impact delay of the each upstream process element corresponding to the respective strength of impact of the each upstream process element and a time offset between the each upstream process element and the target process element; and wherein determining the one or more sources of the variation in the behavior of the target process element based on the respective strengths of impacts of the upstream process elements comprises determining the one or more sources of variation in the behavior or the target process element based on the respective impact delays of the upstream process elements.

11. The method of claim 1, wherein determining the at least the subset of the upstream set of process elements to be the one or more sources of the variation of the behavior of the target process element is based on at least one of (a) a threshold corresponding to an ordering of the upstream set of process elements, or (b) a threshold corresponding to the respective strengths of impacts of the upstream set of process elements.

12. The method of claim 1, further comprising storing an identifier of the variation in the behavior of the target process element in conjunction with one or more identifiers of the determined one or more sources of the variation in the behavior of the target process element.

13. The method of claim 1, wherein causing the indication of the one or more sources to be provided to the recipient application comprises causing the indication of the one or more sources to be automatically provided to the recipient application less than one second after receiving the indication of the target process element.

14. The method of claim 1, wherein at least one of defining the at least the portion of the process element alignment map or determining the at least the subset of the upstream set of process elements to be the one or more sources of the variation in the behavior of the target process element is performed by a service application executing on the one or more computing devices.

15. The method of claim 14, wherein the service application is hosted by a big data appliance for the process plant.

16. The method of claim 14, wherein the executing service application is an instance of a service application hosted on a hosting device included in the process plant, and wherein one of:
the hosting device is the target process element; or
the hosting device is configured to, during run-time of the process, receive data originated by the target process element and automatically operate on the received data to control the process.

17. The method of claim 1, wherein at least a portion of the method is performed in a background of the one or more computing devices.

18. The method of claim 1, wherein receiving the indication of the target process element comprises receiving the indication of the target process element from an unsupervised application executing at the one or more computing devices or executing at another one or more computing devices, the unsupervised application being at least one of an unsupervised discovery, learning, training, or analytics application.

19. An apparatus for automatically determining a process element alignment map of a plurality of process elements used to control at least a portion of a process in a process plant, the apparatus comprising:
one or more tangible, non-transitory, computer-readable storage media storing computer-executable instructions that, when executed by one or more processors, cause the apparatus to:

obtain a set of data from a plurality of data sources storing data descriptive of the plurality of the process elements,
the obtained set of data including, for each of the plurality of process elements, a respective identification of the each process element and an indication of a respective physical location of the each process element in the process plant, and
the plurality of process elements including a plurality of devices, a plurality of process variables, and a plurality of measurements used to control the process; and
determine, based on the obtained set of data, the process element alignment map, the process element alignment map indicating, for each process element included in the plurality of process elements, the respective identification of the each process element and an indication of a respective order of an occurrence of a respective event at the each process element to control the process relative to an occurrence of a respective event at at least one other process element to control the process, wherein:
a first data source of the plurality of data sources stores first data descriptive of a specific process element of the plurality of process elements and excludes second data descriptive of the specific process element,
a second data source of the plurality of data sources stores the second data descriptive of the specific process element and excludes the first data descriptive of the specific process element, and
the computer-executable instructions are executable to cause the apparatus to determine the respective order corresponding to the specific process element in the process element alignment map based on the first data and the second data.

20. The apparatus of claim 19, wherein the plurality of data sources includes at least two of a Piping and Instrumentation Diagram (PI&D), a Process Flow Diagram (PFD), a Loop Diagram, another diagram of the process plant, streamed data, or a manually generated data source.

21. The apparatus of claim 19, wherein the plurality of data sources includes at least two different operator display views, and wherein each of the two different operator display views is configured for at least one of the process or the process plant.

22. The apparatus of claim 19, wherein:
each data source of the plurality of data sources stores a respective subset of the obtained set of data, and
the computer-executable instructions are further executable to cause the apparatus to determine the respective subsets of the obtained set of data.

23. The apparatus of claim 19, wherein the computer-executable instructions are further executable to cause the apparatus to:
receive additional data via a user interface; and
determine the process element alignment map based on the obtained set of data and the additional data.

24. The apparatus of claim 23, wherein the additional data is received as a response to a presentation of a draft of the process element alignment map at the user interface.

25. The apparatus of claim 19, wherein the process alignment map further includes metadata for at least some of the process elements included in the plurality of process elements.

26. The apparatus of claim 19, wherein the computer-executable instructions are further executable to cause the apparatus to store the process element alignment map.

27. The apparatus of claim 26, wherein the process element alignment map is stored at a big data appliance of the process plant, and wherein the big data appliance is configured to provide access to contents of the process element alignment map.

28. The apparatus of claim 26, wherein the process element alignment map is stored at a field device configured to operate during run-time to control the process in the process plant.

29. The apparatus of claim 19, wherein the computer-executable instructions are executed by one or more processors of a big data appliance of the process plant.

30. The apparatus of claim 19, wherein the computer-executable instructions are executed by one or more processors of a field device operating during run-time to control the process in the process plant.

31. The apparatus of claim 19, wherein the computer-executable instructions are further executable to cause the apparatus to cause an indication of the process element alignment map to be provided to one or more recipient applications, the one or more recipient applications including at least one of a user interface application or another application executing on one or more computing devices.

32. The apparatus of claim 31, wherein the one or more recipient applications include at least one of a discovery, learning, training, or analytics application.

33. The apparatus of claim 31, wherein the another application is an unsupervised application.

34. The apparatus of claim 31, wherein:
an initiation of an execution of the computer-executable instructions is based on a request to determine the process element alignment map, and
the indication of the process element alignment map is provided to the one or more recipient applications, in real-time, as a response to the request.

35. The apparatus of claim 19, wherein the computer-executable instructions are further executable to cause the apparatus to present an indication of the process element alignment map, in at least one of a table format or a graph format, on a user interface.

36. An apparatus for automatically determining sources of a variation of a behavior of a target process element used in a process plant to control a process, the apparatus comprising:
one or more tangible, non-transitory, computer-readable storage media storing computer-executable instructions that, when executed by one or more processors, cause the apparatus to:
receive an indication of the target process element, the target process element included in a plurality of process elements used in the process plant to control the process, and the plurality of process elements including a plurality of devices, a plurality of process variables, and a plurality of measurements;
determine, using at least a portion of a process element alignment map, a subset of the plurality of process elements that are upstream of the target process element,
the process alignment map indicating, for each process element included in the plurality of process elements, a respective identifier of the each process element and an indication of a respective order of an occurrence of a respective event at the each process element to control the process relative to an occurrence of a respective event at at least one other process element to control the process,
the subset of the plurality of process elements that are upstream of the target process element being a set of upstream process elements, and each upstream process element having a respective order in the process element alignment map that is ahead of or adjacent to the respective order of the target process element in the process element alignment map;
cause the set of upstream process elements to be used in a data analysis to determine, for each upstream process element, a respective impact delay, the respective impact delay corresponding to a time offset from a time at which a particular event occurs at the each upstream process element to a time at which a change in the behavior of the target process element resulting from the occurrence of the particular event at the each upstream process element occurs; and
cause at least a portion of the set of upstream process elements to be indicated, to a recipient application, as one or more sources of the variation of the behavior of the target process element, the at least a portion of the set of upstream process elements determined based on the respective impact delays of the upstream process elements.

37. The apparatus of claim 36, wherein the computer-executable instructions further cause the apparatus to prevent a process element of the plurality of process elements that is not upstream of the target process element from being used in the data analysis.

38. The apparatus of claim 36, wherein:
the data analysis determines, for the each upstream process element and based on the respective impact delay of the each upstream process element, a respective strength of an impact of the each upstream process element on the variation in the behavior of the target process element; and
the computer-executable instructions cause the apparatus to determine the at least the portion of the plurality of process elements as the one or more sources of the variation of the behavior of the target process element based on the respective strengths of impacts of the upstream process elements.

39. The apparatus of claim 36, wherein the computer-executable instructions cause the apparatus to determine the at least the portion of the plurality of process elements as the one or more sources of the variation of the behavior of the target process element further based on a threshold.

40. The apparatus of claim 36, wherein the computer-executable instructions further cause the apparatus to cause indications of the respective strengths of impact corresponding to the at least the portion of the set of upstream process elements to be indicated to the recipient application.

41. The apparatus of claim 36, wherein the data analysis is a predictive data analysis comprising at least one of: a principal component analysis (PCA), a cross correlation analysis, a partial least squares regression analysis (PLS), or other predictive analysis technique.

42. The apparatus of claim 41, wherein:
the predictive data analysis further determines, for the each upstream process element, a respective strength of an impact of the each upstream process element on the variation in the behavior of the target process element; and
the respective impact delay of the each upstream process element is determined based on the respective strength of impact of the each upstream process element.

43. The apparatus of claim 42, wherein:
at least a subset of the respective strengths of impact of the upstream process elements are included in a model generated by the data analysis;

the time offset is a particular time offset included in a plurality of time offsets corresponding to the target process element;

the time offset is determined based on the model; and the respective impact delay of the each upstream process element is determined based on the particular time offset.

44. The apparatus of claim 36, wherein:

the process element alignment map is defined from a set of data obtained from a plurality of data sources descriptive of the plurality of process elements;

the plurality of data sources includes, for each process element, a respective identification of the each process element and an indication of a respective physical location of the each process element in the process plant; and the time offset of the each upstream process element is determined based on the respective physical location of the each upstream process element.

45. The apparatus of claim 44, wherein the plurality of data sources includes at least two diagrams selected from: a set of Piping and Instrumentation Diagrams (PI&Ds), a set of Process Flow Diagrams (PFDs), a set of Loop Diagrams, a set of operator display views configured for the process or for the process plant, or a set of other diagrams of the process plant.

46. The apparatus of claim 36, wherein the computer-executable instructions are further executable to cause the apparatus to determine the at least the portion of the process element alignment map based on the received indication of the target process element.

47. The apparatus of claim 36, wherein the indication of the at least the portion of the set of upstream process elements is provided to the recipient application as a real-time response to the reception of the indication of the target process element.

48. The apparatus of claim 36, wherein the computer-executable instructions are included in an unsupervised application, the unsupervised application being at least one of a discovery, learning, training, or analytics application.

49. The apparatus of claim 36, wherein the indication of the target process element is received via an application that is at least one of:

a user interface application;

an unsupervised application executing, in a run-time environment of the process plant, on real-time data generated by the process plant;

a discovery application;

a learning application;

a training application;

an analytics application;

an application operating in a background of one or more computing devices; or an application executing on one or more computing devices different from one or more computing devices on which the computer-executable instructions are executed.

50. The apparatus of claim 36, wherein the recipient application is at least one of:

a user interface application;

an unsupervised application executing, in a run-time environment of the process plant, on real-time data generated by the process plant;

a discovery application;

a learning application;

a training application;

an analytics application;

an application operating in a background of one or more computing devices; or an application executing on one or more computing devices different from one or more computing devices on which the computer-executable instructions are executed.

51. The apparatus of claim 36, wherein the computer-executable instructions are executed by one or more processors of a big data appliance of the process plant.

52. The apparatus of claim 36, wherein the computer-executable instructions are executed by one or more processors of a field device operating in real-time to control the process in the process plant.

53. The apparatus of claim 36, wherein the computer-executable instructions are further executable to store an identifier of the variation of the behavior of the target process element and of an indication of the at least one or more sources of the variation of the behavior of the target process element.

54. The apparatus of claim 53, wherein the identifier of the variation of the behavior of the target process element and of the indication of the at least one or more sources is provided by a user.

55. An apparatus for automatically determining a process element alignment map of a plurality of process elements used to control at least a portion of a process in a process plant, the apparatus comprising:

one or more tangible, non-transitory, computer-readable storage media storing computer-executable instructions that, when executed by one or more processors, cause the apparatus to:

obtain a set of data from a plurality of data sources storing data descriptive of the plurality of the process elements, the obtained set of data including, for each of the plurality of process elements, a respective identification of the each process element and an indication of a respective physical location of the each process element in the process plant, and the plurality of process elements including a plurality of devices, a plurality of process variables, and a plurality of measurements used to control the process; and determine, based on the obtained set of data, the process element alignment map, the process element alignment map indicating, for each process element included in the plurality of process elements, the respective identification of the each process element and an indication of a respective order of an occurrence of a respective event at the each process element to control the process relative to an occurrence of a respective event at at least one other process element to control the process, wherein:

a first data source of the plurality of data sources stores data descriptive of a first process element of the plurality of process elements and excludes any data descriptive of a second process element of the plurality of process elements;

a second data source of the plurality of data sources stores data descriptive of the second process element and excludes any data descriptive of the first process element; and the computer-executable instructions are executable to cause the apparatus to determine the respective order corresponding to the first process element in the process element alignment map with respect to the respective order corresponding to the second process element in the process element alignment map.

* * * * *